US012666222B2

(12) United States Patent
Donaire et al.

(10) Patent No.: US 12,666,222 B2
(45) Date of Patent: Jun. 23, 2026

(54) PRIVACY COMPLIANT INSIGHTS PLATFORM INCORPORATING DATA SIGNALS FROM VARIOUS SOURCES

(71) Applicant: INTUIZI, INC., Orlando, FL (US)

(72) Inventors: Ron Donaire, Orlando, FL (US); John Williams, Orlando, FL (US); Jeffrey Pescatello, Orlando, FL (US); David Katz, Orlando, FL (US); Alexander Lavrentev, Orlando, FL (US)

(73) Assignee: Intuizi, Inc., Orlando, FL (US)

( * ) Notice: Subject to any disclaimer, the term of this patent is extended or adjusted under 35 U.S.C. 154(b) by 292 days.

(21) Appl. No.: 17/804,582

(22) Filed: May 30, 2022

(65) Prior Publication Data

US 2022/0386067 A1      Dec. 1, 2022

Related U.S. Application Data

(60) Provisional application No. 63/194,907, filed on May 28, 2021.

(51) Int. Cl.
| | |
|---|---|
| *H04W 4/021* | (2018.01) |
| *G06Q 30/0204* | (2023.01) |
| *H04W 12/02* | (2009.01) |
| *H04W 12/033* | (2021.01) |

(52) U.S. Cl.
CPC ........ *H04W 4/021* (2013.01); *G06Q 30/0204* (2013.01); *H04W 12/02* (2013.01); *H04W 12/033* (2021.01)

(58) Field of Classification Search
CPC ... H04W 4/021; H04W 12/02; H04W 12/033; H04W 12/06; H04W 4/70; G06Q 30/0204
See application file for complete search history.

(56) References Cited

U.S. PATENT DOCUMENTS

| | | | |
|---|---|---|---|
| 9,094,140 B2 | 7/2015 | Tidwell et al. | |
| 2009/0265788 A1 | 10/2009 | Ehrenschwender et al. | |
| 2012/0084153 A1 | 4/2012 | Moreau et al. | |
| 2013/0268357 A1* | 10/2013 | Heath | G06Q 10/40 726/26 |

(Continued)

FOREIGN PATENT DOCUMENTS

| | | |
|---|---|---|
| AU | 2018203925 A1 | 6/2018 |
| CN | 106954182 A | 7/2017 |

OTHER PUBLICATIONS

Sinnot, Richard O. et al. "Privacy-preserving Data Linkage through Blind Geo-spatial Data Aggregation", 2015 IEEE 17th International Conference, pp. 1381-1386. (Year: 2015).*

(Continued)

*Primary Examiner* — Beth V Boswell
(74) *Attorney, Agent, or Firm* — Wolf IP Law PLCC; Dean E. Wolf, Esq.

(57) ABSTRACT

The present disclosure relates to techniques for determining insights from disparate data sets provided from multiple different data sources in a manner that complies with applicable privacy and data protection regulations. More particularly, the present disclosure relates to a computer-implemented privacy compliant data insights and audience activation platform incorporating data signals from various sources.

21 Claims, 62 Drawing Sheets
(44 of 62 Drawing Sheet(s) Filed in Color)

(56)  References Cited

U.S. PATENT DOCUMENTS

| | | | |
|---|---|---|---|
| 2014/0359782 A1* | 12/2014 | Golic | H04L 63/0407 |
| | | | 726/26 |
| 2016/0315925 A1* | 10/2016 | Lowenberg | H04L 63/0421 |
| 2017/0207916 A1* | 7/2017 | Luce | G06F 21/6254 |
| 2017/0279616 A1* | 9/2017 | Loeb | G06F 21/602 |
| 2019/0386969 A1 | 12/2019 | Verzun et al. | |
| 2020/0193057 A1* | 6/2020 | Yu | G06N 3/006 |
| 2020/0252762 A1* | 8/2020 | Gratton | H04W 4/021 |
| 2021/0319131 A1* | 10/2021 | Salomon | G06F 16/24528 |
| 2021/0383020 A1* | 12/2021 | Sofia | G06F 21/6254 |
| 2021/0406950 A1* | 12/2021 | Werner | H04L 63/045 |

OTHER PUBLICATIONS

International Search Report mailed Sep. 8, 2022 for PCT/US2022/072640 filed May 30, 2022, 3 pages.

* cited by examiner

| Region | Total Population | Mobile Penetration | Total Smartphone Uniques | Intuizi Identified Uniques[1] | Intuizi Identified Uniques[1] |
|---|---|---|---|---|---|
| United States | 329,000,000 | 79.1% | 260,239,000 | 90.0% | 234,215,100 |
| United Kingdom | 66,959,000 | 82.9% | 55,509,011 | 80.0% | 44,407,209 |
| Canada | 37,590,000 | 81.8% | 30,748,620 | 90.0% | 27,673,758 |
| Germany | 82,438,000 | 79.9% | 65,867,962 | 80.0% | 52,694,370 |
| France | 66,990,000 | 75.7% | 50,711,430 | 80.0% | 40,569,144 |
| Netherlands | 17,280,000 | 81.3% | 14,048,640 | 80.0% | 11,238,912 |
| Spain | 46,940,000 | 73.5% | 34,500,900 | 80.0% | 27,600,720 |
| Australia | 25,490,075 | 70.6% | 17,995,993 | 90.0% | 16,196,394 |
| Japan | 126,854,000 | 57.2% | 72,560,488 | 70.0% | 50,792,342 |
| Vietnam | 96,200,000 | 45.4% | 43,674,800 | 70.0% | 30,572,360 |
| China | 1,420,062,000 | 59.9% | 850,617,138 | 70.0% | 595,431,997 |
| Indonesia | 269,536,000 | 31.1% | 83,825,696 | 70.0% | 58,677,987 |
| Malaysia | 32,600,000 | 58.5% | 19,071,000 | 70.0% | 13,349,700 |

[1] Estimated once full data set is created

Fig. 9

Figure 12B:
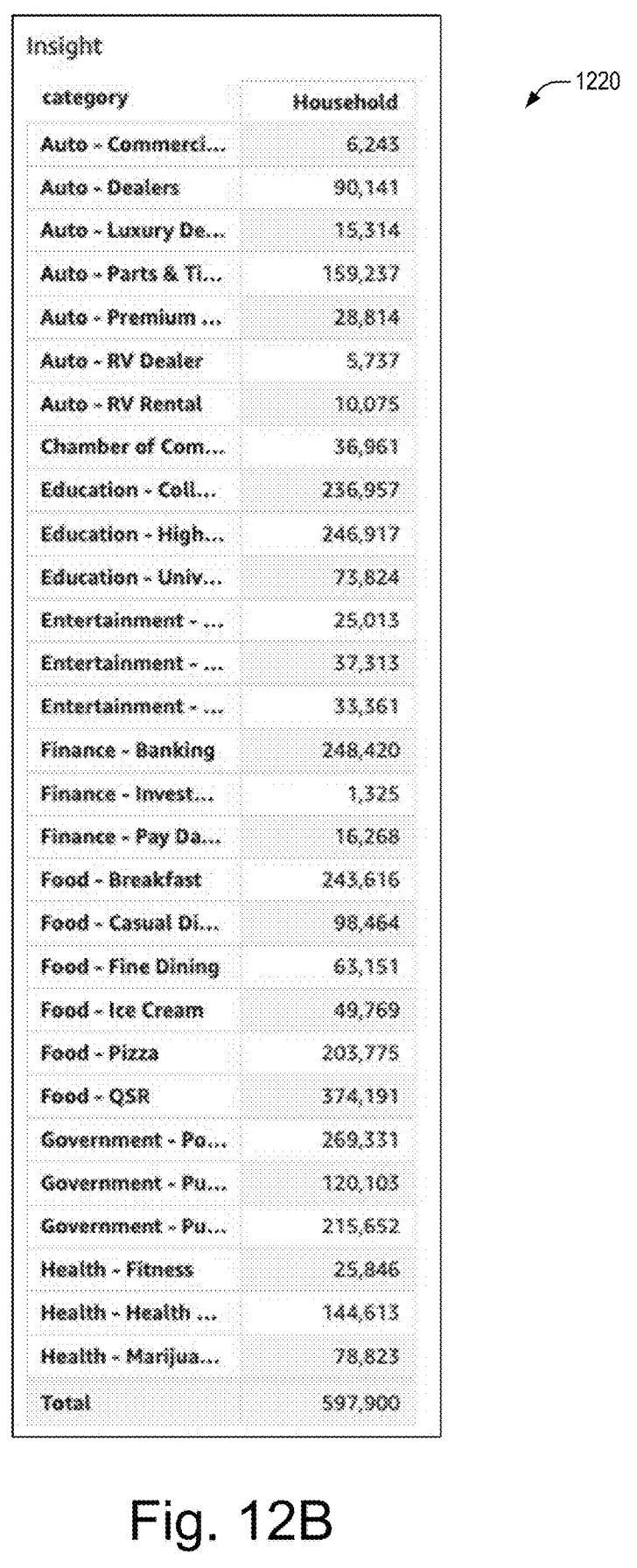

Insight

| category | Household |
|---|---|
| Auto - Commerci... | 6,243 |
| Auto - Dealers | 90,141 |
| Auto - Luxury De... | 15,314 |
| Auto - Parts & Ti... | 159,237 |
| Auto - Premium ... | 28,814 |
| Auto - RV Dealer | 5,737 |
| Auto - RV Rental | 10,075 |
| Chamber of Com... | 36,961 |
| Education - Coll... | 236,957 |
| Education - High... | 246,917 |
| Education - Univ... | 73,824 |
| Entertainment - ... | 25,013 |
| Entertainment - ... | 37,313 |
| Entertainment - ... | 33,361 |
| Finance - Banking | 248,420 |
| Finance - Invest... | 1,325 |
| Finance - Pay Da... | 16,268 |
| Food - Breakfast | 243,616 |
| Food - Casual Di... | 98,464 |
| Food - Fine Dining | 63,151 |
| Food - Ice Cream | 49,769 |
| Food - Pizza | 203,775 |
| Food - QSR | 374,191 |
| Government - Po... | 269,331 |
| Government - Pu... | 120,103 |
| Government - Pu... | 215,652 |
| Health - Fitness | 25,846 |
| Health - Health ... | 144,613 |
| Health - Marijua... | 78,823 |
| Total | 597,900 |

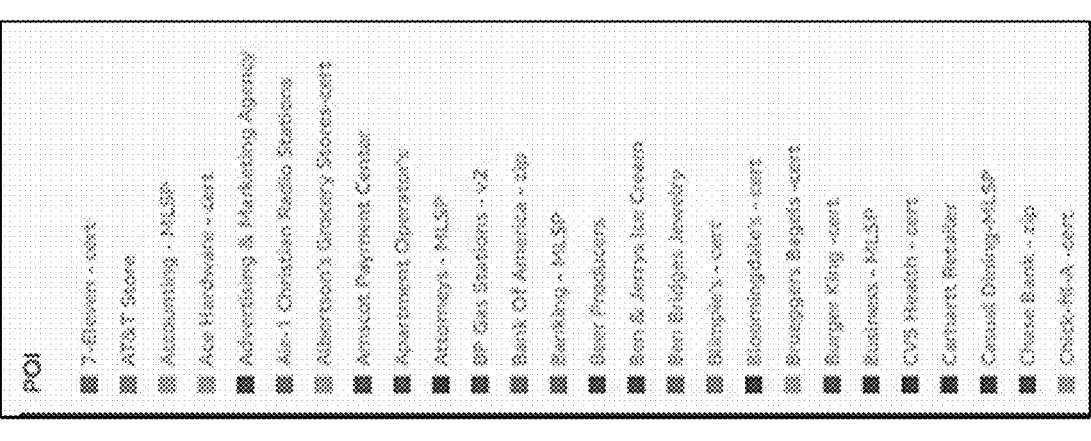
Fig. 13C
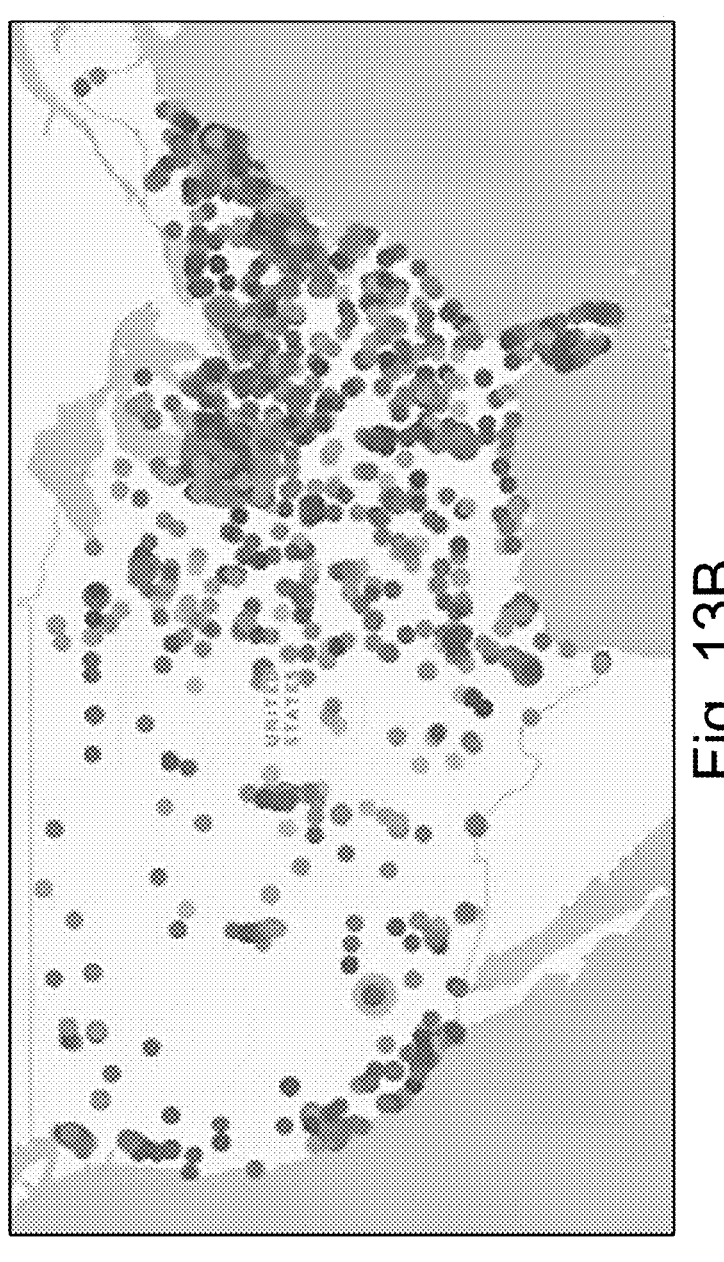
Fig. 13B

Ratio, Count of Eid, and Count distinct of Eid by Bundleid and Pubid

| pubid | bundleid | Signals | Uniques | Ratio |
|---|---|---|---|---|
| 310271 | com.amctve.amc... | 6 | 6 | 1 |
| | com.ceyflix.ceyfl... | 15 | 15 | 1 |
| | com.discovery.d... | 1 | 1 | 1 |
| | com.discovery.vet | 3 | 3 | 1 |
| | com.discovery.ve... | 1 | 1 | 1 |
| | com.diywatcher | 1 | 1 | 1 |
| | com.espn.score_... | 7 | 7 | 1 |
| | com.mtvn.vh1am... | 2 | 2 | 1 |
| | com.philo.philo.... | 1 | 1 | 1 |
| | com.philo.roku | 589 | 583 | 1.01029159... |
| | com.popcornflix.... | 481 | 481 | 1 |
| | com.roku.1920s... | 1 | 1 | 1 |
| | com.roku.247retro | 11 | 11 | 1 |
| | com.roku.7minw... | 28 | 28 | 1 |
| | com.roku.911gu... | 295 | 294 | 1.00340136... |
| | com.roku.Classic... | 33 | 33 | 1 |
| | com.roku.CrazyA... | 5 | 5 | 1 |
| | com.roku.DIYkids | 6 | 6 | 1 |
| | com.roku.Engine.... | 3 | 3 | 1 |

Fig. 15D

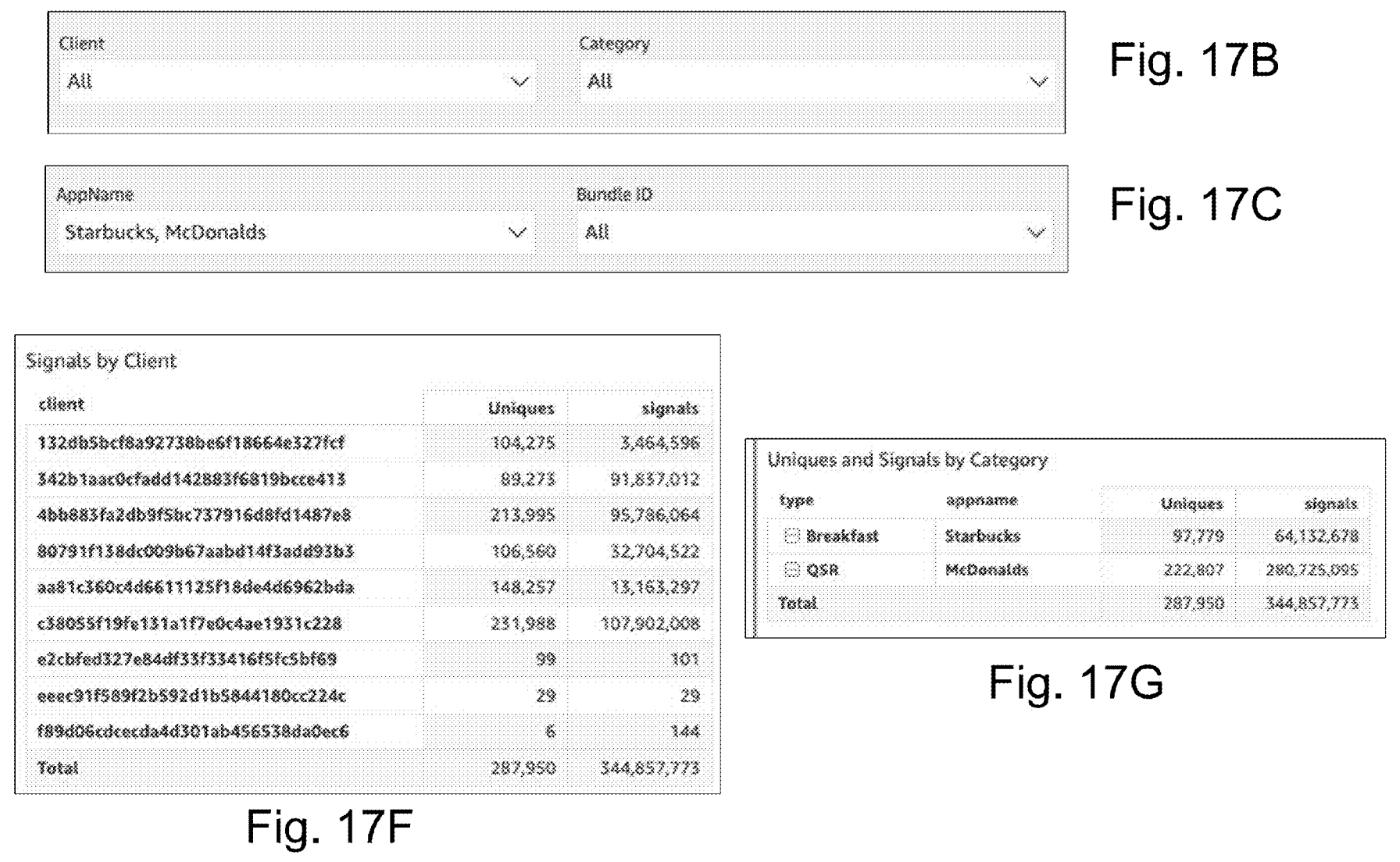

Client

| All | v |
|---|---|

Category

| All | v |
|---|---|

Fig. 17B

AppName

| Starbucks, McDonalds | v |
|---|---|

Bundle ID

| All | v |
|---|---|

Fig. 17C

Signals by Client

| client | Uniques | signals |
|---|---|---|
| 132db5bcf8a92730bd6f18664a6327fcf | 104,275 | 3,464,596 |
| 142b1aac0cfadd1428a3f681abcce413 | 89,273 | 91,857,012 |
| 4b8a85fa2db9f5bc7379f6d8fd14a7e8 | 213,995 | 85,786,064 |
| 8079f11386k0090067aaba1483add893b3 | 106,560 | 52,704,522 |
| aa81c3f60c4d66111125f18de4d696e2b4a | 148,257 | 13,163,297 |
| c3805ff19fe151a1f7e0c4ae1931c228 | 231,988 | 107,902,008 |
| e2cbfed327e84d6f35f334f695fc5bf69 | 99 | 101 |
| eeac91f5d9f2b592d1b5844186cc224c | 29 | 29 |
| f89d06edcecdaad4301ab456538da0ee6 | 6 | 144 |
| Total | 287,950 | 344,857,773 |

Fig. 17F

Uniques and Signals by Category

| type | appname | Uniques | signals |
|---|---|---|---|
| Breakfast | Starbucks | 97,779 | 64,132,678 |
| QSR | McDonalds | 222,807 | 280,725,095 |
| Total | | 287,950 | 344,857,773 |

Transactions and EIDs

| week | Brands | Transactions ($) | Transactions | Customers | Stores | Dollars per Store | EIDs | Deterministic |
|------|--------|------------------|--------------|-----------|--------|-------------------|------|---------------|
| Jan 2, 2022 | BURGER KING | $71,682,801 | 6,159,823 | 10,898,956 | 6,921 | $10,072.90 | 4,688,621 | 43.02% |
| | MCDONALD'S | $354,896,999 | 34,256,153 | 66,570,954 | 13,464 | $24,199.48 | 13,600,739 | 20.43% |
| Jan 9, 2022 | BURGER KING | $74,025,711 | 6,453,791 | 11,509,887 | 6,919 | $10,434.32 | 5,353,414 | 46.15% |
| | MCDONALD'S | $377,755,552 | 36,813,524 | 71,609,390 | 13,464 | $25,660.55 | 14,694,207 | 20.52% |
| Jan 16, 2022 | BURGER KING | $75,606,841 | 6,418,048 | 11,919,118 | 6,919 | $10,359.23 | 5,377,045 | 45.11% |
| | MCDONALD'S | $388,223,931 | 36,867,614 | 72,787,268 | 13,468 | $25,832.66 | 14,587,421 | 20.04% |
| Jan 23, 2022 | BURGER KING | $76,609,848 | 6,741,218 | 12,492,633 | 6,919 | $10,752.83 | 4,036,595 | 52.23% |
| | MCDONALD'S | $388,848,267 | 37,867,698 | 74,047,552 | 13,466 | $26,539.53 | 11,211,232 | 15.14% |
| Jan 30, 2022 | BURGER KING | $77,103,195 | 6,599,099 | 12,199,491 | 6,910 | $10,751.91 | 866,719 | 7.10% |
| | MCDONALD'S | $396,814,831 | 37,082,845 | 73,329,474 | 13,456 | $26,656.21 | 2,418,127 | 3.30% |
| Total | | $2,281,657,976 | 216,057,813 | 417,454,713 | 101,906 | $19,283.94 | 76,824,119 | 18.40% |

FIG. 20B

Example Audience Datafile A
Visitations Datastream

| provider | locationid | | address1 | city | state | dma | country | lat | lon | poi | category | visits |
|---|---|---|---|---|---|---|---|---|---|---|---|---|
| 132cb5bc8a92738be6f18664e327fcf | 702819 | 00:00.0 | 25336 MADISON AVE | MURRIETA | CA | N | USA | 33.55358 | -117.1958 | Shell Gas Stations - v2 | Shopping - Convenience Store | 3 |
| c38055f19fe131a1ff e0c4ae1931c228 | 399663 | 00:00.0 | N | EAST MEADOW | NY | NEW YORK | USA | 40.72388 | -73.54385 | Walgreens - cert | Shopping - Pharmacy | 23 |
| c38055f19fe131a1ff e0c4ae1931c228 | 592894 | 00:00.0 | N | GRANDVIEW | IN | EVANSVILLE | USA | 37.93386 | -86.98076 | Public Libraries - cert | Government - Public Libraries | 149 |
| c38055f19fe131a1ff e0c4ae1931c228 | 1046112 | 00:00.0 | 16232 FOOTHILL BLVD | FONTANA | CA | LOS ANGELES | USA | 34.1068879 | -117.4507936 | AT&T Store | Tech - Wireless | 22 |
| c38055f19fe131a1ff e0c4ae1931c228 | 452460 | 00:00.0 | 2200 N MAIN ST | HIGH POINT | NC | GREENSBORO-HIGH POINT-W | USA | 35.98411 | -80.02335 | Little Caesar's Pizza -cert | Food - Pizza | 48 |
| c38055f19fe131a1ff e0c4ae1931c228 | 591737 | 00:00.0 | N | CHISHOLM | MN | DULUTH-SUPERIOR | USA | 47.48946 | -92.88405 | Public Libraries - cert | Government - Public Libraries | 40 |
| 132cb5bc8a92738be6f18664e327fcf | 738858 | 00:00.0 | N | N | N | N | USA | 40.68417 | -111.8907 | Advertising & Marketing Ag | Misc- Business | 12 |
| 132cb5bc8a92738be6f18664e327fcf | 470720 | 00:00.0 | 9 WEST FRANKLIN AV | MINNEAPOLIS | MN | MINNEAPOLIS-ST. PAUL | USA | 44.9625 | -93.27831 | Jimmy John's -cert | Food - QSR | 27 |
| 4fbb883a2db9f5bc7379f6d8fd1487e8 | 586036 | 00:00.0 | N | MOSCOW | ID | SPOKANE | USA | 46.73344 | -116.9982 | Public Libraries - cert | Government - Public Libraries | 1003 |
| c38055f19fe131a1ff e0c4ae1931c228 | 254304 | 00:00.0 | N | NEW YORK | NY | NEW YORK | USA | 40.76233 | -73.98402 | Mega Church's 1k-10k Par | Lifestyle - Religious | 283 |
| c38055f19fe131a1ff e0c4ae1931c228 | 586829 | 00:00.0 | 302 MERCHANTS WAL | SUMMERSVILLE | WV | CHARLESTON-HUNTINGTON | USA | 38.30046 | -80.83437 | Applebee's - cert | Food - Casual Dining | 1185 |
| 132cb5bc8a92738be6f18664e327fcf | 577308 | 00:00.0 | N | ST. CHARLES | IA | DES MOINES-AMES | USA | 41.28833 | -93.80689 | Public Libraries - cert | Government - Public Libraries | 2 |
| c38055f19fe131a1ff e0c4ae1931c228 | 399279 | 00:00.0 | N | LINDEN | NJ | NEW YORK | USA | 40.63769 | -74.26344 | Walgreens - cert | Shopping - Pharmacy | 39 |
| c38055f19fe131a1ff e0c4ae1931c228 | 1040092 | 00:00.0 | 1206 JOHN HARDIN | JACKSONVILLE | AR | LITTLE ROCK-PINE BLUFF | USA | 34.8714774 | -92.1245129 | Cricket Wireless - PVT | Tech - Wireless | 337 |
| c38055f19fe131a1ff e0c4ae1931c228 | 697663 | 00:00.0 | 2260 W GLENDALE AV | PHOENIX | AZ | PHOENIX (PRESCOTT) | USA | 33.56792 | -112.075 | Veterinary - zip | Pets - Veterinary | 18 |

Fig. 28

Example Audience Datafile B
POI Datastream

| provider | category | poifriendly | storefrontid | addr ess1 | addr ess2 | city | state | zip_code | dma | country | lat | lon |
|---|---|---|---|---|---|---|---|---|---|---|---|---|
| 74626664ba4464264332a89416a6e54c4 | Shopping - Grocery | BJ Wholesale | 100550 | N | N | CAPECORAL | FL | 33909 | FT. MYERS-NAPLES | USA | 26.67156 | -81.93372 |
| 74626664ba4464264332a89416a6e54c4 | Shopping - Grocery | BJ Wholesale | 100551 | N | N | CORALSPRINGS | FL | 33071 | MIAMI-FT. LAUDERDALE | USA | 26.23907 | -80.24438 |
| 74626664ba4464264332a89416a6e54c4 | Shopping - Grocery | BJ Wholesale | 100552 | N | N | CLERMONT | FL | 34711 | ORLANDO-DAYTONA BEACH-MELB | USA | 28.53311 | -81.73299 |
| 74626664ba4464264332a89416a6e54c4 | Shopping - Grocery | BJ Wholesale | 100553 | N | N | CUTLERRIDGE | FL | 33189 | MIAMI-FT. LAUDERDALE | USA | 25.58937 | -80.35973 |
| 74626664ba4464264332a89416a6e54c4 | Shopping - Grocery | BJ Wholesale | 100554 | N | N | FORTMYERS | FL | 33966 | FT. MYERS-NAPLES | USA | 26.60971 | -81.81134 |
| 74626664ba4464264332a89416a6e54c4 | Shopping - Grocery | BJ Wholesale | 100555 | N | N | FORTLAUDERDALE | FL | 33309 | MIAMI-FT. LAUDERDALE | USA | 26.19 | -80.15414 |
| 74626664ba4464264332a89416a6e54c4 | Shopping - Grocery | BJ Wholesale | 100556 | N | N | HIALEAH | FL | 33012 | MIAMI-FT. LAUDERDALE | USA | 25.85994 | -80.32749 |
| 74626664ba4464264332a89416a6e54c4 | Shopping - Grocery | BJ Wholesale | 100557 | N | N | HIALEAH | FL | 33055 | MIAMI-FT. LAUDERDALE | USA | 25.93014 | -80.29363 |
| 74626664ba4464264332a89416a6e54c4 | Shopping - Grocery | BJ Wholesale | 100558 | N | N | HOLLYWOOD | FL | 33020 | MIAMI-FT. LAUDERDALE | USA | 26.0456 | -80.15979 |
| 74626664ba4464264332a89416a6e54c4 | Shopping - Grocery | BJ Wholesale | 100559 | N | N | HOMESTEAD | FL | 33090 | MIAMI-FT. LAUDERDALE | USA | 25.45399 | -80.49035 |
| 74626664ba4464264332a89416a6e54c4 | Shopping - Grocery | BJ Wholesale | 100560 | N | N | JACKSONVILLE | FL | 32217 | JACKSONVILLE | USA | 30.22597 | -81.589 |
| 74626664ba4464264332a89416a6e54c4 | Shopping - Grocery | BJ Wholesale | 100561 | N | N | JACKSONVILLE | FL | 32224 | JACKSONVILLE | USA | 30.31914 | -81.48917 |
| 74626664ba4464264332a89416a6e54c4 | Shopping - Grocery | BJ Wholesale | 100562 | N | N | JENSENBEACH | FL | 34991 | WEST PALM BEACH-FT. PIERCE | USA | 27.25477 | -80.27869 |
| 74626664ba4464264332a89416a6e54c4 | Shopping - Grocery | BJ Wholesale | 100563 | N | N | KENDALL | FL | 33173 | MIAMI-FT. LAUDERDALE | USA | 25.70332 | -80.38209 |
| 74626664ba4464264332a89416a6e54c4 | Shopping - Grocery | BJ Wholesale | 100564 | N | N | KISSIMMEE | FL | 34741 | ORLANDO-DAYTONA BEACH-MELB | USA | 28.34168 | -81.41553 |
| 74626664ba4464264332a89416a6e54c4 | Shopping - Grocery | BJ Wholesale | 100565 | N | N | MELBOURNE | FL | 32905 | ORLANDO-DAYTONA BEACH-MELB | USA | 28.03544 | -80.64032 |
| 74626664ba4464264332a89416a6e54c4 | Shopping - Grocery | BJ Wholesale | 100566 | N | N | MERRITTISLAND | FL | 32954 | ORLANDO-DAYTONA BEACH-MELB | USA | 28.36124 | -80.69158 |
| 74626664ba4464264332a89416a6e54c4 | Shopping - Grocery | BJ Wholesale | 100567 | N | N | MIAMI | FL | 33155 | MIAMI-FT. LAUDERDALE | USA | 25.74785 | -80.30992 |
| 74626664ba4464264332a89416a6e54c4 | Shopping - Grocery | BJ Wholesale | 100568 | N | N | MIAMI | FL | 33106 | MIAMI-FT. LAUDERDALE | USA | 25.68376 | -80.45754 |

Fig. 29 crossvisitation_634_TestAudience

| category | categoryid | poifriendly | poifriendlyid | dma_desc | visit |
|---|---|---|---|---|---|
| Airports | 80 | US Airports | 530 | LOS ANGELES | 13297 |
| Airports | 80 | US Airports | 530 | \N | 5755 |
| Airports | 80 | US Airports | 530 | SAN FRANCISCO-OAKLAND-SAN JOSE | 2744 |
| Airports | 80 | FBO - Fixed Base Operator Airports | 837 | LOS ANGELES | 1611 |
| Airports | 80 | US Airports | 530 | SACRAMENTO-STOCKTON-MODESTO | 1197 |
| Airports | 80 | US Airports | 530 | SEATTLE-TACOMA | 554 |
| Airports | 80 | FBO Private Airports - old | 302 | LOS ANGELES | 538 |
| Airports | 80 | FBO - Fixed Base Operator Airports | 837 | \N | 415 |
| Airports | 80 | US Airports | 530 | PHOENIX (PRESCOTT) | 373 |
| Airports | 80 | US Airports | 530 | SALT LAKE CITY | 324 |
| Airports | 80 | US Airports | 530 | SAN DIEGO | 242 |
| Airports | 80 | Top Private Jet Terminals USA | 876 | LOS ANGELES | 223 |
| Airports | 80 | US Airports | 530 | PORTLAND | 214 |
| Airports | 80 | US Airports | 530 | FRESNO-VISALIA | 188 |
| Airports | 80 | FBO - Fixed Base Operator Airports | 837 | SAN FRANCISCO-OAKLAND-SAN JOSE | 165 |
| Airports | 80 | FBO - Fixed Base Operator Airports | 837 | SACRAMENTO-STOCKTON-MODESTO | 159 |
| Airports | 80 | Major Airports - cert | 529 | \N | 142 |
| Airports | 80 | FBO - Fixed Base Operator Airports | 837 | SAN DIEGO | 134 |
| Airports | 80 | FBO - Fixed Base Operator Airports | 837 | BAKERSFIELD | 134 |
| Airports | 80 | FBO - Fixed Base Operator Airports | 837 | RENO | 97 |

Fig. 30 frequency_6

| visit | counts |
|---|---|
| 1 | 15818 |
| 2 | 7918 |
| 3 | 5012 |
| 4 | 3720 |
| 5 | 2698 |
| 6 | 2111 |
| 7 | 1661 |
| 8 | 1439 |
| 9 | 1056 |
| 10 | 921 |
| 11 | 747 |
| 12 | 648 |
| 13 | 507 |
| 14 | 430 |
| 15 | 322 |
| 16 | 106 |
| 17 | 14 |

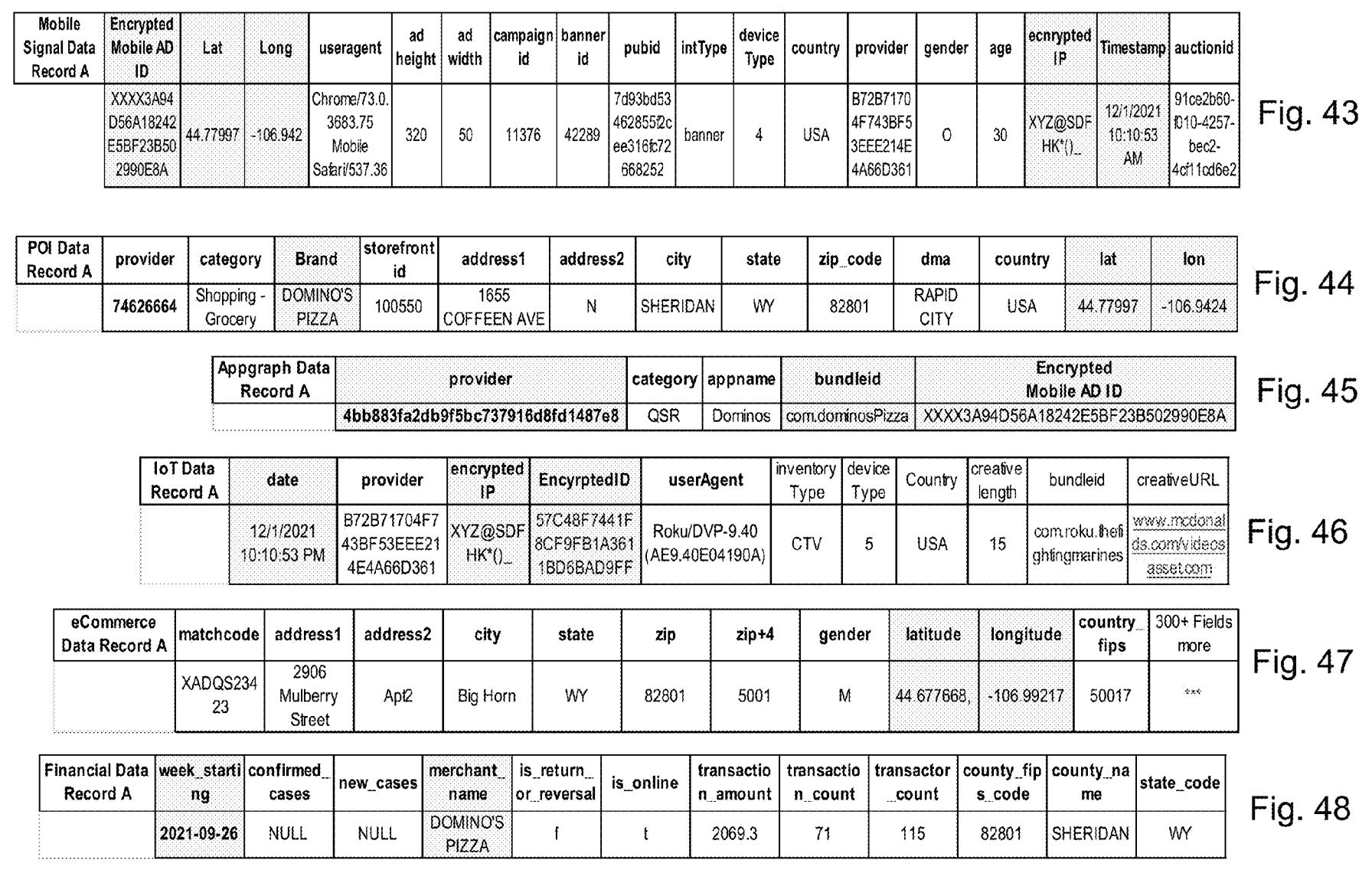

| Mobile Signal Data Record A | Encrypted Mobile AD ID | Lat | Long | useragent | ad height | ad width | campaign id | banner id | pubid | intType | device Type | country | provider | gender | age | ecrypted IP | Timestamp | auctionid |
|---|---|---|---|---|---|---|---|---|---|---|---|---|---|---|---|---|---|---|
| | XXXX3A94D56A18242E5BF23B502990E8A | 44.77997 | -106.942 | Chrome/73.0.3683.75 Mobile Safari/537.36 | 320 | 50 | 11376 | 42289 | 7d93bd53462855c2ee316b72668252 | banner | 4 | USA | B72B71704F743BF53EEE214E4A66D361 | 0 | 30 | XYZ@SDF HK*()_ | 12/1/2021 10:10:53 AM | 91ce2b60-f010-4257-bec2-4cf1cd6e2 |

Fig. 44

| POI Data Record A | provider | category | Brand | storefront id | address1 | address2 | city | state | zip_code | dma | country | lat | lon |
|---|---|---|---|---|---|---|---|---|---|---|---|---|---|
| | 74626664 | Shopping - Grocery | DOMINO'S PIZZA | 100550 | 1655 COFFEEN AVE | N | SHERIDAN | WY | 82801 | RAPID CITY | USA | 44.77997 | -106.9424 |

Fig. 45

| Appgraph Data Record A | provider | bundleid | category | appname | Encrypted Mobile AD ID |
|---|---|---|---|---|---|
| | 4bb883fa2db9f5bc73791 6d8fd1487e8 | com.dominosPizza | QSR | Dominos | XXXX3A94D56A18242E5BF23B502990E8A |

Fig. 46

| IoT Data Record A | date | provider | encrypted IP | EncryptedID | userAgent | inventory Type | device Type | Country | creative length | bundleid | creativeURL |
|---|---|---|---|---|---|---|---|---|---|---|---|
| | 12/1/2021 10:10:53 PM | B72B71704F7 43BF53EEE21 4E4A66D361 | XYZ@SDF HK*()_ | 57C48F7441F 8CF9FB1A361 1BD6BAD9FF | Roku/DVP-9.40 (AE9.40E04190A) | CTV | 5 | USA | 15 | com.roku.thefi ghfirgmarines | www.mcdonal ds.com/videos /asset.com |

Fig. 47

| eCommerce Data Record A | matchcode | address1 | address2 | city | state | zip | zip+4 | gender | latitude | longitude | country_fips | 300+ Fields |
|---|---|---|---|---|---|---|---|---|---|---|---|---|
| | XADQS234 23 | 2906 Mulberry Street | Apt2 | Big Horn | WY | 82801 | 5001 | M | 44.677668 | -106.99217 | 50017 | more |
| | | | | | | | | | | | | *** |

Fig. 48

| Financial Data Record A | week_starti ng | confirmed_ cases | new_cases | merchant_ name | is_return_ or_reversal | is_online | transactio n_amount | transactio n_count | transactor _count | county_fip s_code | county_na me | state_code |
|---|---|---|---|---|---|---|---|---|---|---|---|---|---|
| | 2021-09-26 | NULL | NULL | DOMINO'S PIZZA | f | t | 2069.3 | 71 | 115 | 82801 | SHERIDAN | WY |

PRIVACY COMPLIANT INSIGHTS PLATFORM INCORPORATING DATA SIGNALS FROM VARIOUS SOURCES

RELATED APPLICATION DATA

The present application claims benefit, pursuant to the provisions of 35 U.S.C. § 119, of U.S. Provisional Application Ser. No. 63,194,907, titled "PRIVACY COMPLIANT INSIGHTS PLATFORM INCORPORATING DATA SIGNALS FROM VARIOUS SOURCES", naming Donaire et al. as inventors, and filed 28 May 2021, the entirety of which is incorporated herein by reference for all purposes.

BACKGROUND

The present disclosure relates to techniques for determining insights from disparate data sets provided from multiple different data sources in a manner that complies with applicable privacy and data protection regulations. More particularly, the present disclosure relates to a computer-implemented privacy compliant data insights and audience activation platform incorporating data signals from various sources.

Brands are drowning in data from a myriad of providers with solutions that require them to be systems integrators instead of marketers. Siloed solutions are inefficient, costly and yield results that may mask underlying problems and/or inefficiencies. Additionally, web browser cookies, the primary marketing data origination method for publishers, brands and agencies, are going away. This has a huge, disruptive impact on existing solutions. The world is migrating more and more to mobile applications and devices, and traditional cookie-based digital data methods have not adjusted. They're increasingly ineffective, inaccurate, fraudulent, and wasteful. Brands are seeking better, quicker, and more actionable information that may require no cookies.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 shows an example embodiment of a portion of a global Signals datastream.

FIGS. 12B-12D show more detailed views of identified portions of the example GUI illustrated in FIG. 12A.

FIGS. 13B, 13C show more detailed views of identified portions of the example GUI illustrated in FIG. 13A.

FIGS. 15B-15E show more detailed views of identified portions of the example GUI illustrated in FIG. 15A.

FIGS. 17B-17G show more detailed views of identified portions of the example GUI illustrated in FIG. 17A.

FIGS. 18B-18D show more detailed views of identified portions of the example GUI illustrated in FIG. 18A.

FIGS. 20A-B show example screenshots of interactive Aggregate Transaction GUI portions.

FIGS. 28-31 illustrate example portions of different customized Audience Data files or customized Audience Datasets.

FIG. 32 shows an example screenshot of an interactive Activation Scheduler Management GUI in accordance with a specific embodiment.

FIG. 33 shows an example screenshot of an interactive Activations History GUI in accordance with a specific embodiment.

Figure 39:
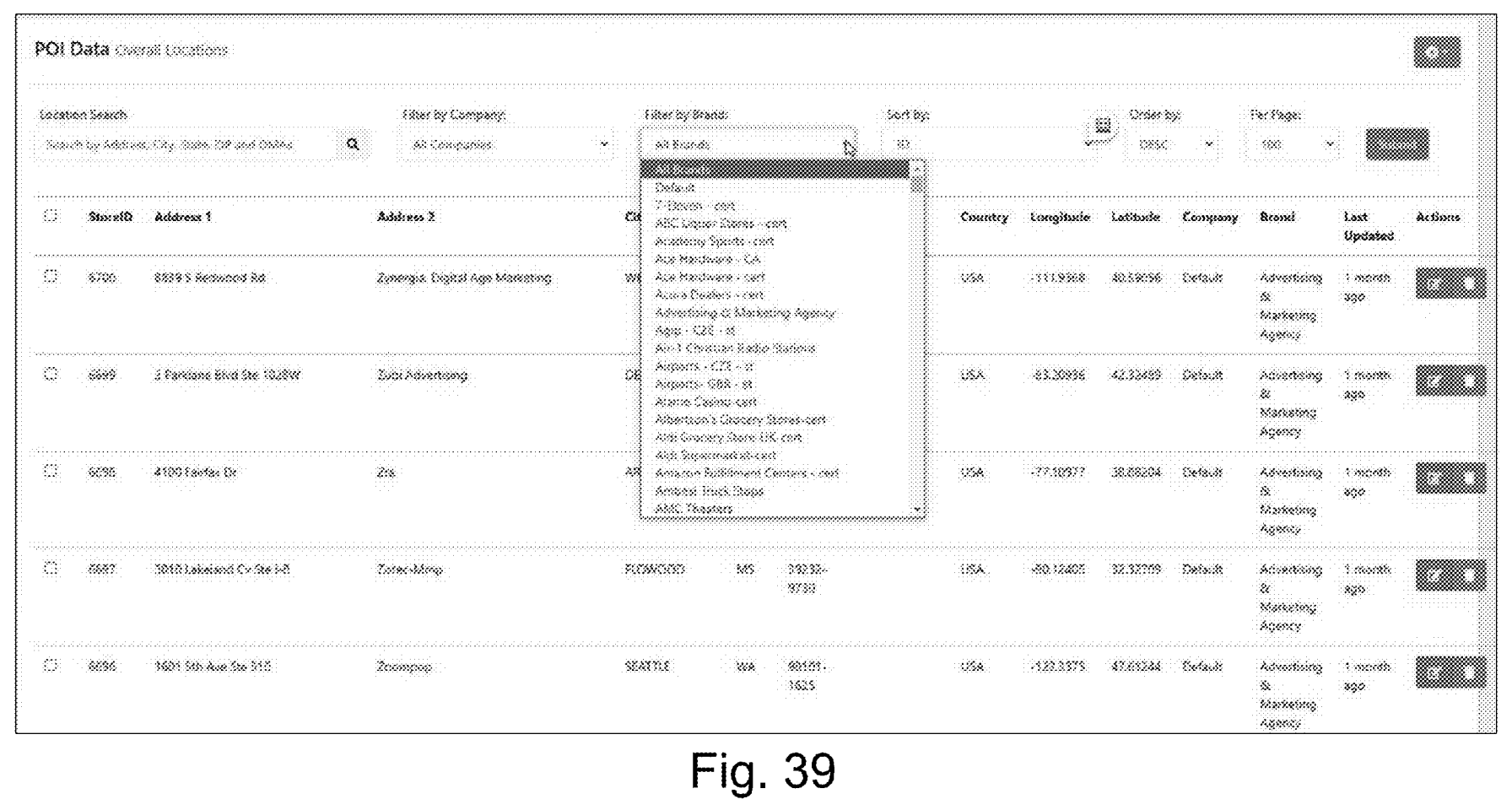

FIGS. 34-42 illustrate example screenshots of various GUIs which may be used for facilitating activities relating to one or more of the Intuizi System aspects disclosed herein.

FIG. 43 shows a simplified illustrative example of a Mobile Signal data record.

FIG. 44 shows a simplified illustrative example of a POI data record.

FIG. 45 shows a simplified an illustrative example of an Appgraph data record.

FIG. 46 shows a simplified illustrative example of a IoT data record.

FIG. 47 shows a simplified illustrative example of an eCommerce data record.

FIG. 48 shows a simplified illustrative example of a Financial data record.

DETAILED DESCRIPTION OF EXAMPLE EMBODIMENTS

Overview

Figure 1:
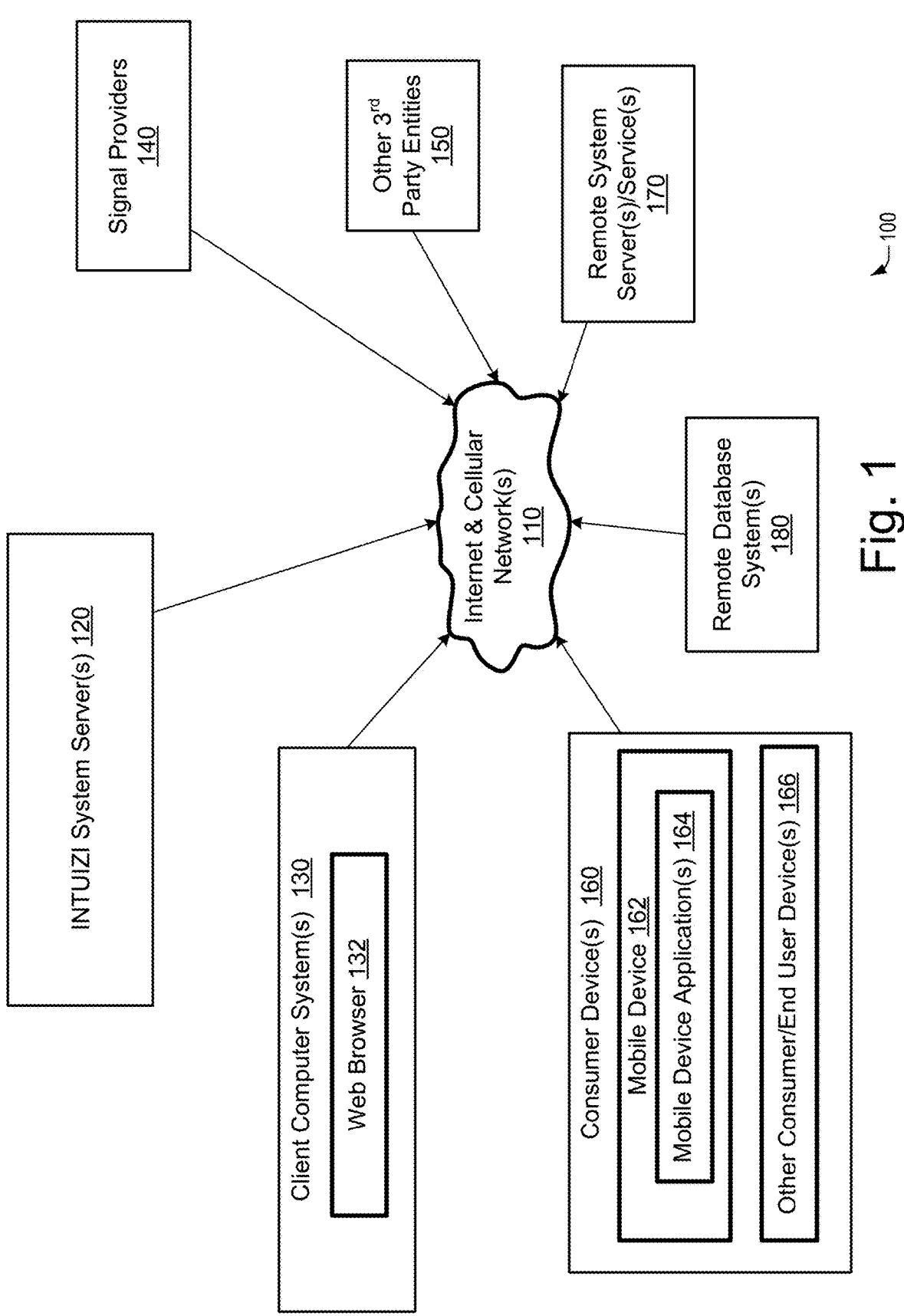
FIG. 1 illustrates a simplified block diagram of a specific example embodiment of an Intuizi System 100 which may be implemented via a computerized data network.

Various aspects described or referenced herein are directed to different methods, systems, and computer program products for providing a computer-implemented privacy compliant data insights and audience activation platform incorporating data signals from various sources.

According to various embodiments described herein, the Intuizi Consumer Behavioral Insights Platform (herein "Intuizi Platform" or "Intuizi System") is a SaaS platform which is configured or designed to graphically present encrypted anonymous data from multiple different signal providers in an easy to use GUIs environment for the purpose of better understanding audiences and opportunities for businesses, brands, agencies and government clients. Signal data is aggregated from a plurality of different signal providers, and is de-identified or pseudonymized prior to utilization by the Intuizi Platform.

In at least one embodiment, the Intuizi Platform is configured or designed to automatically de-identify and/or pseudonymize all personally identifiable information and consumer information and therefore removes all data that can be used to identify a particular person or consumer. In at least one embodiment, no personally identifiable information is stored on the Intuizi Platform. This helps to ensure that the Intuizi Platform is operating in compliance with all GDPR, CCPA/CPRA and/or other privacy laws and regulations.

According to different embodiments, the Intuizi Platform may be configured, designed, and/or operable to provide a number of different advantages and/or benefits and/or may be operable to initiate, and/or enable various different types of operations, functionalities, and/or features, such as, for example, one or more of the following (or combinations thereof):

Providing a computerized platform for implementing consumer behavioral analysis & actionable insights.

Using real-time smartphone signals to materially improve marketing, customer service, and business outcomes.

Providing a computerized platform for implementing consumer behavioral analysis & actionable insights, the platform being configured or designed to:

Identify virtually all active unique devices connected to one or more wide area networks.

Acquire data relating to $1^{st}$ party device (e.g., smartphone or other smart consumer device) signals to create a robust mobile device-sourced database.

Synthesize acquired device signals to discover unique, fast, accurate, and actionable marketing intelligence for brands.

Quantify real-time in-person & on-line retail visitation and lifestyle activities using acquired device signal data.

Deliver iterative, organic analyses & insights for actionable, predictive, & attributable outcomes.

Simplify the digital analytics process with direct linkage to marketing execution.

Create audiences for use in addressable 1:1 marketing campaigns at scale.

Aggregate signal data from a plurality of different signal providers, including, but not limited to, one or more of the following (or combinations thereof): different in-app publishers and 1st party data of their devices, content publishers, signal providers, in-app platforms, etc.

Automatically and dynamically anonymizing PII portions of aggregated signal data to ensure that the Intuizi Platform is operating in compliance with all GDPR, CCPA/CPRA and/or other privacy laws and regulations.

Encryption keys are retained only by the signal provider(s), and encryption keys are not exposed to Intuizi Platform component(s).

All consumer-sourced data is de-identified prior to entering the Intuizi platform, and can't be re-identified other than by the data owner.

All non-consumer data on the platform is created by Intuizi from publicly known information or licensed for such use from reputable sources pursuant to written agreements.

Providing a computerized platform for implementing consumer behavioral analysis & actionable insights and which is configured or designed to ingest/process/analyze extremely large amounts of complex, accurate data in real-time, with high speed.

Providing a computerized platform for implementing consumer behavioral analysis & actionable insights and which is configured or designed to analyze & visualize billions of data points daily to produce highly-predictive, real-time behavioral insights from the synthesis of signal data (aggregated from multiple different signal providers), including, for example, one or more of the following (or combinations thereof):

Geo-migration;

Trading area accessibility;

Points of interest;

Retail visitation patterns;

Share of app downloads per device;

Digital content consumption;

and/or other data patterns.

Providing a computerized platform which facilitates identification of some or all active mobile devices and their visits to brick & mortar stores and physical geographic trading areas.

Providing a computerized platform which dynamically generates customized graphical user interfaces (GUIs) for facilitating analysis and understanding of consumer app engagement and lifestyle activities. In at least some embodiments, the signal data presented in one or more GUIs may include aggregated signal data from multiple different signal providers, which may be presented concurrently or simultaneously in a common GUI.

Providing a computerized platform configured or designed to enable Intuizi customers to segment their stores based on relevant "competitor peer groups".

Providing a computerized platform which facilitates identification of strategic opportunities for conquest, loyalty, partnerships and other initiatives.

Providing a computerized platform which facilitates creation of addressable audiences who are geo-qualified and category users.

Providing a computerized platform which facilitates targeting of 1:1 addressable device campaigns in critical mass, with direct attribution.

Providing a computerized platform which facilitates exploration paths that are cost prohibitive to other solutions, in a proprietary process that identifies unique, deep, actionable insights.

Providing a computerized platform which facilitates consent transactions between the Signal Provider (consent owner) and Signal Activator.

Providing a computerized platform in which Signal Provider inventory is activatable on Signal Provider's inventory, and where user consent can flow from the user to the Signal Provider to the Signal Activator.

Providing a computerized platform which enables Intuizi clients to see a slice of market activity in real-time, point-in-time and time-lapse over a long period of time for the purpose of making better business and marketing decisions.

Providing a computerized platform which enables Intuizi clients to look at day part occasions to see market activity in real-time, point-in-time and time-lapse over a long period of time.

Providing a computerized platform which enables Intuizi clients to compare their location to peer group locations by Country, State, DMA, City, Zip and see market activity in real-time, point-in-time and time lapse over a long period of time.

Providing a computerized platform which enables Intuizi clients to compare cross visitation of their location to competitors' locations or any specified group locations by Country, State, DMA, City, Zip and see market activity in real-time, point-in-time and time-lapse over a long period of time.

Providing a computerized platform which enables Intuizi clients to compare IP analysis of their customers location to understand whether the PII anonymized customer is at work, home, play or somewhere else allowing for market analysis in real-time, point-in-time and time-lapse over a long period of time.

Acquiring RW metadata (e.g., physical address) associated with anon encrypted ID, then using that physical address to acquire purchasing/shipping data associate with physical address.

Ex. MD tracked to physical address

Identify locations where MD goes to repeatedly (e.g., home address)

Identify other devices at physical address
e.g., using IP address, time

Create associations between identified devices.
e.g., Roku owner goes to Starbucks 3×/wk Activation Changes
Recurrence Feature to run predefined queries on periodic basis
Rework PDF Pages 32-36

Demographics
Filter by demographic traits BOOLEAN
Include new Demographic GUIs
Display actual address+Encrypted identifiers associated with address Transactions
Aggregated CC trxns filterable by
geolocation
brand Neural Network GUIs Example Benefits/Advantages/Features of the Intuizi Platform One noted feature and benefit of the Intuizi Platform is that it has been specifically configured or designed to address and solve new problems faced by advertisers and digital media companies which have been created as a result of new privacy and data protection legislation going into effect in Europe (GDPR) and California (CCPA/CPRA). The new privacy and data laws, and Apple, Inc., require publishers to obtain expressed, freely given, informed consent from end-users before obtaining and/or using certain types of information. However, GDPR and CCPA/CPRA do not apply to PII anonymized data. PII anonymized data is data that has been "de-identified" (as that term is defined in the CCPA/CPRA) or "pseudonymized" (as that term is defined in the GDPR). It may also be referred to herein as "PII anonymized" data. Both laws require that anonymous data is not re-identifiable by third parties. The Intuizi System complies with these laws in a novel, non-obvious and useful manner in order to allow the anonymous data to be useful to third parties and addressable.

The Intuizi Platform enables customers to identify virtually all active mobile devices and their visits to each of various stores, competitor stores and local trading areas.

The Intuizi Platform enables customers to understand corresponding app engagement and lifestyle activities.

The Intuizi Platform enables customers to segment their stores based on relevant "competitor peer groups".

The Intuizi Platform enables customers to identify strategic opportunities for conquest, loyalty, partnerships and other initiatives.

The Intuizi Platform enables customers to create addressable audiences who are geo-qualified AND category users.

The Intuizi Platform enables customers to target these devices for 1:1 addressable campaigns in critical mass, with direct attribution.

The Intuizi Platform's proprietary cloud software/process produces significantly faster speed at significantly lower costs when compared other common cloud solutions.

The Intuizi Platform enables customers to explore paths that are cost prohibitive to other solutions, in a proprietary process that identifies unique, deep, actionable insights.

The Intuizi Platform is scalable, reliable, fast and cost effective.

The Intuizi Platform supports all stages of analytics/execution, or modular needs.

The Intuizi Platform enables small businesses and brands to learn about their customers, competitors, and marketing impacts by turning real-time consented data into actionable insights, and thereby super charging their physical stores with the same metrics as online analytics.

The Intuizi Platform provides clients direct feedback on where their current or future customers are visiting.

The Intuizi Platform cost effectively analyzes billions of data points daily to produce highly-predictive, real-time behavioral insights.

The Intuizi Platform allows for franchisee empowerment to get better control over information flow from a franchisor by understanding highly-predictive, real-time behavioral, traffic flow, footfall, ad spend, weather effect, transaction data and other insights in their specific location's trading area.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that may be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Additionally, it will be appreciated that, via the use of specifically configured computer hardware and software, the problems which are solved and/or overcome by the various Intuizi techniques described herein are necessarily rooted in computer technology in order to overcome problems specifically arising in the realm of computer networks. For example, as described previously, numerous problems and limitations are typically encountered when attempting to use conventional consumer behavior analysis systems to implement consumer behavioral insights utilizing consumer device signal data. Such problems and limitations specifically arise in the realm of computer networks, and the solutions to these consumer behavior analysis environment problems and limitations (e.g., as described herein) are necessarily rooted in computer technology.

FIG. 1 illustrates a simplified block diagram of a specific example embodiment of an Intuizi System 100 which may be implemented via a computerized data network. As described in greater detail herein, different embodiments of Intuizi Systems may be configured, designed, and/or operable to provide various different types of operations, functionalities, and/or features generally relating to Intuizi System technology. Further, as described in greater detail herein, many of the various operations, functionalities, and/or features of the Intuizi System(s) disclosed herein may provide may enable or provide different types of advantages and/or benefits to different entities interacting with the Intuizi System(s).

According to different embodiments, at least some Intuizi System(s) may be configured, designed, and/or operable to provide a number of different advantages and/or benefits and/or may be operable to initiate, and/or enable various different types of operations, functionalities, and/or features, such as, for example, one or more of those described and/or referenced herein.

According to different embodiments, at least some Intuizi System(s) may be configured, designed, and/or operable to provide a number of different advantages and/or benefits and/or may be operable to initiate, and/or enable various different types of operations, functionalities, and/or features, such as, for example, one or more of those described above with respect to the Intuizi Platform.

According to different embodiments, at least a portion of the various functions, actions, operations, and activities performed by one or more component(s) of the Intuizi System may be initiated in response to detection of one or more conditions, events, and/or other criteria satisfying one or more different types of minimum threshold criteria, such as, for example, one or more of those described and/or referenced herein (and/or combinations thereof).

According to different embodiments, at least a portion of the various types of functions, operations, actions, and/or other features provided by the Intuizi System may be implemented at one or more client systems(s), at one or more System Servers (s), and/or combinations thereof.

According to different embodiments, the Intuizi System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Intuizi System may include one or more types of systems, components, devices, processes, etc. (or combinations thereof) described and/or referenced herein.

According to different embodiments, the Intuizi System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Intuizi System may include one or more of the following types of systems, components, devices, processes, etc. (or combinations thereof):

Intuizi System Server(s) 120—In at least one embodiment, the Intuizi System Server(s) may be operable to perform and/or implement various types of functions, operations, actions, and/or other features such as those described or referenced herein, including, but not limited to:

Data Ingestion and analysis of various types of consumer device signal data such as, for example:

Location data

POI data

App download data

Publisher data

Media consumption data etc.

Behavioral Insights & Audience Analysis, including, for example:

Location scoring

Migration pattern analysis

Client & competitor customer visit analysis

App analysis/graphing

ROI/impact analysis/attribution etc.

Signal Provider System(s) 140—In at least one embodiment, a Signal Provider may correspond to an entity which provides or produces products and/or services for consumers, such as, for example: cellular network carriers, electronic consumer device manufacturers, automobile manufacturers, Internet service providers, cable TV service providers, software application developers, and/or other entities which provide devices or services to consumers.

Client Computer System (s) 130

$3^{rd}$ Party System(s) 150

Internet & Cellular Network(s) 110

Remote Database System(s)180

Remote System Server(s)/Service(s)170, which, for example, may include, but are not limited to, one or more of the following (or combinations thereof):

Content provider servers/services

Media Streaming servers/services

Database storage/access/query servers/services

Financial transaction servers/services

Payment gateway servers/services

Electronic commerce servers/services

Event management/scheduling servers/services

Etc.

Consumer Device(s) 160—In at least one embodiment, the Consumer Device(s) may include various types of electronic consumer devices which have some type of connectivity to the Internet, cellular networks, and/or other wide area network(s) (WANs). Examples of consumer devices may include, but are not limited to, one or more of the following: smart phones, motorized vehicles, set-top boxes, intelligent appliances, mobile devices, POS devices, etc. In at least one embodiment, a consumer device may be implemented as App running on a hardware device such as a smartphone, laptop, tablet, set top box, etc. In at least one embodiment, an App may correspond to a software application running on at least one remote network device, such as, for example:

One or more smart phones of $3^{rd}$ parties

Televisions, displays and digital media players

Home entertainment devices

Connected appliances

Smart home security systems

Smart home devices

Smart connected automobiles

Autonomous automobiles

Autonomous farming equipment

Wearable health monitors

Smart factory equipment

Wireless inventory trackers

Ultra-high speed wireless internet

Wireless networks

Biometric cybersecurity scanners

Shipping container and logistics tracking

Any device connected to any other device that emits a real-time signal or batched signal.

Etc.

In at least one embodiment, the Intuizi System may be operable to utilize and/or generate various different types of data and/or other types of information when performing specific tasks and/or operations. This may include, for example, input data/information and/or output data/information. For example, in at least one embodiment, the Intuizi System may be operable to access, process, and/or otherwise utilize information from one or more different types of sources, such as, for example, one or more local and/or remote memories, devices and/or systems. Additionally, in at least one embodiment, the Intuizi System may be operable to generate one or more different types of output data/information, which, for example, may be stored in memory of one or more local and/or remote devices and/or systems. Examples of different types of input data/information and/or output data/information which may be accessed and/or utilized by the Intuizi System may include, but are not limited to, one or more of those described and/or referenced herein.

According to specific embodiments, multiple instances or threads of the Intuizi System may be concurrently implemented and/or initiated via the use of one or more processors and/or other combinations of hardware and/or hardware and software. For example, in at least some embodiments, various aspects, features, and/or functionalities of the Intuizi System may be performed, implemented and/or initiated by one or more of the various systems, components, systems, devices, procedures, processes, etc., described and/or referenced herein.

In at least one embodiment, a given instance of the Intuizi System may access and/or utilize information from one or more associated databases. In at least one embodiment, at least a portion of the database information may be accessed via communication with one or more local and/or remote memory devices. Examples of different types of data which may be accessed by the Intuizi System may include, but are not limited to, one or more of those described and/or referenced herein.

According to different embodiments, various different types of encryption/decryption techniques may be used to facilitate secure communications between devices in Intuizi System(s) and/or Intuizi Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Intuizi System may be initiated in response to detection of one or more conditions or events satisfying one or more different types of minimum threshold criteria for triggering initiation of at least one instance of the Intuizi System. Various examples of conditions or events which may trigger initiation and/or implementation of one or more different threads or instances of the Intuizi System may include, but are not limited to, one or more of those described and/or referenced herein.

It will be appreciated that the Intuizi System of FIG. 1 is but one example from a wide range of Intuizi System embodiments which may be implemented. Other embodiments of the Intuizi System (not shown) may include additional, fewer and/or different components/features that those illustrated in the example Intuizi System embodiment of FIG. 1.

Generally, the Intuizi techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the Intuizi techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, System Servers, cloud computing systems, network devices, etc.

CCPA/CPRA and GDPR Privacy and Data Protection Law Compliance

One noted feature and benefit of the Intuizi System is that it has been specifically configured or designed to address and solve new problems faced by advertisers and digital media companies which have been created as a result of new privacy and data protection legislation going into effect in Europe (GDPR) and California (CCPA/CPRA). The new privacy laws, and Apple, Inc., require publishers to obtain expressed, freely given, informed consent from end-users before obtaining and/or using certain types of information. However, GDPR and CCPA/CPRA do not apply to PII anonymized data. PII anonymized data is data that has been "de-identified" (as that term is defined in the CCPA/CPRA) or "pseudonymized" (as that term is defined in the GDPR). Both laws require that anonymous data is not re-identifiable by third parties. The Intuizi System complies with these laws in a novel, non-obvious and useful manner in order to allow the anonymous data to be useful to third parties and addressable.

The General Data Protection Regulation (GDPR) is a regulation in EU law on data protection and privacy in the European Union (EU) and the European Economic Area (EEA). It also addresses the transfer of personal data outside the EU and EEA areas. The GDPR's primary aim is to give individuals control over their personal data and to simplify the regulatory environment for international business by unifying the regulation within the EU. The GDPR specifies that controllers and processors of personal data must put in place appropriate technical and organizational measures to implement the data protection principles. Business processes that handle personal data may be designed and built with consideration of the principles and provide safeguards to protect data (for example, using pseudonymization or full anonymization where appropriate). Data controllers must design information systems with privacy in mind. For instance, using the highest-possible privacy settings by default, so that the datasets are not publicly available by default and cannot be used to identify a subject. No personal data may be processed unless this processing is done under one of the six lawful bases specified by the regulation (consent, contract, public task, vital interest, legitimate interest or legal requirement). When the processing is based on consent the data subject has the right to revoke it at any time. Data controllers must clearly disclose any data collection, declare the lawful basis and purpose for data processing, and state how long data is being retained and if it is being shared with any third parties or outside of the EEA. Firms have the obligation to protect data of employees and consumers to the degree where only the necessary data is extracted with minimum interference with data privacy from employees, consumers, or third parties. Firms should have internal controls and regulations for various departments such as audit, internal controls, and operations. Data subjects have the right to request a portable copy of the data collected by a controller in a common format, as well as the right to have their data erased under certain circumstances. Public authorities, and businesses whose core activities consist of regular or systematic processing of personal data, are required to employ a data protection officer (DPO), who is responsible for managing compliance with the GDPR. Businesses must report data breaches to national supervisory authorities within 72 hours if they have an adverse effect on user privacy. The GDPR was adopted on 14 Apr. 2016, and became enforceable beginning 25 May 2018.

The California Consumer Privacy Act and the California Privacy Rights Act of 2020 (CCPA/CPRA) are state statutes intended to enhance privacy rights and consumer protection for residents of California, United States. This legislation creates significant new requirements for identifying, managing, securing, tracking, producing and deleting consumer privacy information. The Acts cover the Personal Information of all natural persons who are California Residents. The Acts define a "resident," as (1) every individual who is in the State for other than a temporary or transitory purpose, and (2) every individual who is domiciled in the State, but is outside the State for a temporary or transitory purpose. All other individuals are nonresidents. If an individual acquires the status of a resident by virtue of being physically present in the State for other than temporary or transitory purposes, this person remains a resident even though temporarily absent from California. If, however, this person leaves California for other than temporary or transitory purposes, this person is no longer considered a resident. The definition of the word "sell" for purposes of the CCPA/CPRA is broad and includes "selling, renting, releasing, disclosing, disseminating, making available, transferring, or otherwise communicating orally, in writing, or by electronic or other means, a consumer's personal information by the business to another business or third party for monetary or valuable consideration." Under this broad definition, the Acts apply to most personal data sharing by businesses, even if personal information is not explicitly sold. The CCPA/CPRA defines personal information extremely broadly as "information that identifies, relates to, describes, is capable of being associated with, or could reasonably be linked, directly or indirectly, with a particular consumer or household." In other words, the State recognizes a "broad list of characteristics and behaviors, personal and commercial, as well as inferences drawn from this information" that can be used to identify an individual.

Figure 2:
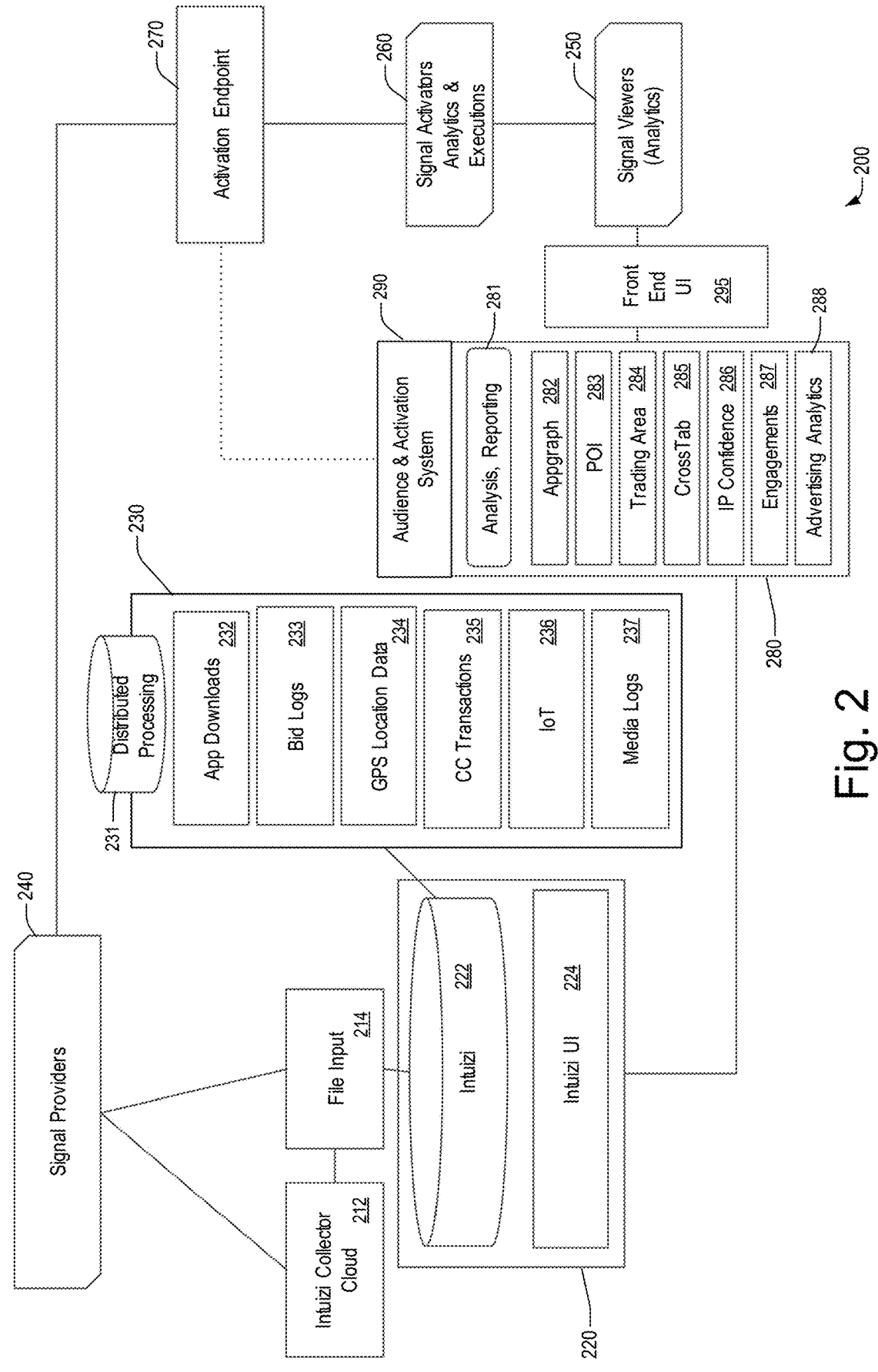
FIG. 2 illustrates an example portion 200 of an Intuizi System network architecture.

FIG. 2 illustrates an example portion 200 of a network architecture which may be configured or designed to facilitate, initiate and/or perform various operation(s) and/or action(s) relating to the Intuizi Technology such as, for example, one or more of the following (or combinations thereof):

Signal Providers 240 are able to insert first-party consented data in a de-identified or pseudonymized manner by utilizing web requests, Intuizi oRTB bid collection, bulk file uploads, or direct data lake access.

If the data arrives in an Intuizi Cloud Collector 212, the Intuizi software encrypts the PII and stores a key in a remote client repository for direct addressability by the client, out of reach of Intuizi's personnel. The encrypted data is stored in a S3 bucket or other database.

Alternatively, the signal provider can handle encryption on their end and place the encrypted, de-identified or pseudonymized data file 214 directly into an S3 bucket.

The Intuizi Analysis Engine 220 may be configured or designed to include functionality for loading the PII anonymized encrypted data from the S3 buckets into an Intuizi Database 222 and for splitting the files into digestible chunks The chunked files may be sent to the Intuizi Processing Cloud 230, a proprietary cloud of GPU enabled nodes 231 which may be distributed across different geographic regions. Each of those nodes runs through a series of bid data analysis, and may be configured or designed include functionality for identifying and/or processing one or more of the following (or combinations thereof): App Download Matches 232, GPS LAT/LON conversion to physical addresses 234, Bid data enrichment 233, Tokenized CC transactions 235, Weather Pattern Analysis, data relating to the Internet of Things (IoT) 236, Media consumption data 237, etc. In at least one embodiment, the Intuizi Processing Cloud 230 may be configured or designed to function as a neural network layer.

The Intuizi UI Console 224 may be configured or designed to include functionality for representing (e.g., via one or more GUIs and/or data files) some or all of the processed data via one or more interfaces. In at least some embodiments, at least a portion of the interfaces may be configured as branded interfaces, such as, for example, Intuizi Brand, White-labeled for an Intuizi client, etc.

According to different embodiments, the GUIs which are generated and displayed by the Intuizi System may include various types of content such as, for example, one or more of the following (and/or other content described herein): App Download history (e.g., app-graph) information 282, Point of Interest (e.g., how many devices in a building) information 283, Trading Area analysis information 284 (e.g., how many total devices in the area), CrossTab information 285 (e.g., how many devices have attribute A and Attribute B), IP Confidence information 286 (e.g., how often does this IP change), Engagement information 287 (e.g., how much interactivity and consumption on a particular advertisement), Advertising Analytics information 288 (e.g., how many devices received a particular message), etc.

Signal Viewers 250 may be provided with access (e.g., via at least one Front End UI 295) to selected portions of the reporting on the console. For example, in some embodiments, the Intuizi System is configured or designed to enable specific Signal Providers 240 to view or access only their respective data, while All Access customers (e.g., Signal Viewers 250) may be permitted to concurrently view or access (e.g., via one or more Intuizi GUIs) pseudonymous representations of all (or of multiple different) Signal Providers, either in real-time or non real-time.

Audience & Activation System 290 may be configured or designed to include functionality for creating, executing, viewing, and managing custom Audiences and Activations such as those described, for example, with respect to FIGS. 21A-33 of the drawings.

Signal Activators 260 may be configured or designed to include functionality for identifying specific de-identified or pseudonymous devices and for determining or identifying one or more entities that want to address those specific devices.

Figure 4:
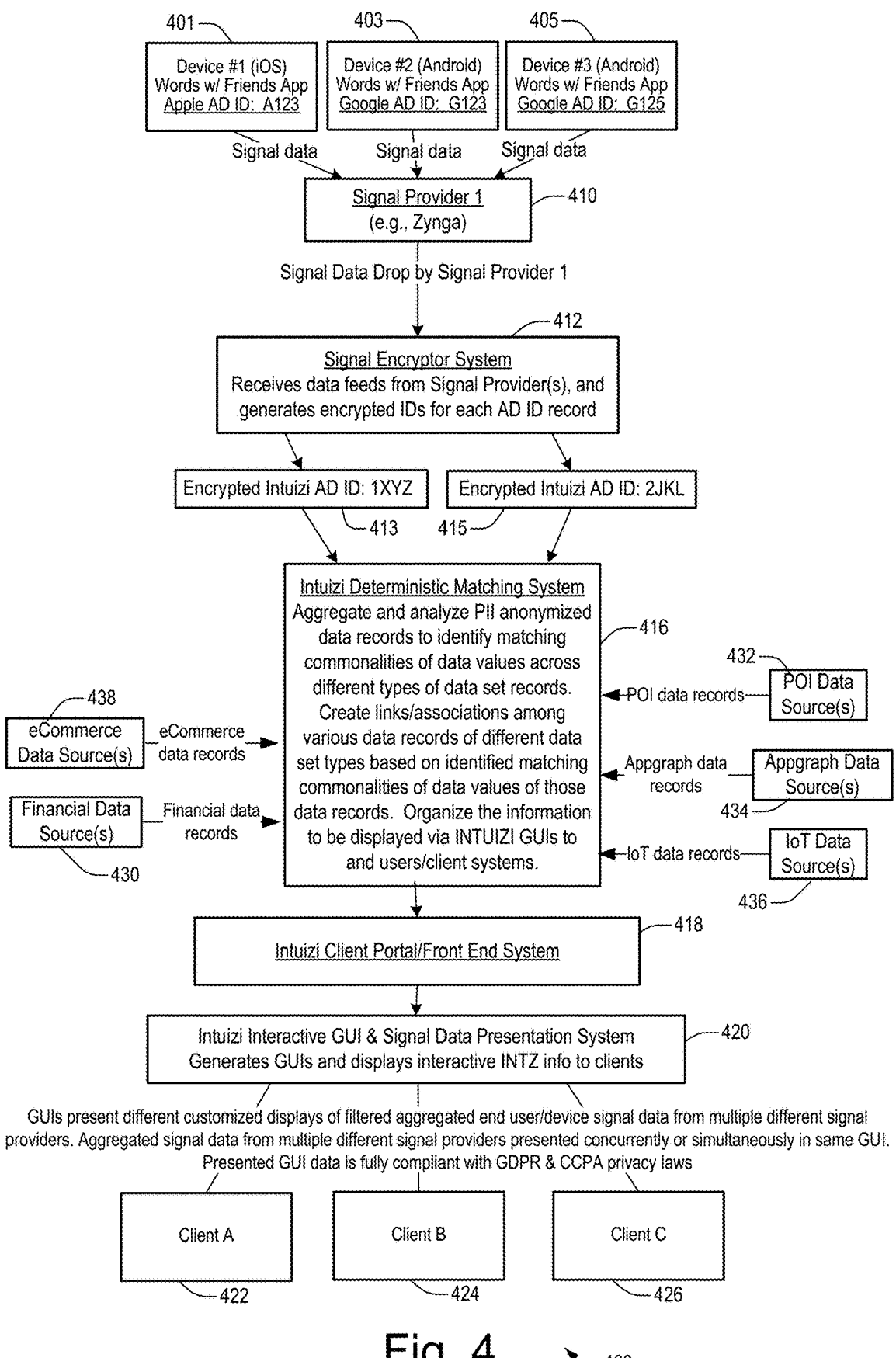
FIG. 4 illustrates an example flow of an Intuizi Signal Data Ingestion and Presentation Process 400 which is intended to help illustrate various aspects and features of the Intuizi System.

In at least one embodiment, activation occurs as described in FIG. 4.

Figure 3:
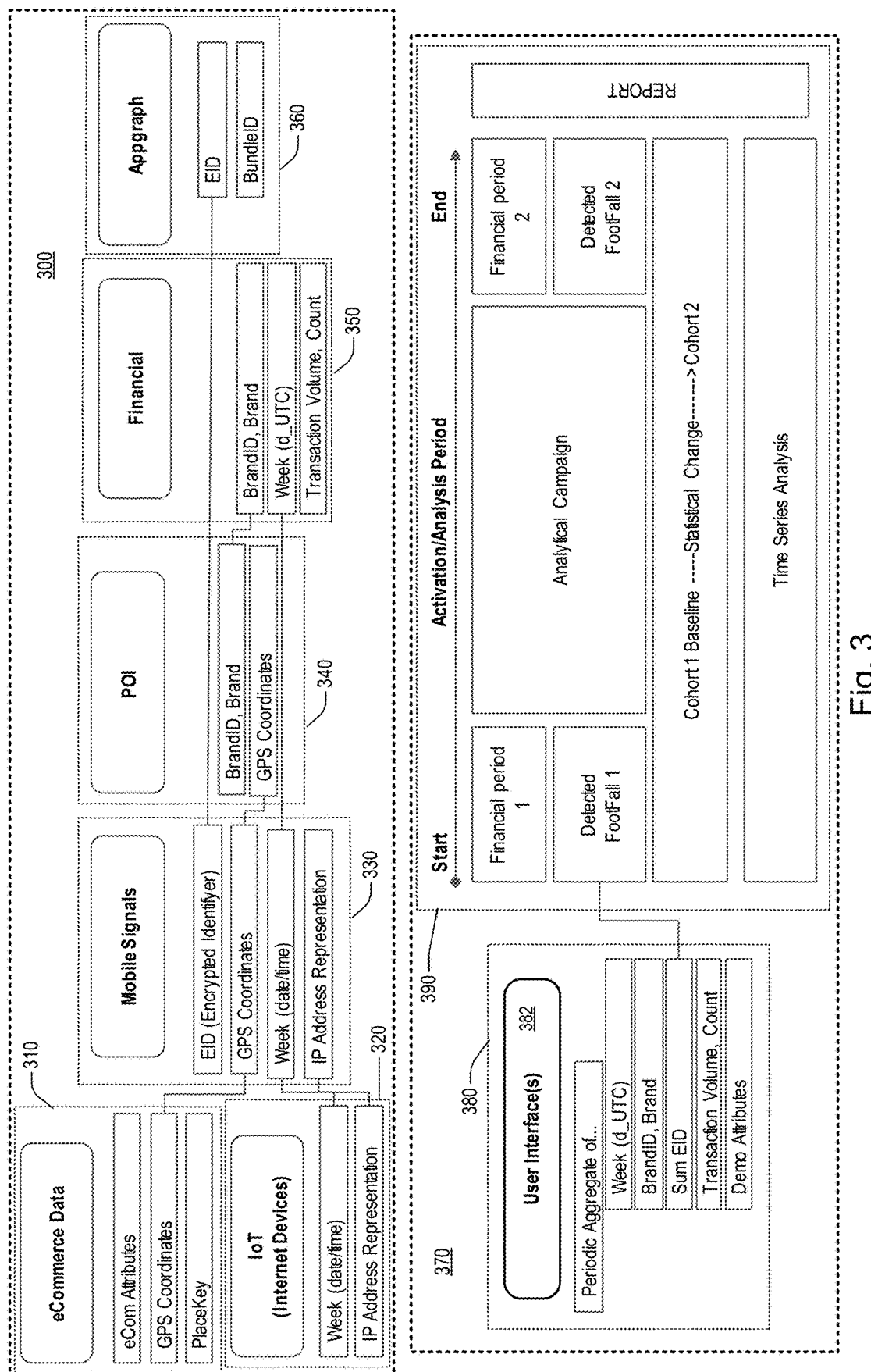
FIG. 3 shows a functional block representation of various hardware and/or software components which may be used to facilitate various Intuizi Signal Flow and Activation processes described herein.

FIG. 3 shows a functional block representation of various hardware and/or software components which may be used to facilitate various Intuizi Signal Flow and Activation processes described herein. More specifically, FIG. 3 shows a functional map of data keys and the association of different data sets and how they can be stacked together to facilitate queries across the different sets of data. The underlying data results can then be used, through graphical interfaces, a series of data steps to prepare the aggregation and comparison over a time series analysis and end presentation to a user.

As illustrated in the example embodiment of FIG. 3, the Intuizi System may include, but is not limited to, one or more of the following (or combinations thereof):

eCommerce data set 310 which is a historical aggregate categorical purchase history by GPS coordinates and place key, which can be linked to other data sets.

Mobile Signals Data set 330 which is a historical or real-time data set with anonymous persistent identifiers, gps coordinates, date timestamp, and an anonymous representation of IP address.

Internet of Things (IoT) data set 320 which can be any internet-connected device that has a semi-persistent representation of an IP Address and a date timestamp.

Point of Interest (PoI) data 340 set which has a representation of real-world locations defined by gps coordinates or geo-spatial polygons and categorized into a taxonomy to easily sort through Segments (e.g. Shopping), Categories (i.e grocery store), and Brand (e.g. Vons).

Aggregate financial data set 350 which has credit card transaction spend and credit card volume by brand (i.e Vons) aggregated by week.

Appgraph data set 360 which is historical download history with a representation of an encrypted first-party identifier, app name and app store BundleID.

User Interface components 380, where the results of a data set analysis and filtering is presented to end users via one or more GUIs. For example, utilizing data and signals relating to GPS coordinates from eCommerce, Mobile Signals, and POI in conjunction with the time of the financial data set, the Intuizi System may be configured or designed to generate and display aggregated summaries of various sets of such data and signals over one or more time periods. When doing this for two or more different periods of time, the Intuizi System may be configured or designed to automatically and/or dynamically execute analytical processing to determine if any relevant statistical change happened whether it be intentional (e.g. a marketing campaign) or un-intended (e.g. Covid Shutdowns).

FIG. 4 illustrates an example flow of an Intuizi Signal Data Ingestion and Presentation Process 400 which is intended to help illustrate various aspects and features of the Intuizi System.

In the specific example walk-through embodiment of FIG. 4, initial assumptions are as follows:

The data network includes three different consumer devices, namely smartphone devices #1, #2, and #3.

Smartphone device #1 (401):
iOS operating system
Words with Friends app installed on device
Developer of Words with Friends app is Zynga (Signal Provider 1)
Assigned Apple AD ID: A123
Owner of device has given consent to allow Words with Friends app to share device data (e.g., including device's geolocation data) for marketing purposes.

Smartphone device #2 (402):
Android operating system
Words with Friends app installed on device
Developer of Words with Friends app is Zynga Inc. (Signal Provider 1)
Assigned Google AD ID: G123
Owner of device has given consent to allow Words with Friends app to share device data (e.g., including device's geolocation data) for marketing purposes.

Smartphone device #3 (403):
Android operating system
Words with Friends app installed on device
Developer of Words with Friends app is Zynga Inc. (Signal Provider 1)
Assigned Google AD ID: G125
Owner of device has not given consent to allow Words with Friends app to share device data (e.g., including device's geolocation data) for marketing purposes.

For regulatory purposes, the name or identity (e.g., John Smith) of the owner of a given smartphone device may be considered confidential Personally Identifiable Information (PII) data. In order to preserve the confidentiality of this PII data, one or more (non-PII) Advertising IDs may be associated with the smartphone's owner (e.g., John Smith) and/or with the smartphone device itself. For example, in at least some embodiments, the unique AD ID associated with each respective smartphone device may be generated and/or assigned by the device's operating system owner/developer (e.g., Google, Apple, etc.).

In at least one embodiment, the term Signal Provider may correspond to any entity that collects or acquires signal data (e.g., PII data and/or non-PII data) relating to individual persons and/or consumer device(s). For example, in the example scenario of FIG. 4, Apple Inc. may be considered to be a signal provider for any signal data collected by the iOS operating system running on Smartphone Device #1. Similarly, Google Inc. may be considered to be a signal provider for any signal data collected by the Android operating system running on Smartphone Devices #2 and #3. Additionally, Zynga Inc. may be considered to be a signal provider for any signal data collected by the different Words with Friends App(s) running on Smartphone Devices #1, #2, and #3.

Typically, it is the responsibility of the Signal Provider to obtain consent from the end user to share any signal data that collects about the user for marketing purposes. Additionally, it is typically the responsibility of the Signal Provider to track and maintain granted and/or non-granted consent permissions for each of its end users.

For example, in the example scenario of FIG. 4, it is assumed that Zynga Inc. is the signal provider (e.g., Signal Provider 1) which tracks and maintains granted and/or non-granted consent permissions for sharing signal data collected by each respective instance of the Words with Friends app running on each end user device (e.g., Smartphone Devices #1, #2, #3). Additionally, in the specific example scenario of FIG. 4, it is assumed that the owners of Smartphone Devices #1 and #2 have each given consent to allow the Words with Friends app to share device data for marketing purposes, and that the owner of Smartphone Device #3 has not given consent to allow the Words with Friends app to share device data for marketing purposes.

In the example scenario of FIG. 4, it is assumed that each of the Words with Friends apps running on each of the Smartphone Devices periodically collects updated signal data relating its respective device and forwards it to Signal Provider 1 (410).

In some embodiments, the signal data passed from the smartphone devices to Signal Provider 1 may include real-time signal data and/or historical signal data, which is provided to the Signal Provider 1 in real time, substantially real-time, and/or non-real time (historical data, batch data, etc.). In some embodiments, the signal data passed from the smartphone devices to Signal Provider 1 may include historical signal data which may be periodically provided to the Signal Provider 1 in batches.

According to different embodiments, the signal data may include, but is not limited to, one or more of the following types of data or information (or combinations thereof):

Lat/Long (Geo Location) data
Time Data
App Name
Bundle ID
Device OS
Device Make/Model
Accelerometer Data
Battery data
Device IP address
Ad ID (associated with owner of device)
Signal Provider ID (e.g., Zynga)
App ID (e.g., Words w Friends)
AD ID (e.g., A123)
Etc.

Periodically, in substantially real-time, and/or upon occurrences of one or more specific events and/or conditions, Signal Provider 1 performs one or more signal data drop(s) to the Intuizi System. In at least one embodiment, the signal data passed from Signal Provider 1 to the Intuizi System includes only signal data in which consents have been granted and not withdrawn.

According to different embodiments, the signal data passed from Signal Provider 1 to the Intuizi System may include, but is not limited to, one or more of the following types of data or information (or combinations thereof):

Lat/Long (Geo Location) data
Time Data
App Name
Bundle ID
Device OS
Device Make/Model
Accelerometer Data
Battery data
Device IP address
Ad ID (associated with owner of device)
Signal Provider ID (e.g., Zynga)
App ID (e.g., Words with Friends)
AD ID (e.g., A123)
Encrypted AD ID (e.g., 1XYZ)
Etc.

In some embodiments, the signal data passed from Signal Provider 1 may include real-time signal data (or near real-time signal data), which is provided to the Intuizi System in real time or substantially real-time. In some embodiments, the signal data passed from Signal Provider 1 may include historical signal data, which may be periodically provided to the Intuizi System in one or more batches.

In the example scenario of FIG. 4, it is assumed that the owners of Smartphone Devices #1 and #2 have each given consent to Signal Provider 1 to share their device data for marketing purposes, and that the owner of Smartphone Device #3 has not given (or has withdrawn) their consent to allow Signal Provider 1 to share their device data for marketing purposes. Accordingly, in this specific example, it is assumed that Signal Provider 1 passes to the Intuizi System, signal data relating to Smartphone Devices #1 and #2 but not Device #3.

In at least one embodiment, the Intuizi System may include a Signal Encryptor System 412 which is configured or designed to facilitate, enable, initiate, and/or perform one or more of the following operation(s), action(s), and/or feature(s) (or combinations thereof):

Receive data feeds from one or more Signal Provider(s).
Analyze the received signal data to identify specific portions of the signal data to be encrypted to ensure compliance with GDPR & CCPA/CPRA privacy laws.
Use specific portions of the signal data to automatically generate encrypted signal data for one or more signal record(s) to ensure compliance with GDPR & CCPA/CPRA privacy laws.
Etc.

In alternate embodiments, the Signal Encryptor System(s) may reside or be implemented at the Signal Provider end(s).

As illustrated in the example embodiment of FIG. 4, the Signal Encryptor System may analyze the received signal data from Signal Provider 1, identify the AD ID data (e.g., A123) for the signal record(s) associated with Smartphone Device #1, and automatically generate and assign an encrypted AD ID ("Encrypted Intuizi AD ID", e.g., 1XYZ) (413, FIG. 3) to be associated with the Smartphone Device #1 signal data. Similarly, the Signal Encryptor System may analyze the received signal data from Signal Provider 1, identify the AD ID data (e.g., G123) for the signal record(s) associated with Smartphone Device #2, and automatically generate and assign an encrypted AD ID (e.g., 2JKL) (415, FIG. 3) to be associated with the Smartphone Device #2 signal data.

In at least one embodiment, an Encrypted ID may be used to anonymously represent the Advertising ID associated with John Smith. The Ad ID may be provided by a signal provider (e.g., Google, Apple), and a Signal Encryptor System (and/or other $3^{rd}$ party system) may utilize the Ad ID to generate the encrypted Ad ID.

In at least one embodiment, the Signal Encryptor System does not provide encryption keys to other components of the Intuizi System. In one embodiment, encrypted AD IDs for a given Intuizi signal record may include aggregated signal data from multiple different signal providers.

In some embodiments, at least a portion of the Signal Encryptor System component(s) and related functionality may reside at and/or may be implemented at one or more signal provider system(s). In this way, the signal data which is passed from the signal provider(s) to the Intuizi System only includes encrypted AD ID data which is fully compliant with GDPR & CCPA/CPRA privacy laws. In at least one embodiment, encryption keys are retained only by the Signal Provider, and encryption keys are not exposed to Intuizi System component(s).

In at least one embodiment, the Intuizi System may include an Intuizi Deterministic Matching System 416 which is configured or designed to facilitate, enable, initiate, and/or perform one or more of the following operation(s), action(s), and/or feature(s) (or combinations thereof):

Access, ingest, and analyze data streams, data records, and data sets from a plurality of different data sources, such as, for example, one or more of the following (or combinations thereof):
Mobile Signal Data Source(s) (e.g., Signal Provider 1, Signal Provider 2, etc.)
POI Data Source(s) 432
Appgraph Data Source(s) 434
IoT Data Source(s) 436
eCommerce Data Source(s) 438
Financial Data Source(s) 430

Classify data records into groups based on various criteria, such as for example: accuracy of data, granularity of data, etc.

Identify Encrypted AD IDs for each signal record.

Analyze signal records from multiple different signal providers to identify various patterns of related information, similarities, differences, etc.

Aggregate data records from different types of data sets, such as, for example, one or more of the following (or combinations thereof): Mobile Signal Data sets, POI Data sets, Appgraph Data sets, IoT Data sets, eCommerce Data sets; Financial Data sets, and other data set types.

Compare data values of data records from different types of data sets to identify matching (or substantially matching) commonalities of data values across different types of data set records.

Automatically and/or dynamically create one or more links or associations among various data records of different data set types, based on identified matching commonalities of data values of those data records.

Analyze signal records from multiple different signal providers to identify one or more signal records which have matching Encrypted AD IDs.

Identify and create groupings of related data records from different types of data sets based on identified matching of commonalities of data values across the group(s) of identified data records.

Organize analyzed aggregated data for presentation via one or more customized Intuizi GUIs to users/client systems.

Etc.

In at least one embodiment, at least a portion of the functionality of the Intuizi Deterministic Matching System may be implemented utilizing one or more components of the Intuizi Distributed Processing System (230, FIG. 2). Illustrative examples of various operation(s), action(s), and/or feature(s) of the Intuizi Deterministic Matching System are further illustrated and described with respect to FIG. 10.

As illustrated in the example embodiment of FIG. 4, the Intuizi System may include an Intuizi Client Portal/Front End System 418 configured or designed to include functionality for enabling Intuizi customers, users, and client systems (e.g., Client A, Client B, Client C of FIG. 4) to access and view aggregated signal data information stored in the Intuizi System database(s). In one embodiment, the Front End System may be configured or designed enable end users/client systems (e.g., Client A, Client B, Client C of FIG. 4) to access graphical and textual information relating to encrypted signal records via one or more interactive GUIs.

In at least one embodiment, the Intuizi System may include an Intuizi Interactive GUI & Signal Data Presentation System 420 which is configured or designed to dynamically generate interactive GUIs configured or designed to present filtered signal information relating to aggregated signal data acquired by the Intuizi System from multiple different signal providers. In at least one embodiment, the Intuizi System GUIs may be configured or designed to present different customized displays of filtered aggregated end user/device signal data from multiple different signal providers. In at least some embodiments, the signal data presented in one or more Intuizi System GUIs may include aggregated signal data from multiple different signal providers, which may be presented concurrently or simultaneously in a common GUI.

In at least some embodiments, the signal data presented in the Intuizi GUIs is fully compliant with GDPR & CCPA/CPRA privacy and data protection laws.

Figure 10:
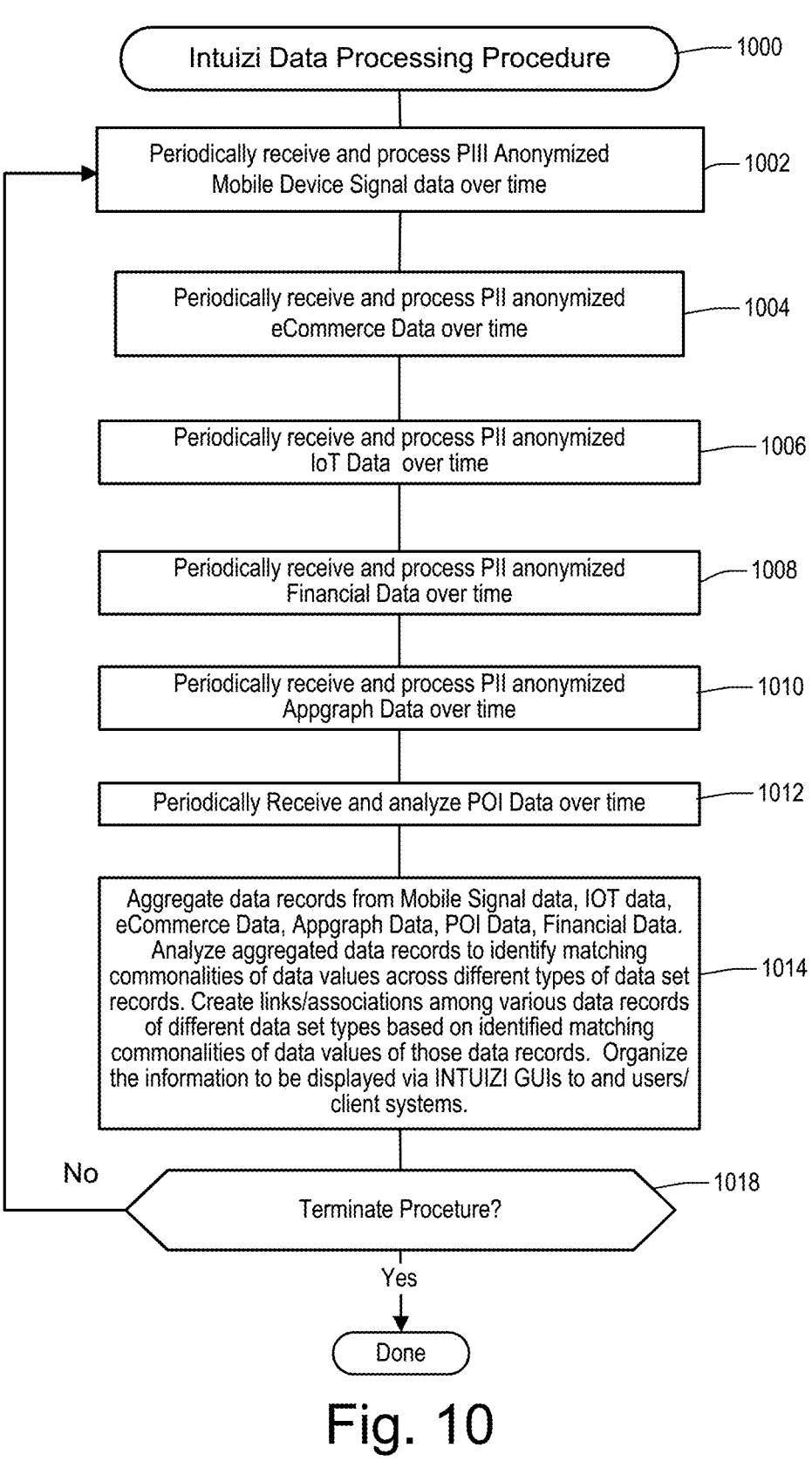
FIG. 10 shows a flow diagram of a Intuizi Data Processing Procedure in accordance with a specific embodiment.

FIG. 10 shows a flow diagram of a Intuizi Data Processing Procedure in accordance with a specific embodiment. According to different embodiments, at least a portion of the various types of functions, operations, actions, and/or other features provided by the Intuizi Data Processing Procedure may be implemented at one or more components of the Intuizi System. In at least one embodiment, the Intuizi Data Processing Procedure may be operable to perform and/or implement various types of functions, operations, actions, and/or other features such as one or more of those described and/or referenced herein.

In at least one embodiment, the Intuizi Data Processing Procedure may be operable to utilize and/or generate various different types of data and/or other types of information when performing specific tasks and/or operations. This may include, for example, input data/information and/or output data/information. For example, in at least one embodiment, the Intuizi Data Processing Procedure may be operable to access, process, and/or otherwise utilize information from one or more different types of sources, such as, for example, one or more local and/or remote memories, devices and/or systems. Additionally, in at least one embodiment, the Intuizi Data Processing Procedure may be operable to generate one or more different types of output data/information, which, for example, may be stored in memory of one or more local and/or remote devices and/or systems. Examples of different types of input data/information and/or output data/information which may be accessed and/or utilized by the Intuizi Data Processing Procedure may include, but are not limited to, one or more of those described and/or referenced herein.

In at least one embodiment, a given instance of the Intuizi Data Processing Procedure may access and/or utilize information from one or more associated databases. In at least one embodiment, at least a portion of the database information may be accessed via communication with one or more local and/or remote memory devices. Examples of different types of data which may be accessed by the Intuizi Data Processing Procedure may include, but are not limited to, one or more of those described and/or referenced herein.

According to specific embodiments, multiple instances or threads of the Intuizi Data Processing Procedure may be concurrently implemented and/or initiated via the use of one or more processors and/or other combinations of hardware and/or hardware and software. For example, in at least some embodiments, various aspects, features, and/or functionalities of the Intuizi Data Processing Procedure may be performed, implemented and/or initiated by one or more of the various systems, components, systems, devices, procedures, processes, etc., described and/or referenced herein. In at least one embodiment, at least a portion the Intuizi Data Processing Procedure may be executed utilizing one or more components of the Intuizi Distributed Processing System (230, FIG. 2).

According to different embodiments, one or more different threads or instances of the Intuizi Data Processing Procedure may be initiated in response to detection of one or more conditions or events satisfying one or more different types of minimum threshold criteria for triggering initiation of at least one instance of the Intuizi Data Processing Procedure. Various examples of conditions or events which may trigger initiation and/or implementation of one or more different threads or instances of the Intuizi Data Processing Procedure may include, but are not limited to, one or more of those described and/or referenced herein.

According to different embodiments, one or more different threads or instances of the Intuizi Data Processing Procedure may be initiated and/or implemented manually, automatically, statically, dynamically, concurrently, and/or combinations thereof. Additionally, different instances and/or embodiments of the Intuizi Data Processing Procedure may be initiated at one or more different time intervals (e.g., during a specific time interval, at regular periodic intervals, at irregular periodic intervals, upon demand, etc.).

In at least one embodiment, initial configuration of a given instance of the Intuizi Data Processing Procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Intuizi Data Processing Procedure may correspond to and/or may be derived from the input data/information.

In at least one embodiment, the Intuizi Data Processing Procedure may be configured or designed to facilitate, enable, initiate, and/or perform one or more of the following operation(s), action(s), and/or feature(s) (or combinations thereof):

Access, ingest, and analyze data streams, data records, and data sets from a plurality of different data sources, such as, for example, one or more of the following (or combinations thereof):

Mobile Signal Data Source(s) (e.g., Signal Provider 1, Signal Provider 2, etc.)

POI Data Source(s) 432

Appgraph Data Source(s) 434

IoT Data Source(s) 436 eCommerce Data Source(s) 438

Financial Data Source(s) 430

Classify data records into groups based on various criteria, such as for example: accuracy of data, granularity of data, etc.

Identify Encrypted AD IDs for each signal record.

Analyze signal records from multiple different signal providers to identify various patterns of related information, similarities, differences, etc.

Aggregate data records from different types of data sets, such as, for example, one or more of the following (or combinations thereof): Mobile Signal Data sets, POI Data sets, Appgraph Data sets, IoT Data sets, eCommerce Data sets; Financial Data sets, and other data set types.

Compare data values of data records from different types of data sets to identify matching (or substantially matching) commonalities of data values across different types of data set records.

Automatically and/or dynamically create one or more links or associations among various data records of different data set types, based on identified matching commonalities of data values of those data records.

Analyze signal records from multiple different signal providers to identify one or more signal records which have matching Encrypted AD IDs.

Identify and create groupings of related data records from different types of data sets based on identified matching of commonalities of data values across the group(s) of identified data records.

Organize analyzed aggregated data for presentation via one or more customized Intuizi GUIs to users/client systems.

Etc.

For purposes of illustration, an example of the Intuizi Data Processing Procedure will now be described by way of example with reference to FIG. 10 (and/or other Figures such as, for example, the network/system diagram(s) of FIGS. 2 and 3).

In at least one embodiment, the Intuizi Data Processing Procedure is configured or designed to receive and process various types of data, including, for example, one or more of the following (or combinations thereof):

Mobile Signal data (e.g., PII Anonymized Mobile Signal data)

POI Data

Appgraph Data (e.g., PII Anonymized Appgraph data)

IoT Data (e.g., PII Anonymized IoT data)

eCommerce Data (e.g., PII Anonymized eCommerce data)

Financial Data and/or other types of data.

For example, as shown at 1002, the Intuizi System may periodically receive and process PII Anonymized Mobile Device Signal data over time. In at least one embodiment, this data may be provided by multiple different Signal Providers. Such PII Anonymized Mobile Signal data for a given mobile device (e.g., MD1) (e.g., which may be generated from MD1's Smartphone Apps) may include, but are not limited to, one or more of the following (or combinations thereof):

| Data Field | Value |
| --- | --- |
| deviceifa | Android Advertising ID or Apple IDFA |
| latitude | Latitude with up to 7 digits precision |
| longitude | Longitude with up to 7 digits precision |
| userAgent | URL Encoded USER AGENT of device |
| adwidth | Numeric Ad Width in Pixels |
| adheight | Numeric Ad Height in Pixels |
| campaignID | Alpha Numeric Campaign Identifier |
| bannerID | Alpha Numeric Banner Identifier |
| pubid | The assigned ID of a specific publisher grouping (apps or sites) |
| invType | Display or Video |
| deviceType | The numeric ID for the type of device. |
| country | The ISO code for the country |
| bid | Assigned Business Identifier |
| gender | M = male, F = Female, O = Other or unknown |
| age | The numeric age of the user |
| ip | The IP4 ip address of the record |
| d | This is the date of the record in Y-M-D H:i:s format |
| auctionID | unique/randomized identifier |

An illustrative example of a Mobile Signal data record is illustrated in FIG. 43.

As shown at 1004, the Intuizi System may periodically receive and process PII Anonymized eCommerce Data over time. In at least one embodiment, the eCommerce Data may include Placekey data representing PII anonymized shipping address data and/or GPS Coordinates associated with different eCommerce transactions over time. In at least one embodiment, the Placekey data may represent hidden or encrypted addresses of physical locations. Example eCommerce Data (e.g. generated by Ecommerce Platforms) may include, but are not limited to, one or more of the following (or combinations thereof):

Matchcode

Address1

Address2

City

State

Zip

Zip+4

Gender

Latitude

Longitude

Country_FIPS

Address1

Address 2

GPS2

Placekey2

Attribute: Bought golf equipment

Attribute: Ordered Dog Food

An illustrative example of an eCommerce data record is illustrated in FIG. 47.

As shown at 1006, the Intuizi System may periodically receive and process PII anonymized IoT Data over time. Example IoT data (e.g., generated by Monetization SDKs, First Party MFG Data, etc) may include, but are not limited to, one or more of the following (or combinations thereof):

Date

Provider

EncryptedIP

EncyrptedID

UserAgent

InventoryType

DeviceType

Country

CreativeLength

BundleID

CreativeURL

An illustrative example of an IoT data record is illustrated in FIG. 46.

As shown at 1008, the Intuizi System may periodically receive and process PII anonymized Financial Data over time. Example Financial data (e.g., generated by POS Systems) may include, but are not limited to, one or more of the following (or combinations thereof):

| Data Field | Value |
| --- | --- |
| week_starting | DateTime of the starting week |
| confirmed_cases | Confirmed cases. NULL for no confirmed cases. |
| new_cases | New cases. NULL for no new cases. |
| merchant_name | Merchant Name |
| is_return_or_reversal | Is return or reversal. t = TRUE, f = FALSE |
| is_online | Is online. t = TRUE, f = FALSE |
| transaction_amount | Transaction amount. |
| transaction_count | Transaction Count |
| county_fips_code | County FIPS code |
| county_name | County name |
| state_code | State code |

Brand ID1 (e.g. Big5 Sporting Goods)

Transaction Volume ($$ per time interval)

Transaction Count (## trxn per time interval)

Time interval (e.g., 1 week)

Brand ID2=Petco

Transaction Volume ($$ per time interval)

Transaction Count (## trxn per time interval)

Time interval (e.g., 1 week)

Brand ID3=Starbucks

Transaction Volume ($$ per time interval)

Transaction Count (## trxn per time interval)

Time interval (e.g., 1 week)

An illustrative example of a Financial Transaction data record is illustrated in FIG. 48.

As shown at 1010, the Intuizi System may periodically receive and process PII anonymized Appgraph Data over time. Example Appgraph Data (e.g., generated by smartphone apps) may include, but are not limited to, one or more of the following (or combinations thereof):

| Data Field | Value |
| --- | --- |
| Provider | Hashed persistent value of provider |
| Category | The Meta-category of the application |
| Application Name | The Application Name as presented in the appstore, |
| BundleID | The AppstoreID in either the iOS App Store or the Google Play Store |
| EID | The anonymous Mobile AD Identifier |

Records of known apps downloaded to a given mobile device. In at least one embodiment, the Appgrah Data may be obtained from or provided by one or more Mobile Attribution & Analytics entities.

An illustrative example of an Appgraph data record is illustrated in FIG. 45.

As shown at 1012, the Intuizi System may periodically receive and process POI Data over time. Example POI Data (e.g., Public Store Locators) may include, but are not limited to, one or more of the following (or combinations thereof):

| Data Field | Value |
| --- | --- |
| Provider | Hashed persistent value of provider |
| Category | The Meta-category of the application |
| Application Name | The Application Name as presented in the appstore, |
| BundleID | The AppstoreID in either the iOS App Store or the Google Play Store |
| EID | The anonymous encrypted Mobile AD Identifier |

Brand ID1=Big5 Sporting Goods

GPS coordiante1

Geospacial/Region/Polygon Mapping Data1

Brand ID2=Petco

GPS coordiante2

Geospacial/Region/Polygon Mapping Data2

Brand ID3=Starbucks

GPS coordiante3

Geospacial/Region/Polygon Mapping Data3

An illustrative example of a POI data record is illustrated in FIG. 45.

In at least one embodiment, the Intuizi System may also be configured or designed to include functionality for automatically and/or dynamically generating additional data sets using portions of the Mobile Signal data, IOT data, eCommerce Data, Appgraph Data, POI Data, and/or Financial Transaction data. Examples of such additional data sets may include, but are not limited to, one or more of the following (or combinations thereof):

Visitation Sets

Visitation Details Data Sets

Normalization Data Sets

And/or other types of composite or derivative data sets/

In at least one embodiment, the Visitation Detail Data Set is an individual signal level report of anonymous mobility data that may include, but are not limited to, one or more of the following (or combinations thereof): Provider, LocationID, Encrypted Mobile Ad ID, Distance from Location centroid and timestamp of signal. In some embodiments, the Intuizi System may automatically and/or dynamically combine data from this data set with the POI data set to generate the Visitation data sets.

In at least one embodiment, the Visitation Data Set is an aggregated report of anonymous mobility data that may include, but is not limited to, one or more of the following (or combinations thereof): Category, Brand, Location/Store, and address/geography information and number of unique daily visits. In some embodiments, at least some of the Visitation Data sets may be automatically and/or dynamically generated by the Intuizi System using data from the POI and Visitation Detail data sets.

As shown at 1014, the Intuizi System may be configured or designed to facilitate, enable, initiate, and/or perform one or more of the following operation(s), action(s), and/or feature(s) (or combinations thereof):

Aggregate data records from Mobile Signal data set(s), IOT data set(s), eCommerce Data set(s), Appgraph Data set(s), POI Data set(s), Financial Transaction Data set(s), and/or other data set(s).

Analyze aggregated data records to identify matching commonalities of data values across different types of data set records.

Create links/associations among various data records of different data set types based on identified matching commonalities of data values of those data records.

Organize the information to be displayed via INTUIZI GUIs to and users/client systems.

In at least one embodiment, the Intuizi System may include an Intuizi Deterministic Matching System which is configured or designed to analyze aggregated data records to identify matching commonalities of data values across different types of data set records, and create links/associations among various data records of different data set types based on identified matching commonalities of data values of those data records. For purposes of illustration, a simplified example is described below, with reference to FIGS. 43-48 of the drawings.

FIGS. 43-48 show simplified example embodiments of different types of data sets which may be ingested and analyzed by the Intuizi Deterministic Matching System. More specifically:

FIG. 43 shows a simplified illustrative example of a Mobile Signal data record.

FIG. 44 shows a simplified illustrative example of a POI data record.

FIG. 45 shows a simplified an illustrative example of an Appgraph data record.

FIG. 46 shows a simplified illustrative example of a IoT data record.

FIG. 47 shows a simplified illustrative example of an eCommerce data record.

FIG. 48 shows a simplified illustrative example of a Financial data record.

In this particular example embodiment, the Intuizi Deterministic Matching System may ingest and analyze the plurality of data records of FIGS. 43-48 to identify matching commonalities of data values across the plurality records, and create links/associations among one or more of the data records based on identified matching commonalities of data values.

For example, analyzing the example data values associated with the plurality of data sets of FIGS. 43-48, the Intuizi Deterministic Matching System may perform one or more of the following:

Determine (e.g., by performing GPS to GPS Comparison of Mobile Signals to POI) that a Mobile Signal from Zynga associated with encrypted Mobile AD ID XXXX3A94D56A18242E5BF23B502990E8A (e.g., Mobile Device A, associated with Person A) has associated mobile GPS coordinates which match similar POI GPS coordinates associated with a Domino's location. Having identified this relationship, the Intuizi Deterministic Matching System may create a linking or association between the Mobile Signal data record (FIG. 43) and POI data record (FIG. 44).

Determine (e.g., by performing comparison of time/date data of Mobile Signal data record and Financial data record) that the Dominos location that was visited by Person A falls within the week time interval that is referenced in Financial Transaction data record (FIG. 48). Having identified this relationship, the Intuizi Deterministic Matching System may create a linking or association between the Mobile Signal data record (FIG. 43) and Financial data record (FIG. 48).

Determine (e.g., by performing comparison of encrypted ID data of Mobile Signal data record and Appgraph data record) that Person A's Mobile Signals has an encrypted ID that matches records in the Appgraph Data Set that shows he has the Dominoes App installed at the time of the signal. Having identified this relationship, the Intuizi Deterministic Matching System may create a linking or association between the encrypted ID of Mobile Signal data record (FIG. 43) and the data of Appgraph data record (FIG. 45).

Determine (e.g., by performing comparison of encrypted ID data of Mobile Signal data records over time and eCommerce data records over time) that Person A's Mobile signals have a GPS coordinate that, during nighttime hours, substantially matches a location of an eCommerce GPS coordinate of one or more eCommerce Data records (e.g., FIG. 47). Having identified this relationship, the Intuizi Deterministic Matching System may create a linking or association between one or more Mobile Signal data records (e.g., those matching encrypted Mobile AD ID XXXX3A94D56A18242E5BF23B502990E8A), the 300+eCommerce fields associated with eCommerce data record (FIG. 47), and other eCommerce data records matching the GPS coordinates of eCommerce data record FIG. 47.

Determine (e.g., by performing comparison of the night time encrypted IP address of Mobile Signal data records and encrypted IP address of one or more IoT Signal data records) that Person A's encrypted IP address during a specific date/time matches an IoT encrypted IP address (and date/time) of IoT data record FIG. 46 associated with a Roku Device. Having identified this relationship, the Intuizi Deterministic Matching System may create a linking or association between the Mobile Signal data record (FIG. 43) and IoT data record (FIG. 46).

FIG. 4 illustrates an example scenario of an Intuizi Signal Data Ingestion and Presentation Process, illustrating how PII anonymized signal data representing different end user/consumer devices(s) may be provided to the Intuizi System from a given signal provider, processed, encrypted (e.g., to ensure compliance with GDPR & CCPA/CPRA privacy laws), and made accessible to Intuizi customers, users, and client systems via one or more interactive Intuizi GUIs.

Figure 11:
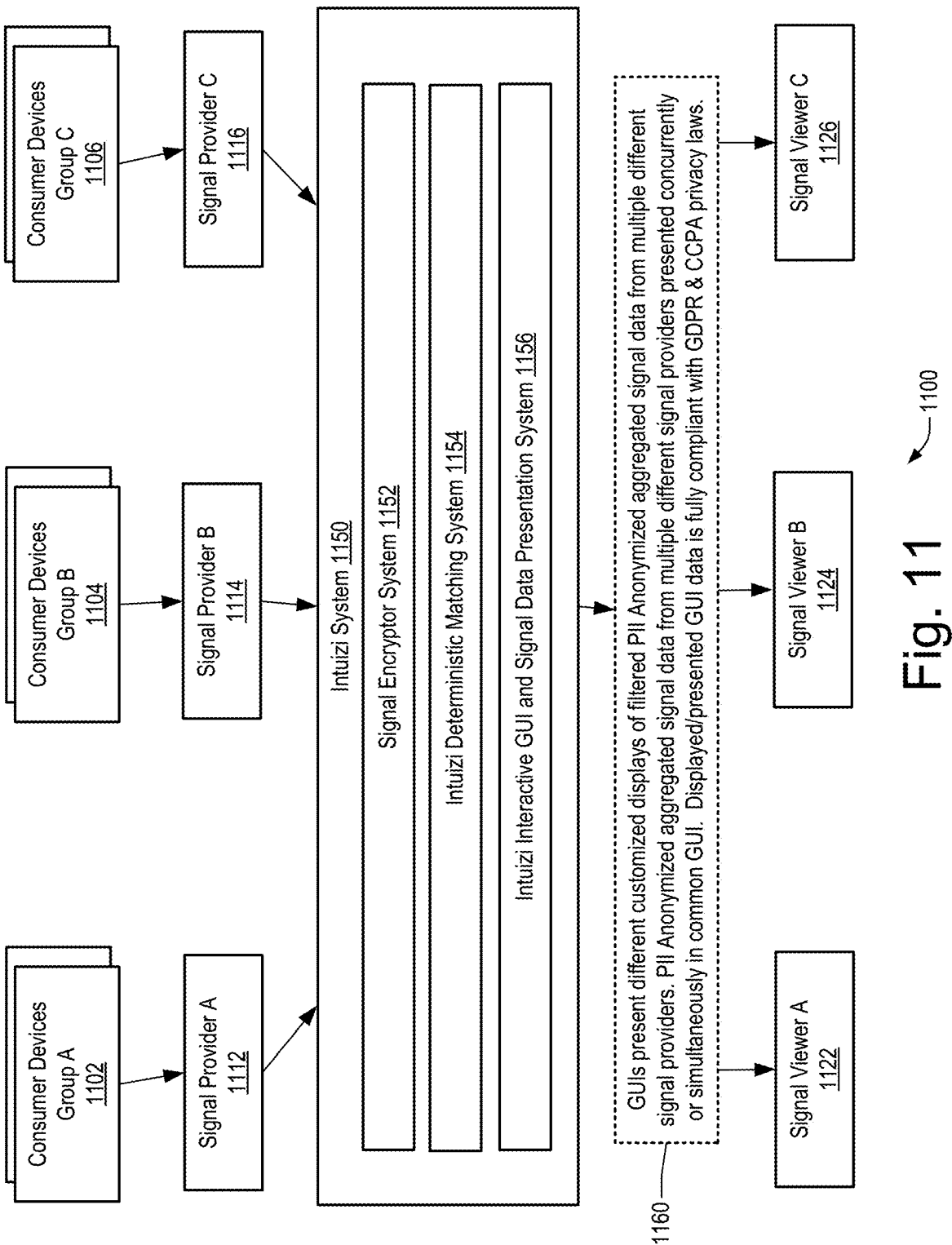
FIG. 11 illustrates an expanded example scenario of an Intuizi Signal Data Ingestion and Presentation Process.

In a similar manner, FIG. 11 illustrates an expanded example scenario of an Intuizi Signal Data Ingestion and Presentation Process, illustrating how signal data representing different groups end user/consumer devices(s) (e.g., 1102, 1104, 1106) may be provided to the Intuizi System (1150) from a plurality of different signal providers (e.g., 1112, 1114, 1116). Each signal provider may perform one or more signal data drop(s) to the Intuizi System periodically, in substantially real-time, and/or upon occurrences of one or more specific events and/or conditions. In at least one embodiment, the signal data passed from one or more signal providers to the Intuizi System includes only signal data in which consents have been granted and not withdrawn.

The Intuizi System aggregates PII anonymized signal data from a plurality of different signal providers. For reference purposes, this may be referred to herein as "Aggregated Signal Data". The Aggregated Signal Data passed from the signal provider(s) may include real-time signal data (or near real-time signal data), which is provided to the Intuizi System in real time or substantially real-time. In some embodiments, the signal data may include historical signal data, which may be periodically provided to the Intuizi System in one or more batches.

In at least one embodiment, the Aggregated Signal Data is initially processed at the Intuizi System and encrypted or pseudonymized to ensure compliance with GDPR & CCPA/CPRA privacy laws. The encrypted Aggregated Signal Data is then stored at one or more Intuizi Database(s) (e.g., 232, FIG. 2). In at least one embodiment, the Aggregated Signal Data is encrypted by Signal Encryptor System component(s) 1152 of the Intuizi System 1150. In some embodiments, the Aggregated Signal Data is encrypted by one or more client Signal Encryptor System component(s) remotely operating at one or more of the signal provider systems.

In some embodiments, at least a portion of the Signal Encryptor System component(s) and related functionality may reside at and/or may be implemented at one or more signal provider system(s). In this way, the signal data which is passed from the signal provider(s) to the Intuizi System only includes encrypted AD ID data which is fully compliant with GDPR & CCPA/CPRA privacy and data protection laws.

In at least one embodiment, encryption keys are retained only by the respective signal provider(s), and encryption keys are not exposed or accessible to other Intuizi System component(s) and/or sub-system(s). In this way, all (or portions) of the data stored at the Intuizi Database(s) only include encrypted or PII Anonymized Aggregated Signal Data which is fully compliant with GDPR & CCPA/CPRA privacy and data protection laws. Moreover, since the encryption keys are retained only by the respective signal provider(s) and are not by the Intuizi System, this helps to ensure that the Intuizi System is operating in compliance with all GDPR, CCPA/CPRA and/or other privacy and data protection laws and regulations.

In at least one embodiment, the Intuizi System includes a Signal Encryptor System 1152 which is configured or designed to facilitate, enable, initiate, and/or perform one or more of the following operation(s), action(s), and/or feature (s) (or combinations thereof):

Receive data feeds from one or more Signal Provider(s).

Analyze the received signal data to identify specific portions of the signal data (e.g., AD ID) to be encrypted to ensure compliance with GDPR & CCPA/CPRA privacy laws.

Use specific portions of the signal data to automatically generate encrypted (or PII Anonymized) signal data (e.g., encrypted AD ID) for one or more signal record(s) to ensure compliance with GDPR & CCPA/CPRA privacy and data protection laws.

Etc.

In at least one embodiment, the encrypted Aggregated Signal Data is used to populate signal records which are stored at the Intuizi Database(s).

In at least one embodiment, the Intuizi System may include an Intuizi Deterministic Matching System 1154 which is configured or designed to facilitate, enable, initiate, and/or perform one or more of the following operation(s), action(s), and/or feature(s) (or combinations thereof):

Analyze encrypted AD IDs for each signal record.

Analyze the encrypted Aggregated Signal Data to identify various patterns of related information, similarities, differences, etc.

Analyze the encrypted Aggregated Signal Data to identify and associate groups of related signal records having matching or common Encrypted AD IDs.

Analyze the encrypted Aggregated Signal Data to identify and associate groups of related signal records which share common signal data characteristics, properties or values.

Analyze the encrypted Aggregated Signal Data and other information from multiple signal records to identify groupings of signal records, where each identified grouping of signal records is associated with a common encrypted AD ID. For example, in at least one embodiment, the Intuizi System may identify a first group (or plurality) of signal records aggregated from multiple different signal providers, wherein each of the signal records of the first group is associated with a first encrypted AD ID. Additionally, the Intuizi System may identify a second group (or plurality) of signal records aggregated from multiple different signal providers, wherein each of the signal records of the second group is associated with a second encrypted AD ID.

Analyze the encrypted Aggregated Signal Data and other information from multiple signal records to identify groupings of signal records, where each identified grouping of signal records share common signal data characteristics, properties or values.

Organize analyzed signal data for presentation via one or more customized Intuizi GUIs to users/client systems.

In at least one embodiment, the Intuizi System may include an Intuizi Client Portal/Front End System configured or designed to include functionality for enabling Intuizi customers, users, and client systems (e.g., Signal Viewers 1122. 1124, 1126, FIG. 11) to access and view aggregated signal data information stored in the Intuizi System database(s). In one embodiment, the Front End System may be configured or designed enable end users/client systems (e.g., 1122. 1124, 1126, FIG. 11) to access graphical and textual information relating to encrypted signal records of encrypted Aggregated Signal Data via one or more interactive GUIs.

In at least one embodiment, the Intuizi System may include an Intuizi Interactive GUI & Signal Data Presentation System 1156 which is configured or designed to dynamically generate interactive GUIs configured or designed to present filtered signal information relating to aggregated encrypted Aggregated Signal Data acquired by the Intuizi System from multiple different signal providers. In at least some embodiments, the signal data presented via a given Intuizi System GUI may include encrypted Aggregated Signal Data derived from multiple different signal providers, and which may be simultaneously and/or concurrently displayed via the GUI.

For example, as illustrated at 1160, Intuizi GUIs may be configured or designed to present different customized displays of filtered PII Anonymized aggregated signal data from multiple different signal providers. PII Anonymized aggregated signal data from multiple different signal providers may be concurrently or simultaneously presented or displayed in a common GUI. Displayed/presented GUI data is fully compliant with GDPR & CCPA privacy laws.

Figure 5:
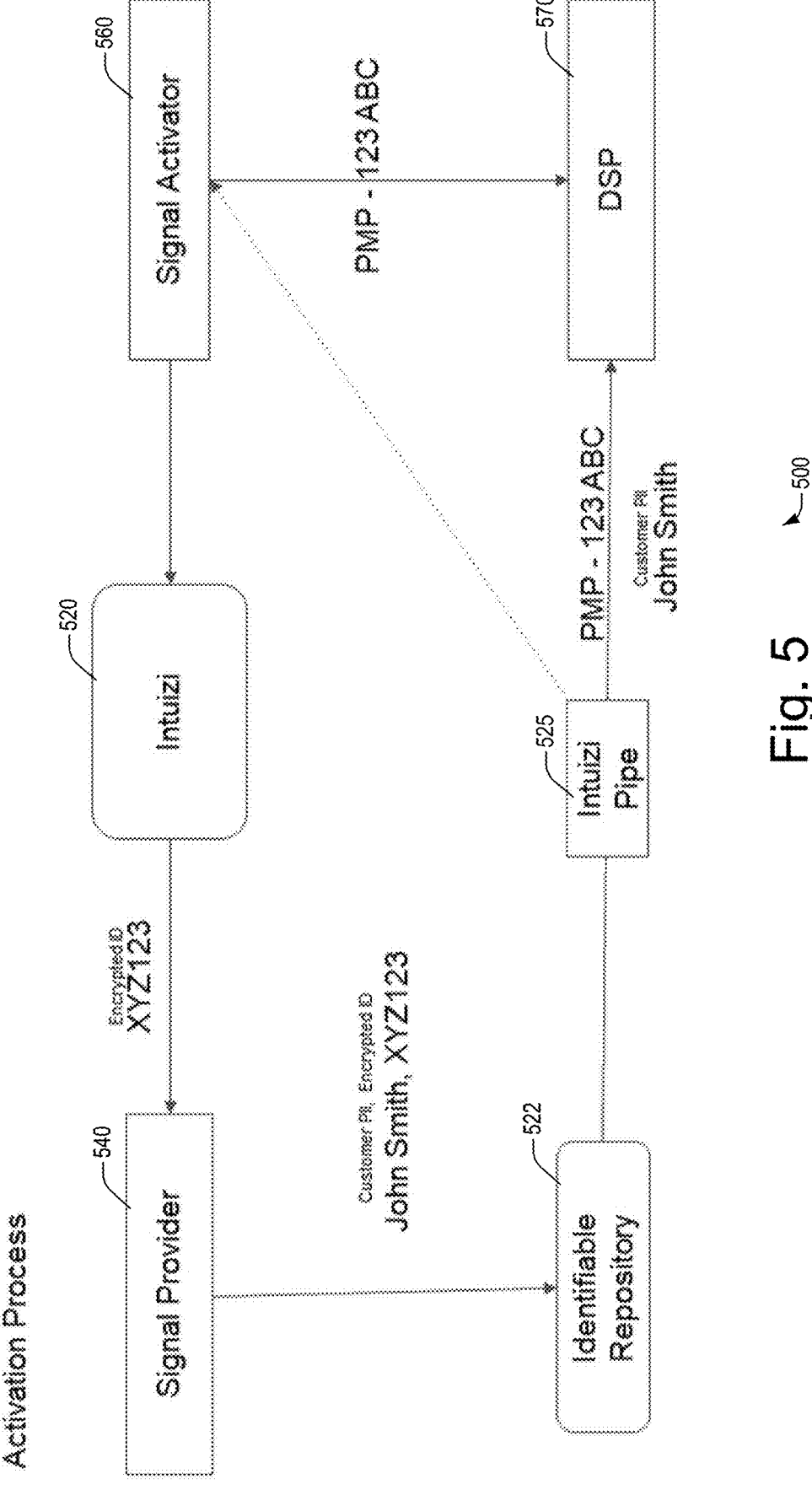
FIG. 5 illustrates an example data flow representation of an Intuizi Activation Process 500.

FIG. 5 illustrates an example data flow representation of an Intuizi Activation Process 500. In at least one embodiment, the Activation Process 500 may be configured or designed to facilitate, initiate and/or perform various operation(s) and/or action(s) relating to the Intuizi Technology such as, for example, one or more of those described herein. For example, in one embodiment, the Intuizi Activation Process may be configured or designed to include functionality for:

Enabling and/or providing the aggregate display of real-time and bulk-load data devoid of privacy sensitive information, but containing unique encrypted identifiers, for the purposes of signal activation;

Enabling and/or providing the ability by Signal Activators 560 to select individual or bulk encrypted identifiers and forward those selections for re-identification by the source (e.g., Signal Provider 540) of each Signal;

Enabling and/or providing identification via an encrypted identifier to the originating Signal Provider 540 for the purpose of allowing the originating Signal Provider to de-anonymize a requested signal(s) for use by a Signal Activator 560;

Enabling and/or providing auto de-anonymization of signal data into an identifiable repository 522 and the code to interact with a preset configuration of Intuizi Pipe 525 to channel re-identified data to a Demand Side Provider (e.g., DSP 570) without interaction by Intuizi systems or personnel;

and/or other types of functionality described and/or referenced herein.

In one embodiment, the Intuizi System may be configured or designed to include functionality for providing a private marketplace for an Intuizi Activator to address a 1st party audience via their DSP of choice without directly interacting with the 1st party data.

Figure 8:
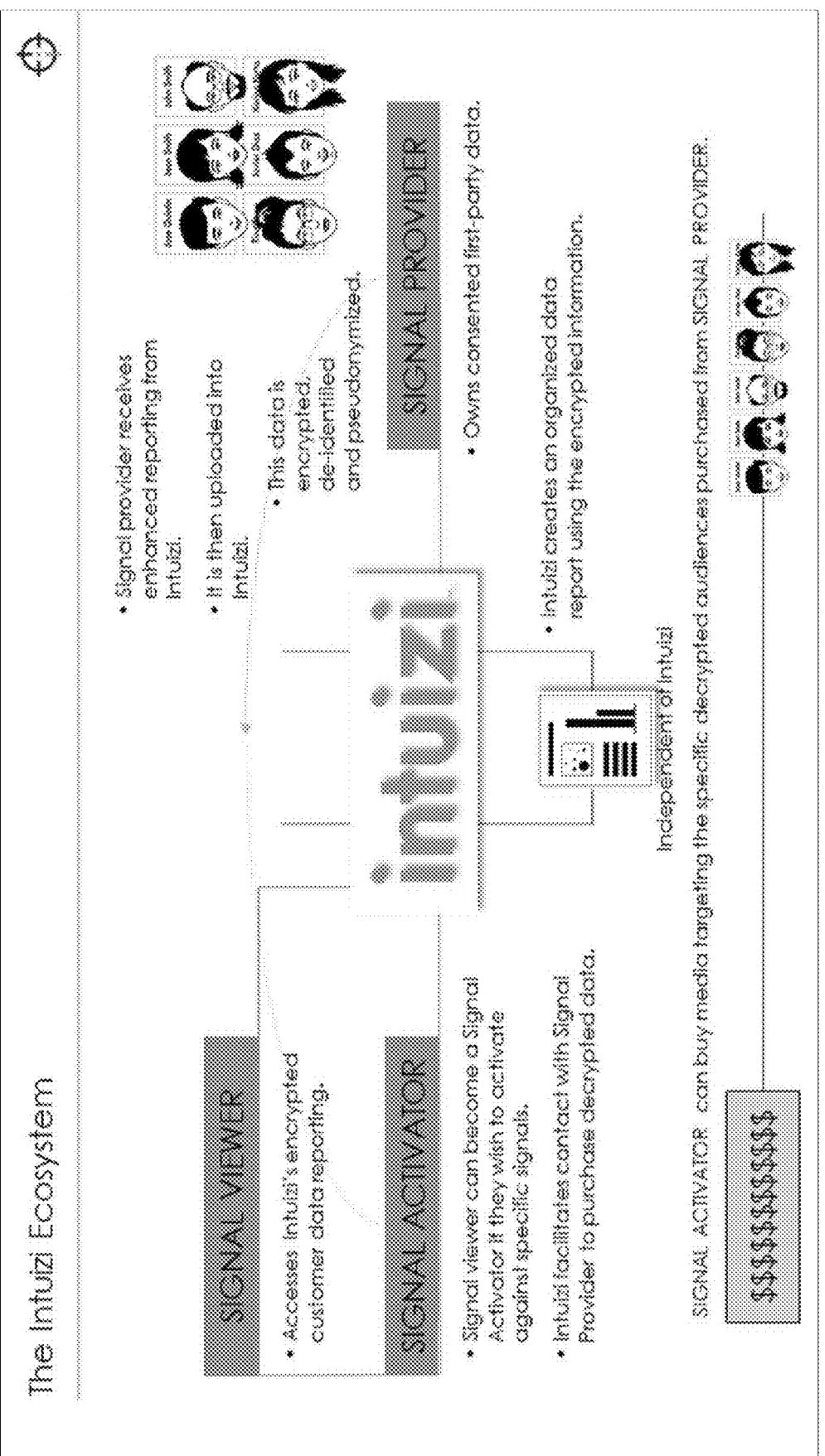
FIG. 8 illustrates an alternate example representation of an Intuizi Signal Flow and Activation process.

FIG. 8 illustrates an alternate example representation of an Intuizi Signal Flow and Activation process. As illustrated in the example embodiment of FIG. 8:

Each signal provider owns consented first party signal data, and periodically provides the signal data to the Intuizi System.

The Intuizi System aggregates signal data from a plurality of different signal providers, and encrypts the data in a manner which causes the signal data to be de-identified and pseudo-randomized (e.g., in compliance with GDPR & CCPA/CPRA privacy laws).

The encrypted Aggregated Signal Data is then stored at the Intuizi System, and the Intuizi System creates and organize data report using the encrypted information.

The Intuizi System provides each signal provider with a respective enhanced reporting. In some embodiments, the Intuizi System may also provide one or more signal providers with respective sets of encryption keys relating to encrypted signal data associated with that signal provider.

One or more signal viewers may access Intuizi's encrypted customer signal data reporting and presentation system and utilize one or more Intuizi GUIs to display (e.g., concurrently display, in a common GUI)

filtered signal information relating to aggregated encrypted Aggregated Signal Data acquired by the Intuizi System from multiple different signal providers.

The signal viewer may elect to become a signal activator if they wish to activate against one or more specific anonymized signals or signal groups.

Assuming the signal viewer elects to activate a selected group of signals, the Intuizi System determines the identity of the signal provider(s) associated with each of the activated signals, and initiates contact with the identified signal provider(s) (e.g., on behalf of the signal viewer) to facilitate purchase of decrypted data corresponding to the activated signal data.

The signal activator may elect to buy or purchase media targeting the specific decrypted audiences purchased from the signal provider(s).

It will be appreciated that the procedural diagrams illustrated and described herein merely specific examples of procedural flows and/or other activities which may be implemented to achieve one or more aspects of the various procedural flows and techniques described herein. Other embodiments of procedural flows (not shown) may include additional, fewer and/or different steps, actions, and/or operations than those illustrated in the example procedural diagrams illustrated and described herein.

Intuizi Graphical User Interface (GUI) Embodiments

Various figures of the present disclosure illustrate example screenshots of different interactive GUIs which may be configured or designed to include functionality for enabling end users to view and access various types of filtered information and data relating to, for example:

Mobile Signal data (e.g., PII Anonymized Mobile Signal data provided from multiple different signal providers)

POI Data

Appgraph Data (e.g., PII Anonymized Appgraph data)

IoT Data (e.g., PII Anonymized IoT data)

eCommerce Data (e.g., PII Anonymized eCommerce data)

Financial Data and/or other types of data.

Figure 12A:
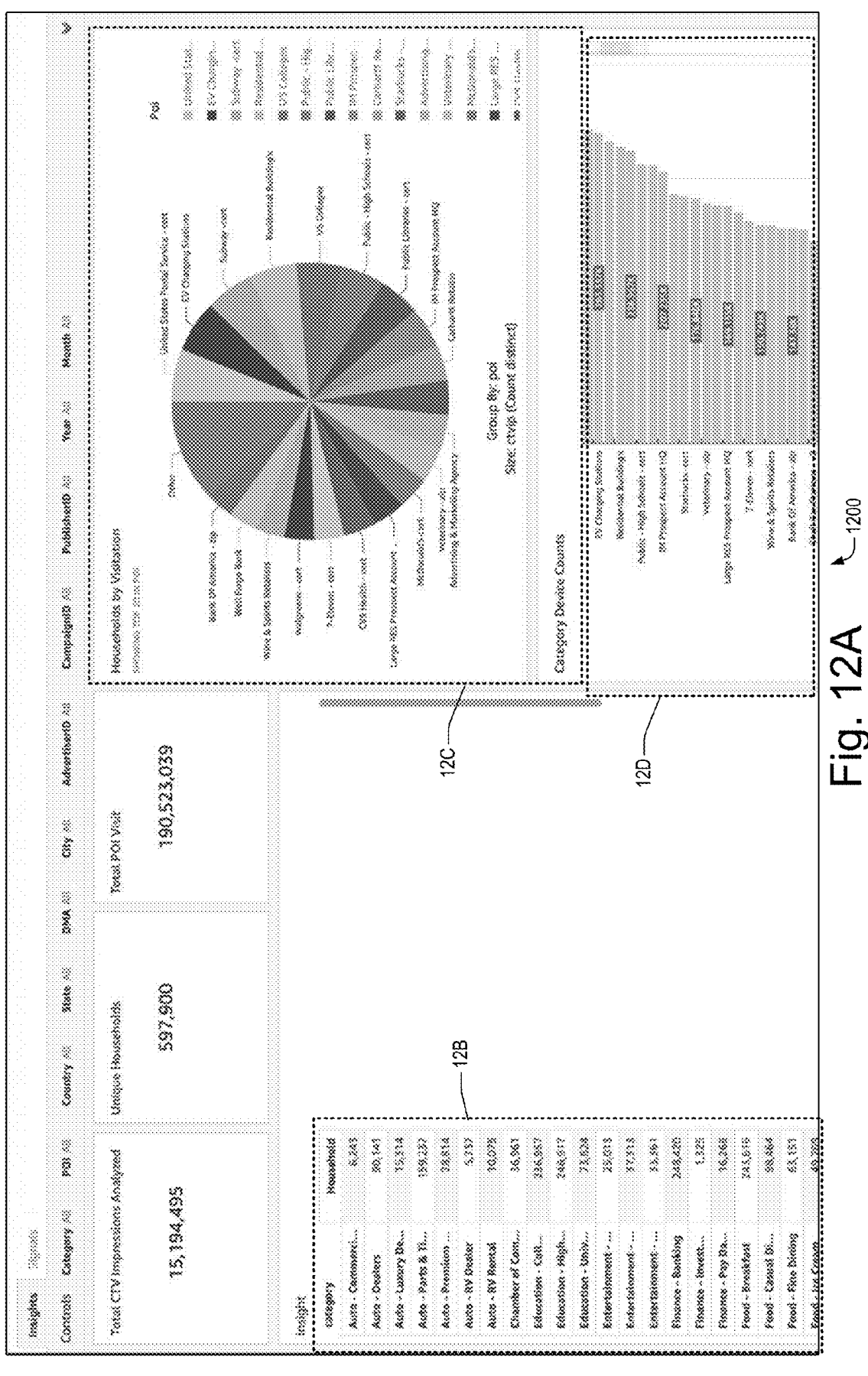
FIG. 12A shows an example screenshot of an Insights GUI 1200 in accordance with a specific embodiment.
Figure 12C:
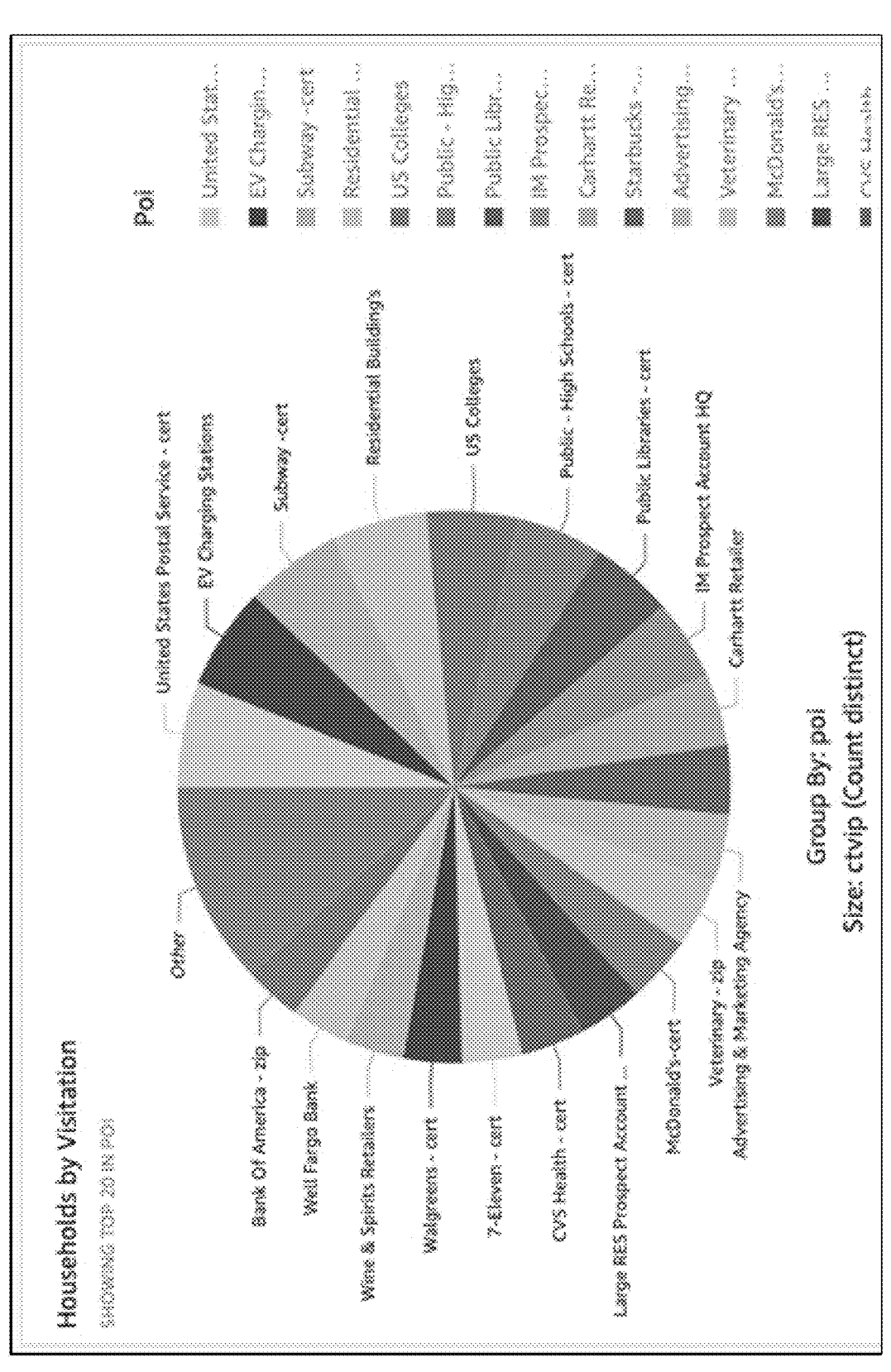
Figure 12D:
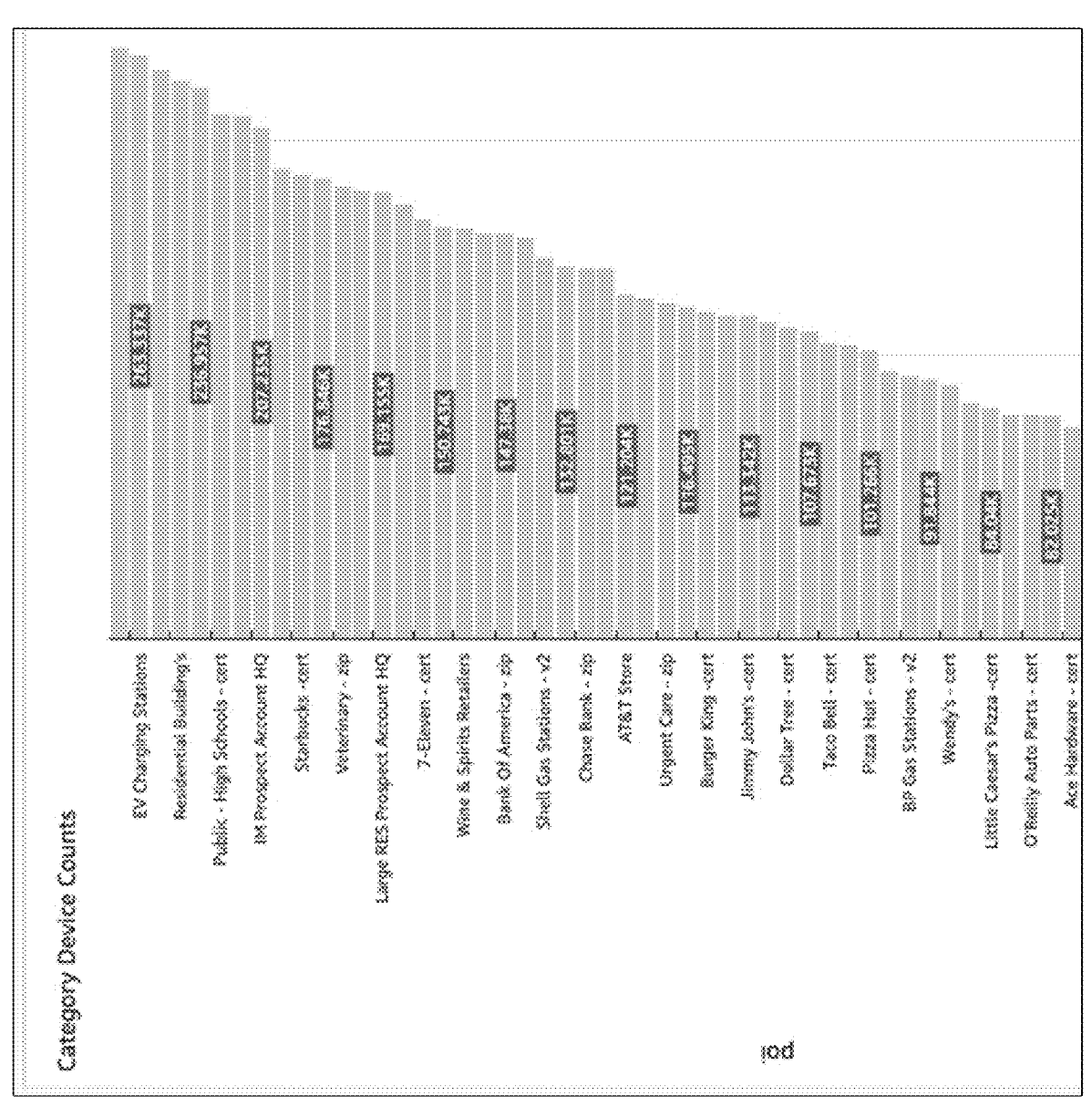

By way of illustration, FIG. 12A shows an example screenshot of an Insights GUI 1200 in accordance with a specific embodiment. FIGS. 12B-12D show more detailed views of identified portions of the example GUI illustrated in FIG. 12A.

As illustrated in the example embodiment of FIG. 12A the Insights GUI 1200 is configured to concurrently display filtered information and data relating to acquired from multiple different signal providers and other data sources.

As illustrated in the example embodiment of FIG. 12A, Insights GUI 1200 includes functionality for enabling users (e.g., Signal Viewers 1122, 1124, 1126, FIG. 11) to selectively display filtered signal information using various filter criteria, including, for example, one or more of the following (or combinations thereof):

Category

POI

Country

State

DMA

City

Advertiser ID

Creative ID

Publisher ID

Year

Month

Etc.

In at least one embodiment, Insights GUI 1200 is configured or designed to utilize the user-specified filter criteria to present filtered signal information relating to encrypted Aggregated Signal Data acquired by the Intuizi System from multiple different signal providers.

For example, as illustrated in the example embodiment of FIG. 12A, GUI 1200 is configured to display at least one or more of the following types of content:

Total CTV impressions analyzed data (e.g., connected TVs), which, for example, may be automatically and/or dynamically generated by the Intuizi System using the IoT Data set.

Unique households data, which, for example, may be automatically and/or dynamically generated by the Intuizi System using the IoT+Mobile Signal+POI Data sets.

Total POI Visit data, which, for example, may be automatically and/or dynamically generated by the Intuizi System using the Mobile Signal+POI Data sets.

Textual or tabular Insight information (12B) which presents information characterizing and/or quantifying relationships between advertiser ID, creative ID, and number of households associated therewith. In at least one embodiment, the displayed category data (12B) may be generated using the POI data set, and the displayed Household data may be generated using the IoT+Mobile Signal+POI Data sets.

Graphical Insight information (e.g., Households by Visitation, 12C) characterizing and/or quantifying relationships between households by visitation and POI. In the specific example embodiment of FIG. 12A, the pie graph displayed at 12C corresponds to a graphical representation of data displayed at Insight table (12B).

Graphical Insight information (e.g., Category Device Counts 12D) characterizing and/or quantifying relationships between category device counts and POI. In at least one embodiment, at least a portion of the graphical Insight information displayed at 12D may be calculated using IoT+Mobile Signal+POI Data sets.

Etc.

Figure 13A:
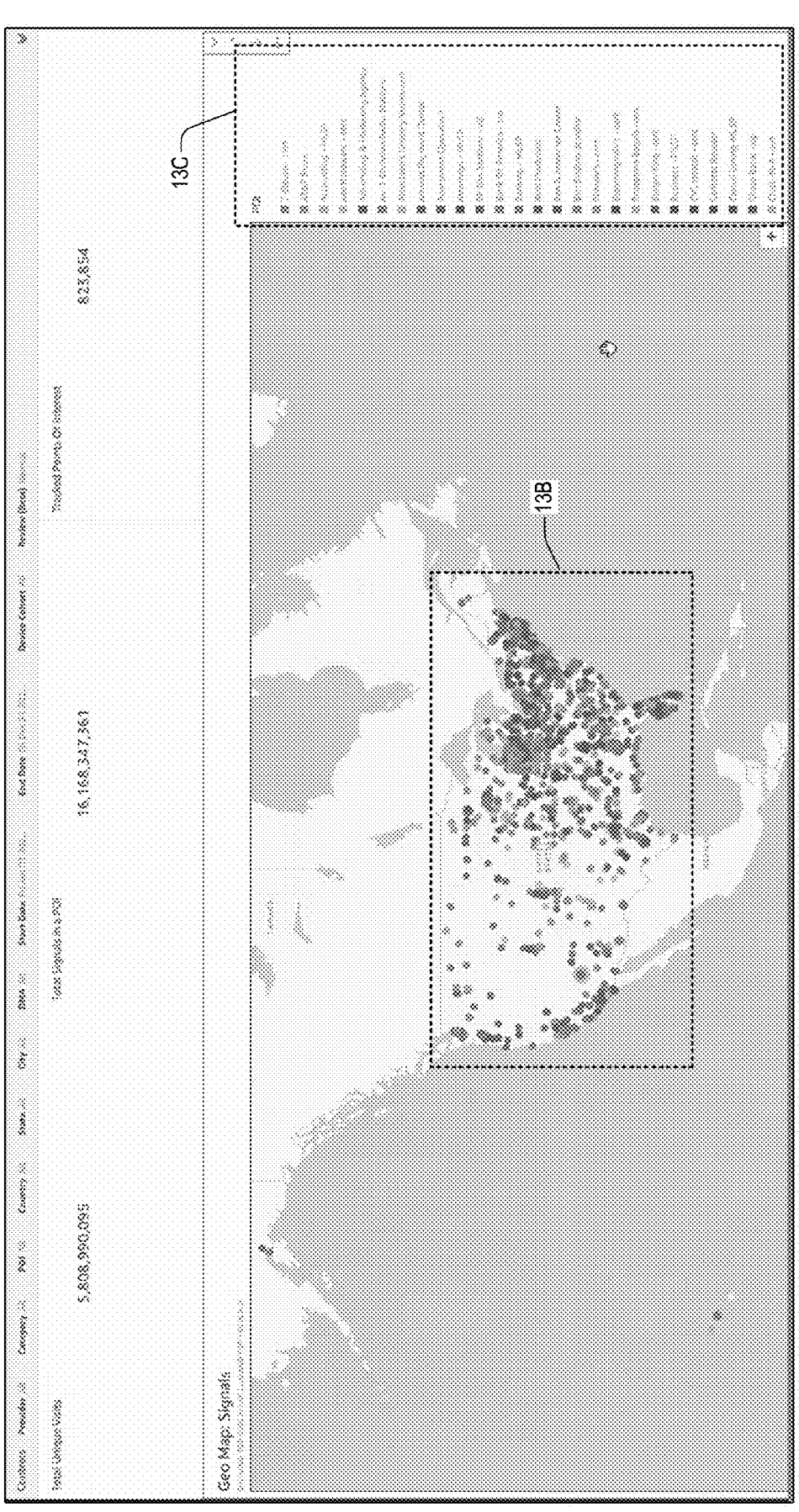
FIG. 13A shows an example screenshot of a Signals GUI 1300 in accordance with a specific embodiment.

FIG. 13A shows an example screenshot of a Signals GUI 1300 in accordance with a specific embodiment. As illustrated in the example embodiment of FIG. 13A the Signals GUI 1300 is configured to present filtered signal information relating to the concurrent display aggregated encrypted Aggregated Signal Data acquired by the Intuizi System from multiple different signal providers. FIGS. 13B, 13C show more detailed views of identified portions of the example GUI illustrated in FIG. 13A.

As illustrated in the example embodiment of FIG. 13A, Signals GUI 1300 includes functionality for enabling users (e.g., Signal Viewers 1122, 1124, 1126, FIG. 11) to selectively display filtered signal information using various filter criteria, including, for example, one or more of the following (or combinations thereof):

Provider
Category
POI
Country
State
DMA
Start date
End date
Device cohort
Review
Etc.

In at least one embodiment, Signals GUI 1300 is configured or designed to utilize the user-specified filter criteria to present filtered signal information relating to aggregated encrypted Aggregated Signal Data acquired by the Intuizi System from multiple different signal providers.

For example, as illustrated in the example embodiment of FIG. 13A, GUI 1300 is configured to display at least one or more of the following types of content:

Geographic map of signal locations (13B).

POI data (13C).

Total unique visits.

Total signals in one or more POI group(s).

Track Points Of Interest

Tabular Insight information characterizing and/or quantifying relationships between various user-specified filter criteria.

Graphical information (13B) representing an overlay of device signal locations relative to one or more physical geographic regions (e.g., signal device locations across the entire continental USA).

Graphical information (13C) relating to various filter criteria such as, for example, POI categories, POI category names.

Graphical information (13B,C) characterizing and/or quantifying relationships between device signal, device signal location, and POI type associated with each displayed device signal object.

Etc.

Figure 14A:
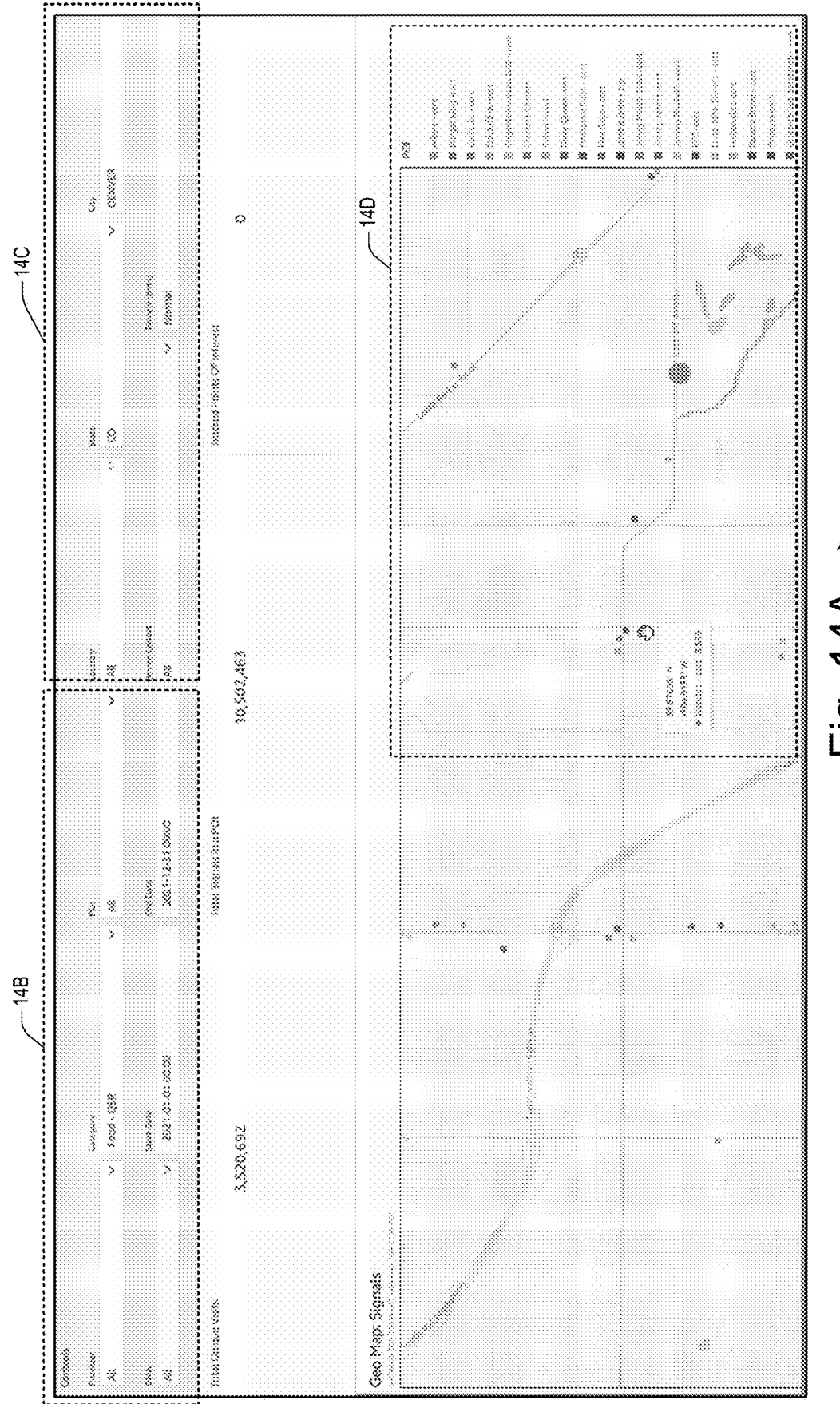
FIG. 14A shows an example screenshot of a different Signals GUI 1400 in accordance with a specific embodiment.
Figure 14B:
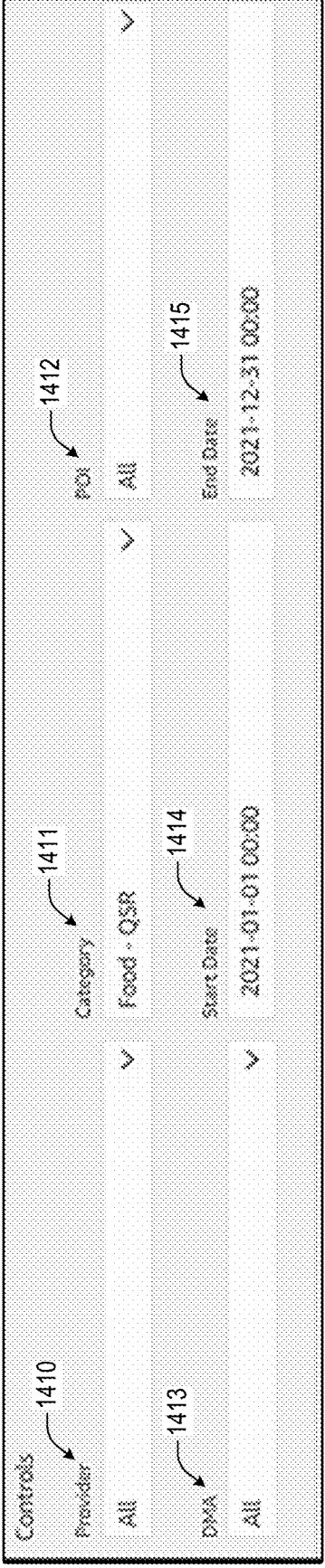
FIGS. 14B-14D show more detailed views of identified portions of the example GUI illustrated in FIG. 14A.
Figure 14C:
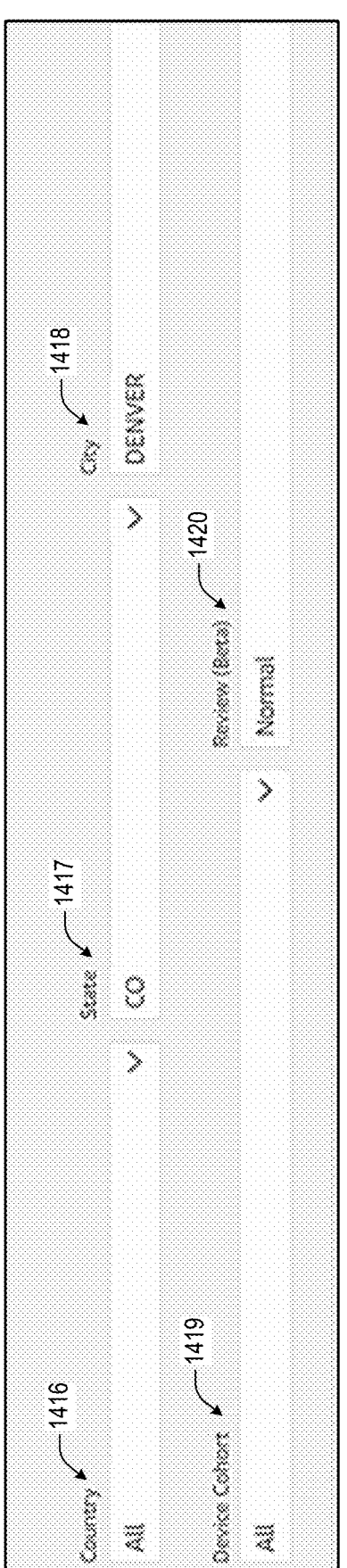
Figure 14D:
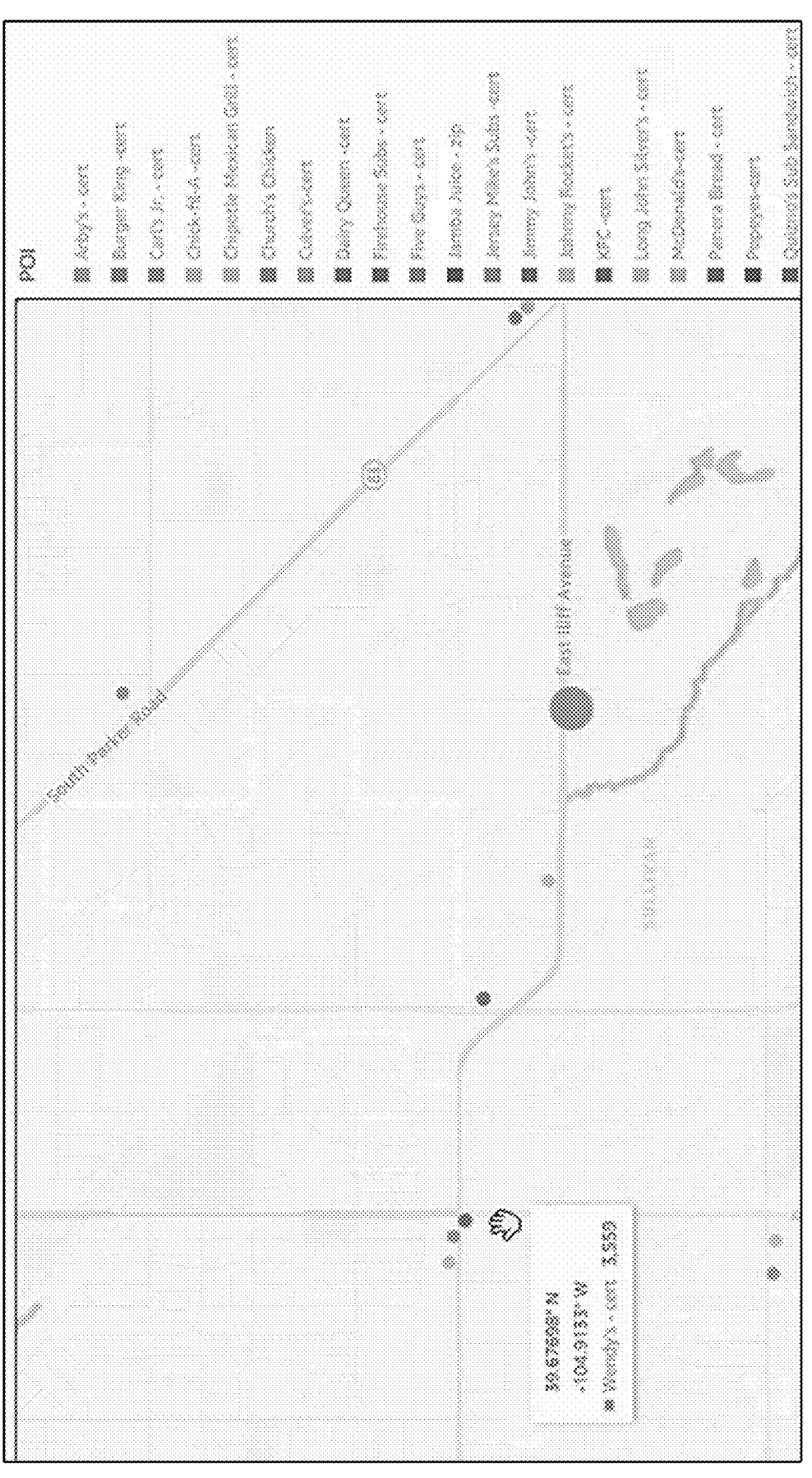

FIG. 14A shows an example screenshot of a different Signals GUI 1400 in accordance with a specific embodiment. FIGS. 14B-14D show more detailed views of identified portions of the example GUI illustrated in FIG. 14A.

As illustrated in the example embodiment of FIG. 14A, Signals GUI 1400 includes functionality for enabling users (e.g., Signal Viewers 1122, 1124, 1126, FIG. 11) to selectively display filtered signal information using various filter criteria, including, for example, one or more of the following (or combinations thereof):

Provider 1410
Category 1411
POI 1412
Country 1416
State 1417
City 1418
DMA 1413
Start date 1414
End date 1415
Device cohort 1419
Review 1420
Etc.

FIGS. 14B and 14C illustrate the Filter Control portion of GUI 1400, where a user is able to select and configure the various filter parameters to be applied.

In at least one embodiment, Signals GUI 1400 is configured or designed to utilize the user-specified filter criteria to present filtered signal information acquired by the Intuizi System from multiple different signal providers and/or other $3^{rd}$ party data sources. For example, as illustrated in the example embodiment of FIG. 14A, GUI 1400 is configured to display at least one or more of the following types of content:

Total unique visits analyzed.

Total signals in one or more POI group(s).

Track Points Of Interest.

Textual or tabular Insight information characterizing and/or quantifying relationships between various user-specified filter criteria.

Graphical information (e.g., 14D) representing an overlay of device signal locations relative to one or more physical geographic regions and/or relative to one or more points of interest (POIs).

Graphical and/or textual information relating to various filter criteria such as, for example, POI categories, POI category names.

Graphical information characterizing and/or quantifying relationships between device signal, device signal location, and nearby POIs.

Etc.

As illustrated in the example embodiment of FIG. 14, the displayed filtered signal data displayed in Signal GUI portion 14D includes POI data and encrypted Aggregated Signal Data acquired by the Intuizi System from multiple different signal providers, all of which may be displayed concurrently or simultaneously via GUI portion 14D.

Figure 15A:
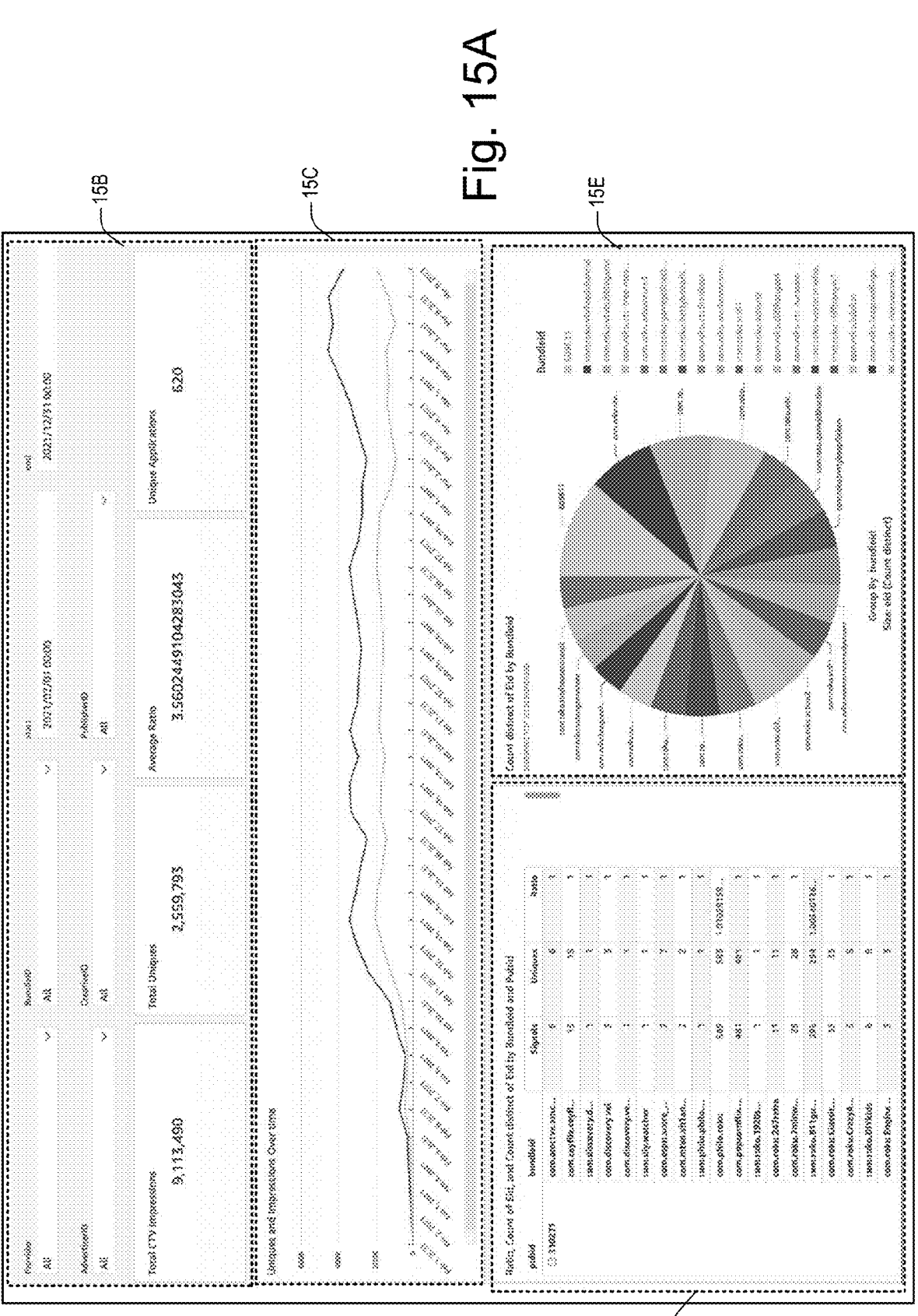
FIG. 15A shows an example screenshot of an interactive IoT Signals GUI in accordance with a specific embodiment.
Figure 15B:
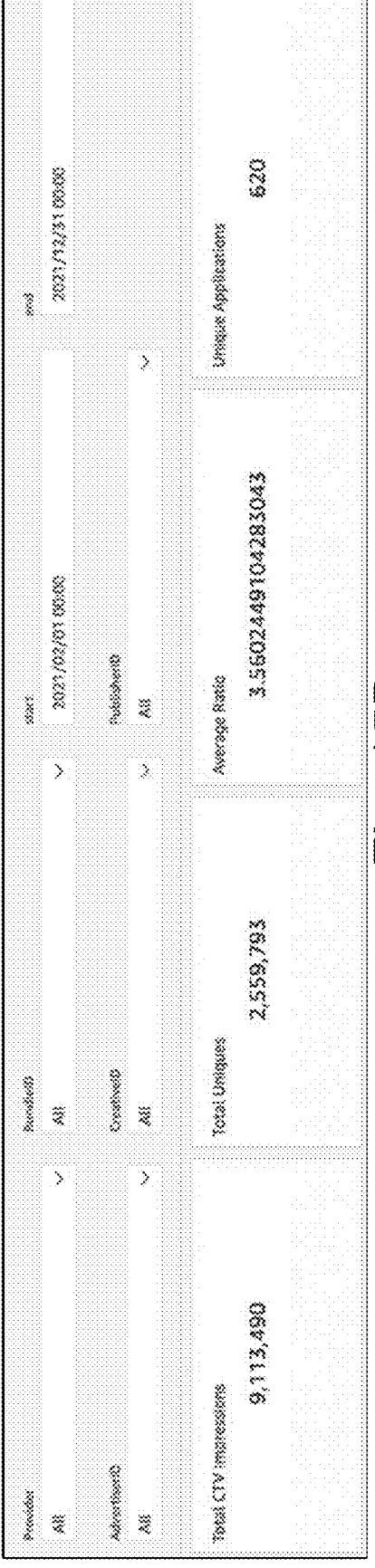
Figure 15C:
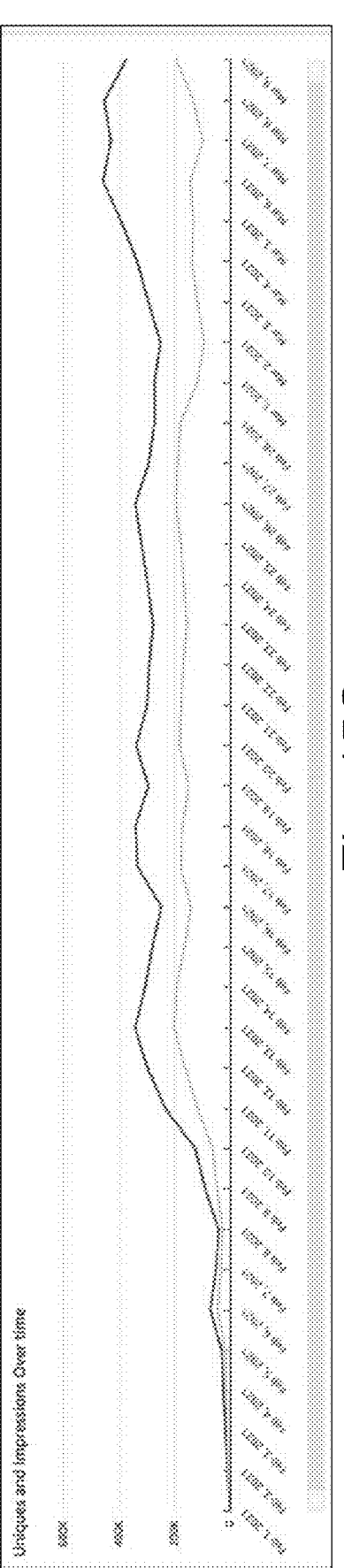
Figure 15E:
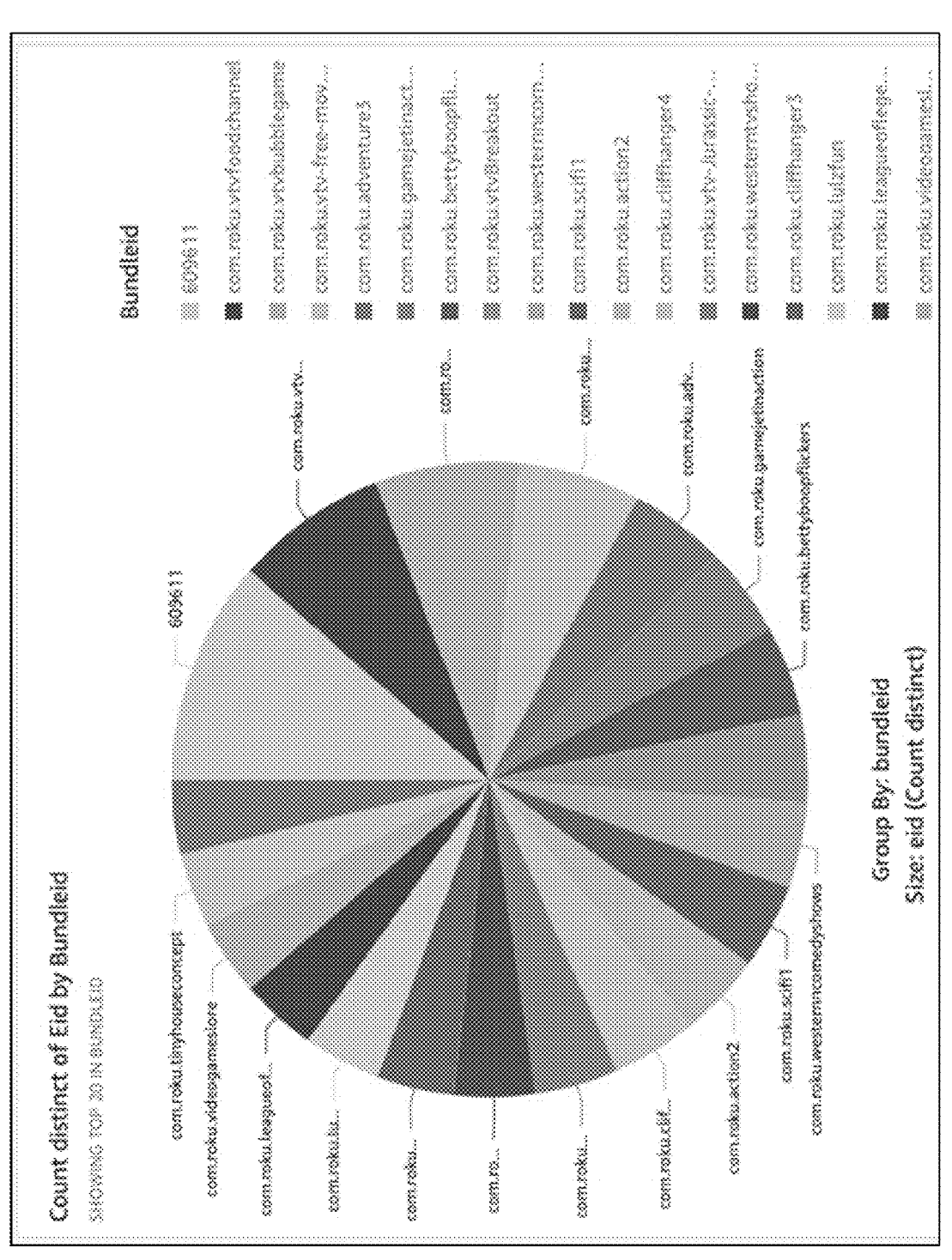

FIG. 15A shows an example screenshot of an interactive IoT Signals GUI in accordance with a specific embodiment. FIGS. 15B-15D show more detailed views of identified portions of the example GUI illustrated in FIG. 15A. This IOT report shows the analysis of Connected television signals and their association with a Mobile Signals data set. It provides a time-series analysis that shows the number of signals per unique identifier by internet connection. This report can be used to find common usage patterns or to alert for anomalous activity.

For example, as illustrated in the example embodiment of FIG. 15A, IoT Signals GUI is configured to display at least one or more of the following types of content:

Total CTV impressions analyzed data (15B) (e.g., connected TVs), which, for example, may be automatically and/or dynamically generated by the Intuizi System using the IoT Data set.

Unique households data (15B), which, for example, may be automatically and/or dynamically generated by the Intuizi System using the IoT+Mobile Signal+Geolocation data sets.

Average Ratio data (15B), which, for example, may be automatically and/or dynamically generated by the Intuizi System using the Mobile Signal+IoT Data sets.

Unique Applications data (15B), which, for example, may be automatically and/or dynamically generated by the Intuizi System using the IoT Data set.

Uniqueness and Impressions Over Time Data (15C), which, for example, may be automatically and/or dynamically generated by the Intuizi System using the IoT+Mobile Signal data sets.

Data relating to ratio, count of EID, and count of distinct EID by bundle ID and pub ID (15D) which represents information characterizing and/or quantifying relationships between publisher ID, bundle ID, signals, uniques, ratio, etc. In at least one embodiment, the at least a portion of the data displayed at GUI portion 15D may be generated using the IoT data set.

Graphical Insight data (15E) characterizing and/or representing relationships between distinct EIDs and Bundle IDs. In at least one embodiment, the at least a portion of the data displayed at GUI portion 15E may be generated using the IoT data sets.

Figure 16A:
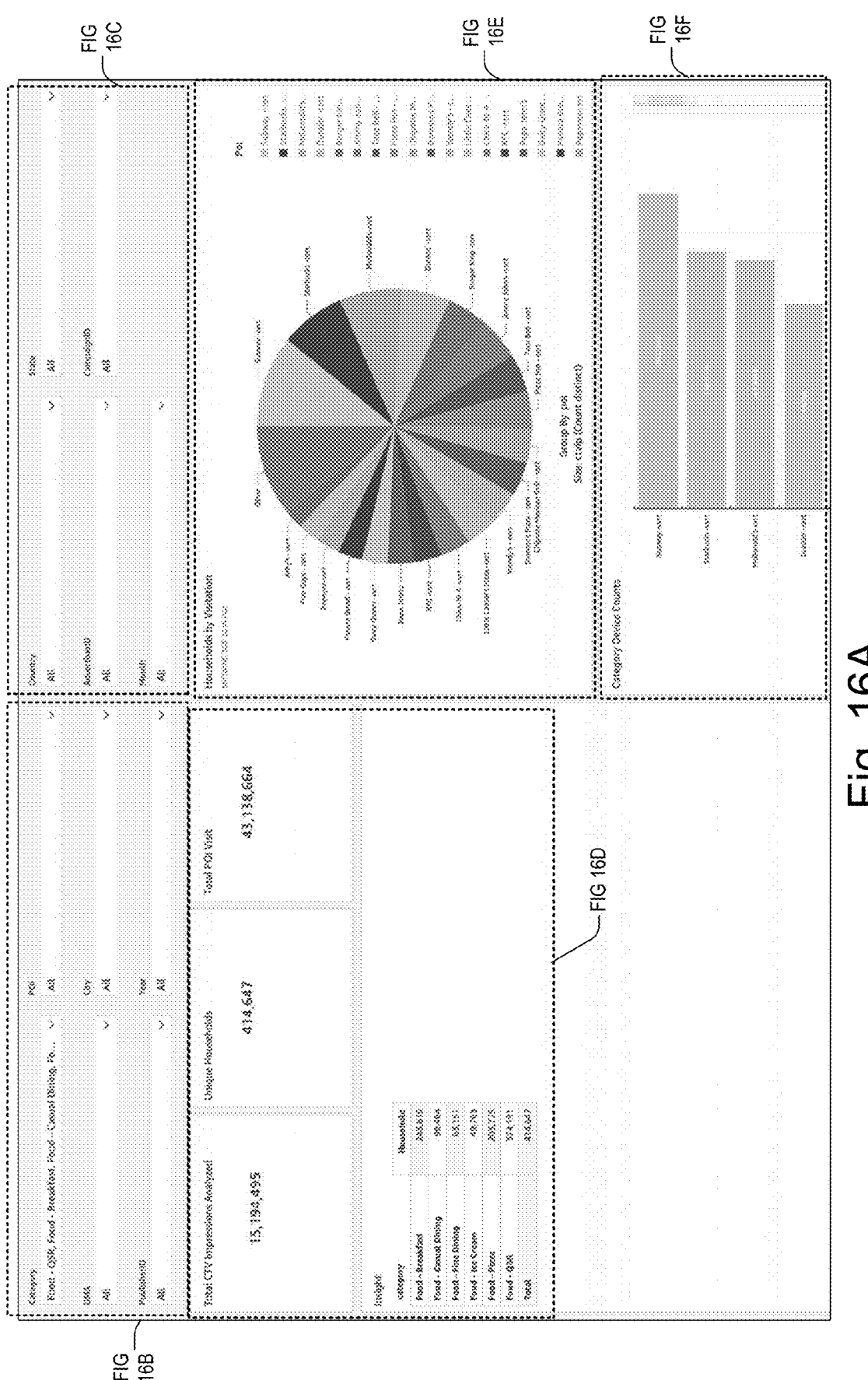
FIG. 16A shows an example screenshot of an interactive Filtered IoT Insights GUI in accordance with a specific embodiment.

FIG. 16A shows an example screenshot of an interactive Filtered IoT Insights GUI in accordance with a specific embodiment. FIGS. 16B-16F show more detailed views of identified portions of the example GUI illustrated in FIG. 16A. This GUI shows the cross of the IoT signal with the Household visitation in the real world joining (e.g., or intersecting with) IoT data set with Mobile Signals and POI Data sets over time. For example, as illustrated in the example embodiment of FIG. 16A, the interactive GUI is displaying filtered information characterizing how many households with IoT devices have visited various real-world restaurants over specified time intervals (e.g., which may be tracked via anonymized MD signal data).

For example, as illustrated in the example embodiment of FIG. 16A, IoT Insights GUI is configured to display at least one or more of the following types of content:

Total CTV impressions analyzed data (16D) (e.g., connected TVs), which, for example, may be automatically and/or dynamically generated by the Intuizi System using the IoT Data set.

Unique households data (16D), which, for example, may be automatically and/or dynamically generated by the Intuizi System using the IoT+Mobile Signal+POI Data sets.

Total POI Visit(s) data (16), which, for example, may be automatically and/or dynamically generated by the Intuizi System using the Mobile Signal+POI Data sets.

POI Insights data (16D), which, for example, may be automatically and/or dynamically generated by the Intuizi System using the POI Data set. As illustrated in the example embodiment of FIG. 16A, the POI Insights data may be presented in a manner which enables a viewer to quickly identify and determine the relative number of households which have visited specific categories of restaurants over one or more specified time intervals.

Graphical Insight information (e.g., Households by Visitation, 16E) graphically characterizing the relative percentage of households which have visited specific categories of POI over one or more specified time intervals. In the specific example embodiment of FIG. 16E, the displayed Category data may be automatically and/or dynamically generated by the Intuizi System using the POI data set, and the Household data may be automatically and/or dynamically generated by the Intuizi System using the IoT+Mobile Signal+POI Data sets.

Graphical Insight information (e.g., Category Device Counts 12D) characterizing and/or quantifying relationships between category device counts and POI. In the specific example embodiment of FIG. 16F, the displayed Category data may be automatically and/or dynamically generated by the Intuizi System using the POI data set, and the Household data may be automatically and/or dynamically generated by the Intuizi System using the IoT+Mobile Signal+POI Data sets.

Figure 16B:
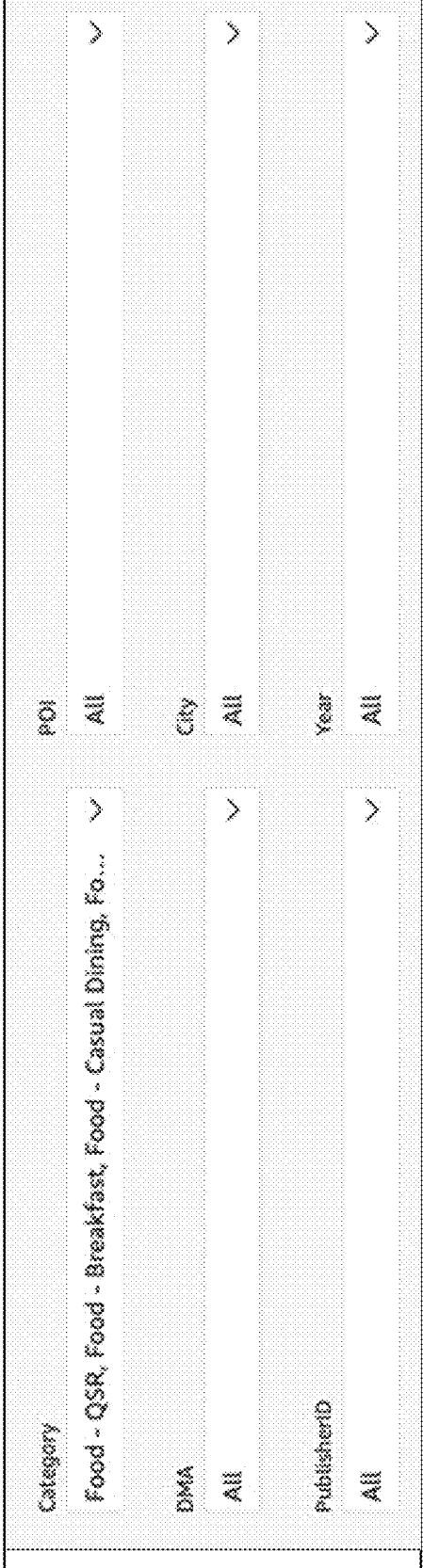
FIGS. 16B-16F show more detailed views of identified portions of the example GUI illustrated in FIG. 16A.
Figure 16C:
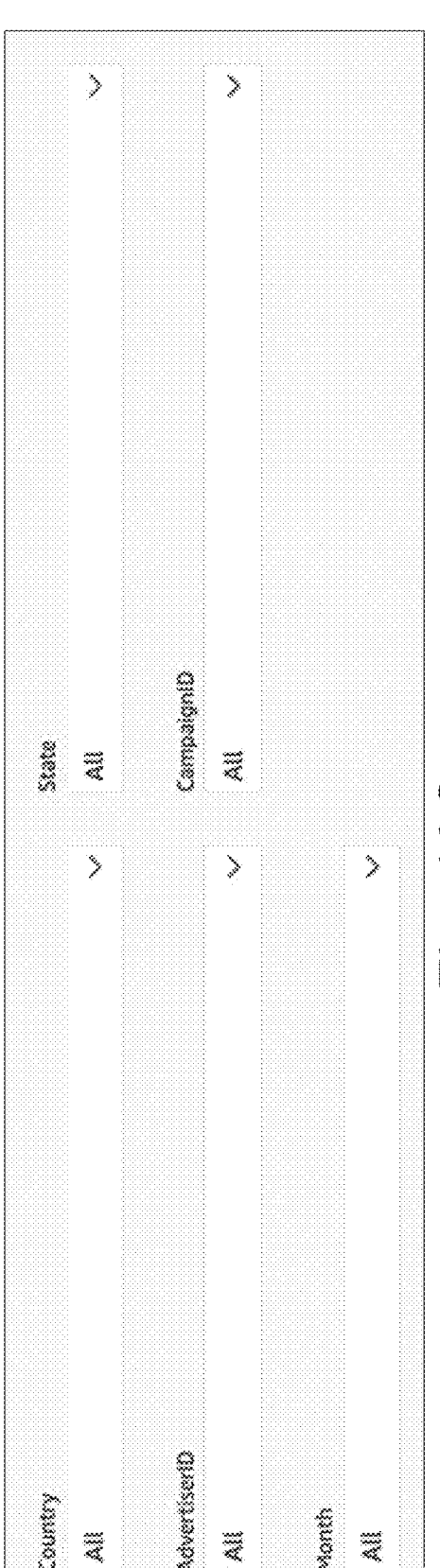
Figure 16D:
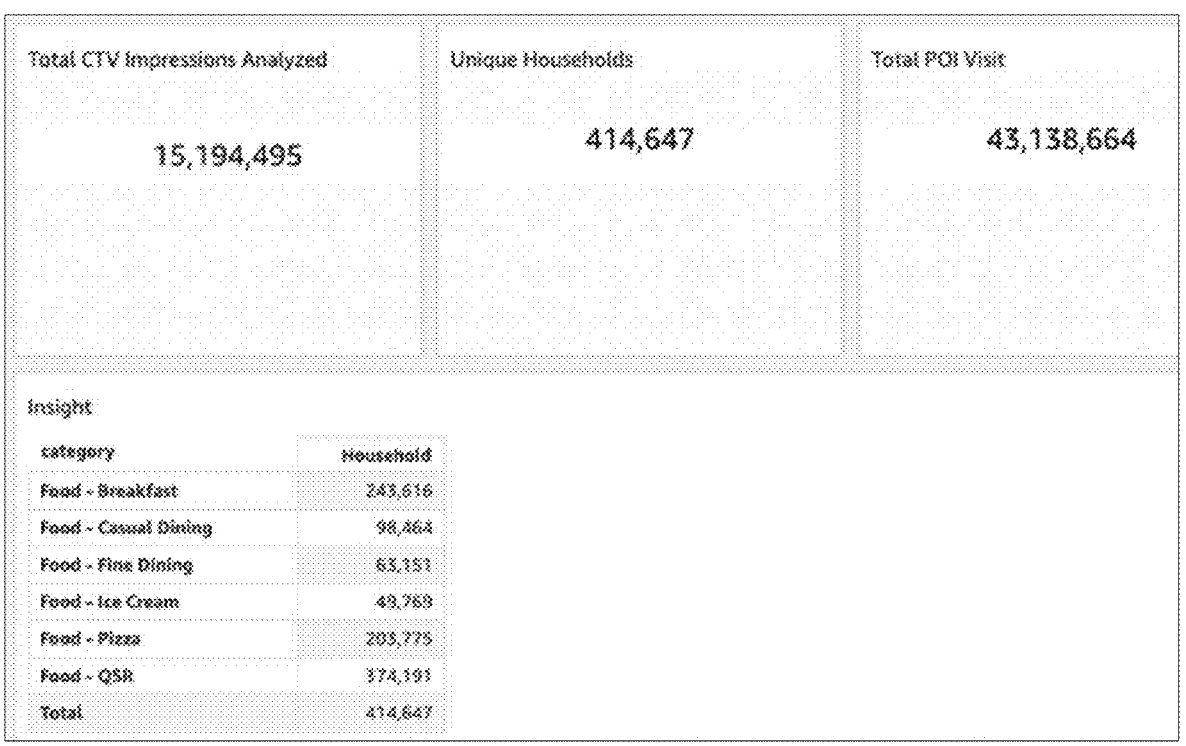

FIGS. 16B and 16C show the user-configurable filterable fields that can control the presentation of graphs and data tables displayed in the GUI by leveraging the individual rows of data in the POI and/or IoT Data sets. For example, FIG. 16D shows the summary information of the join by doing a sum of total on Connected TV impressions, Unique Households identified, and Total POI visits. It also provides a summary pivot table aggregated by the Category dimension from the POI data set while summing the Household data totals from the IOT data set.

Figure 16F:
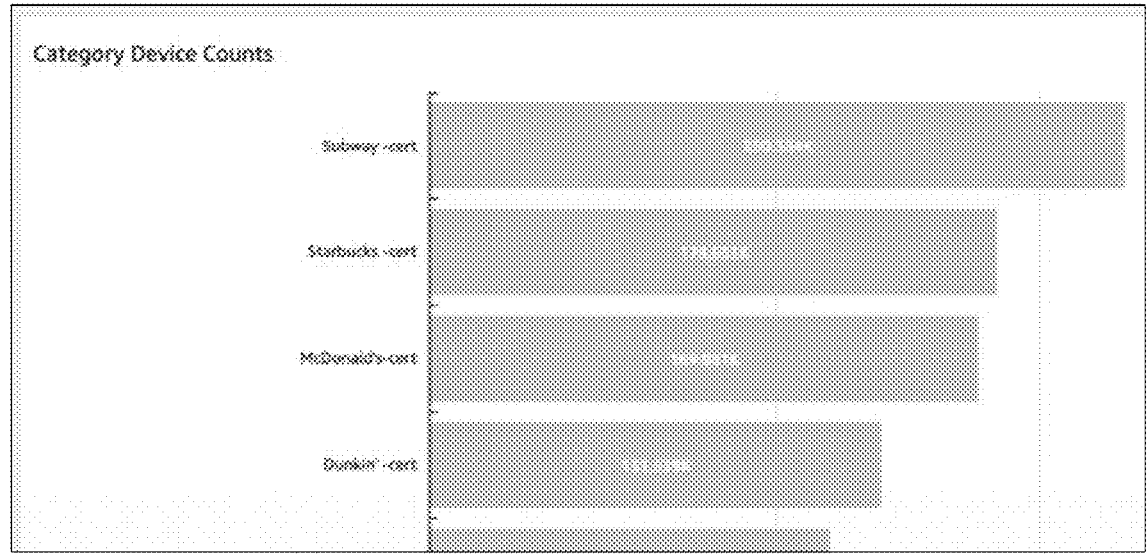
Figure 16E:
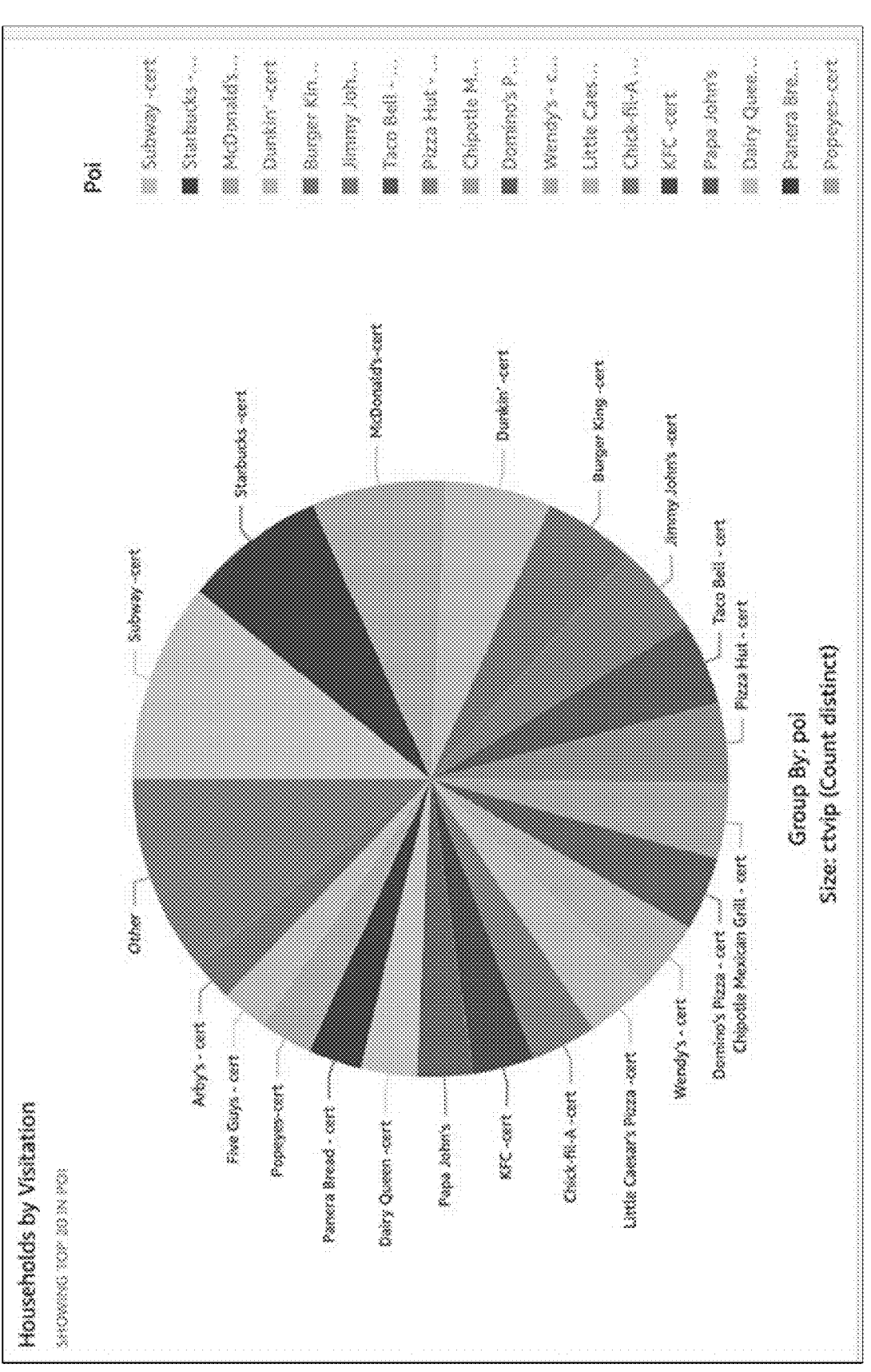

FIG. 16E shows a pie chart of the sum total household visitation from the IOT data set aggregated by the brand name of the POI data set.

FIG. 16F shows a rank order bar chart of total devices from the Signals data set organized and filtered by the POI data set and IoT Data set.

As illustrated in the example embodiment of FIG. 16A, the Filtered IoT Insights GUI includes customizable data filtering functionality for enabling users (e.g., Signal Viewers) to selectively display filtered signal information using various filter criteria, including, for example, one or more of the following (or combinations thereof):

Publisher ID

Category

POI

Country

State

City

Month/Year/Time Period(s)

DMA

Ad ID

Campaign ID

Etc.

Figure 17A:
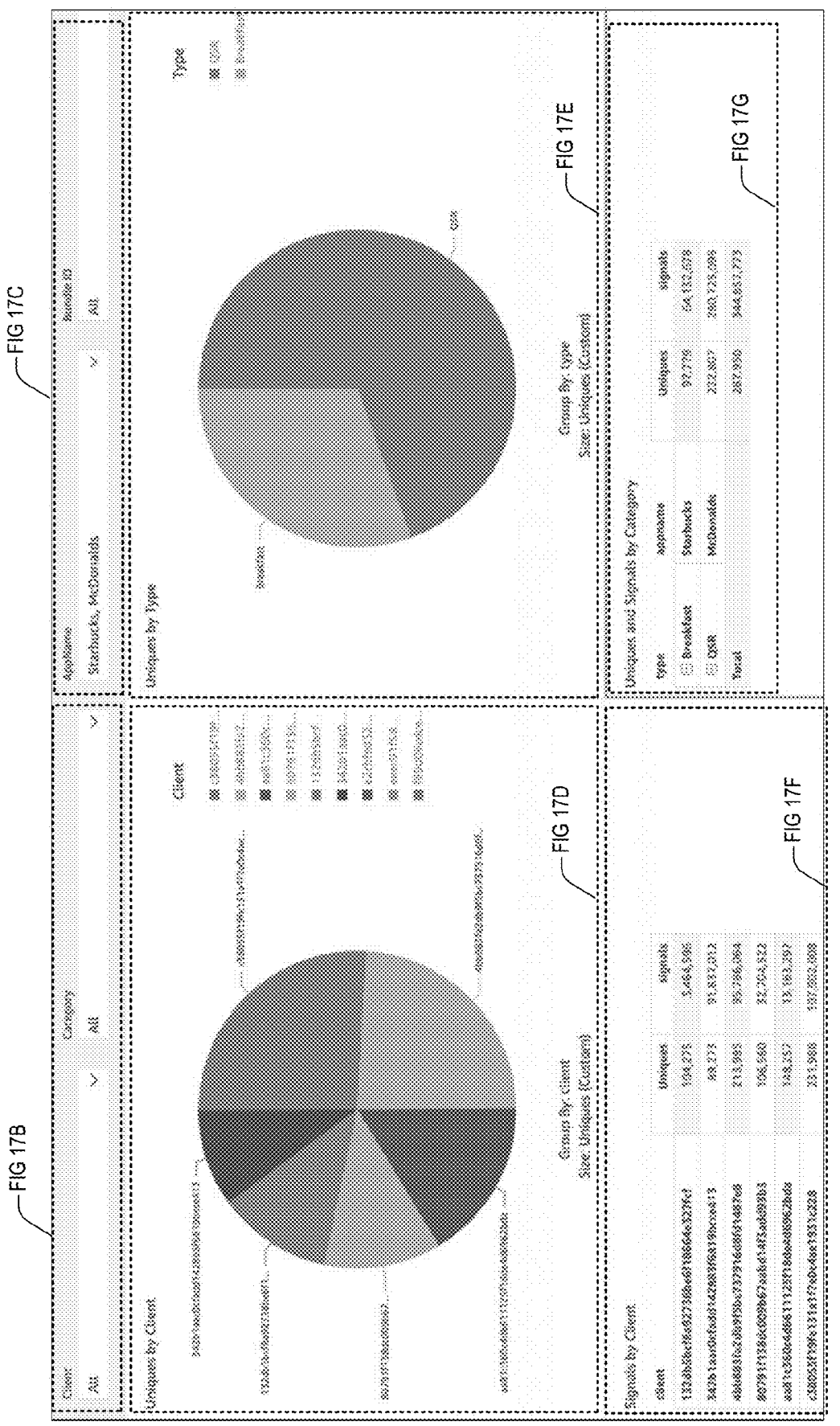
FIG. 17A shows an example screenshot of an interactive AppGraph Insights GUI in accordance with a specific embodiment.

FIG. 17A shows an example screenshot of an interactive AppGraph Insights GUI in accordance with a specific embodiment. FIGS. 17B-17G show more detailed views of identified portions of the example GUI illustrated in FIG. 17A.

According to different embodiments, data presented in the Appgraph Insights GUI(s) may be filtered by client, category, app name, bundleID, etc. (FIGS. 17B and 17C). These filters control the rest of the page and are persistent across the analysis.

Figure 17D:
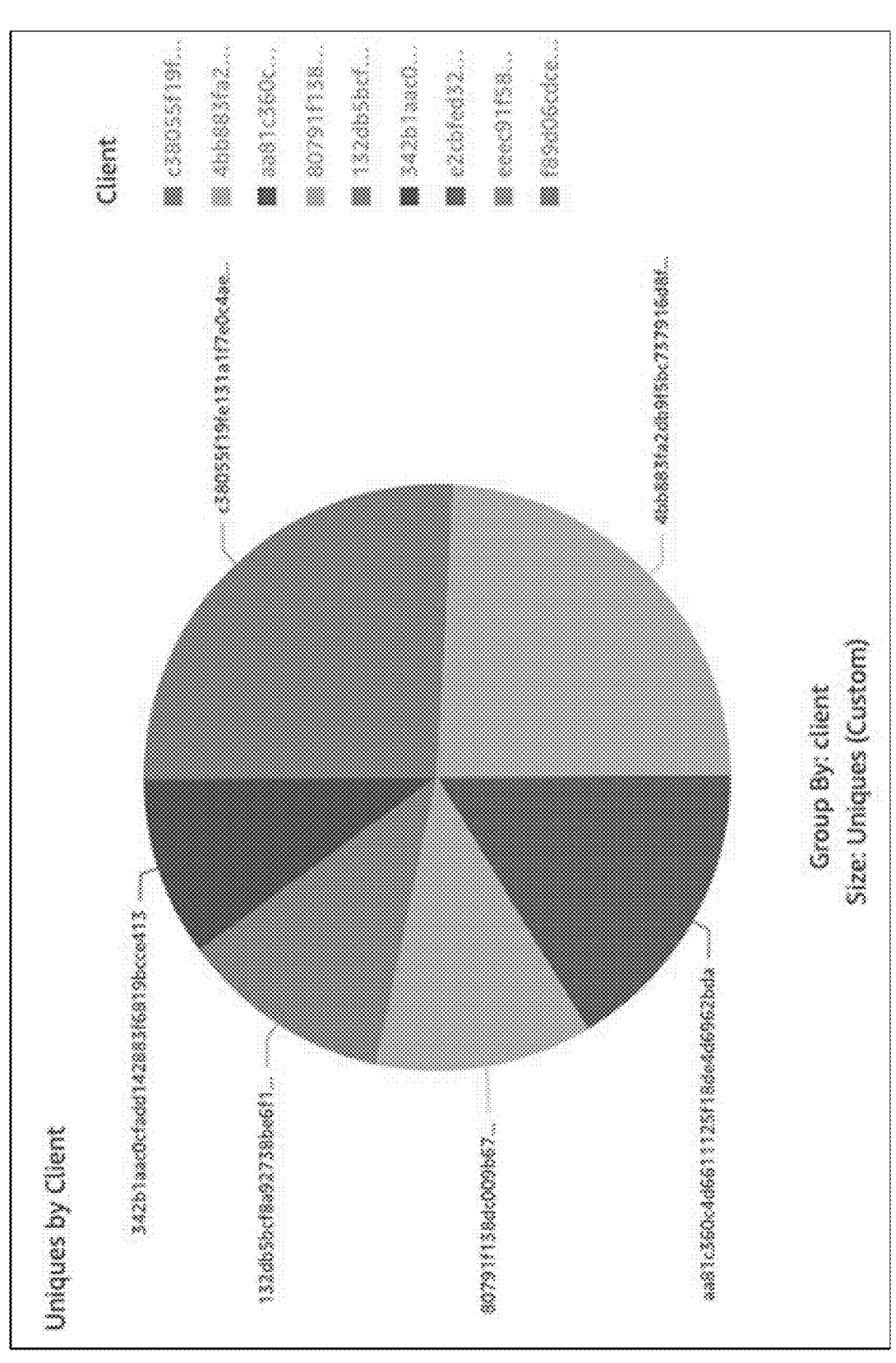

FIG. 17D shows, in graphical form, what percentage of the result set is available from different signal providers. The displayed data may be automatically and/or dynamically generated by the Intuizi System using AppGraph+Mobile Signals data sets.

Figure 17E:
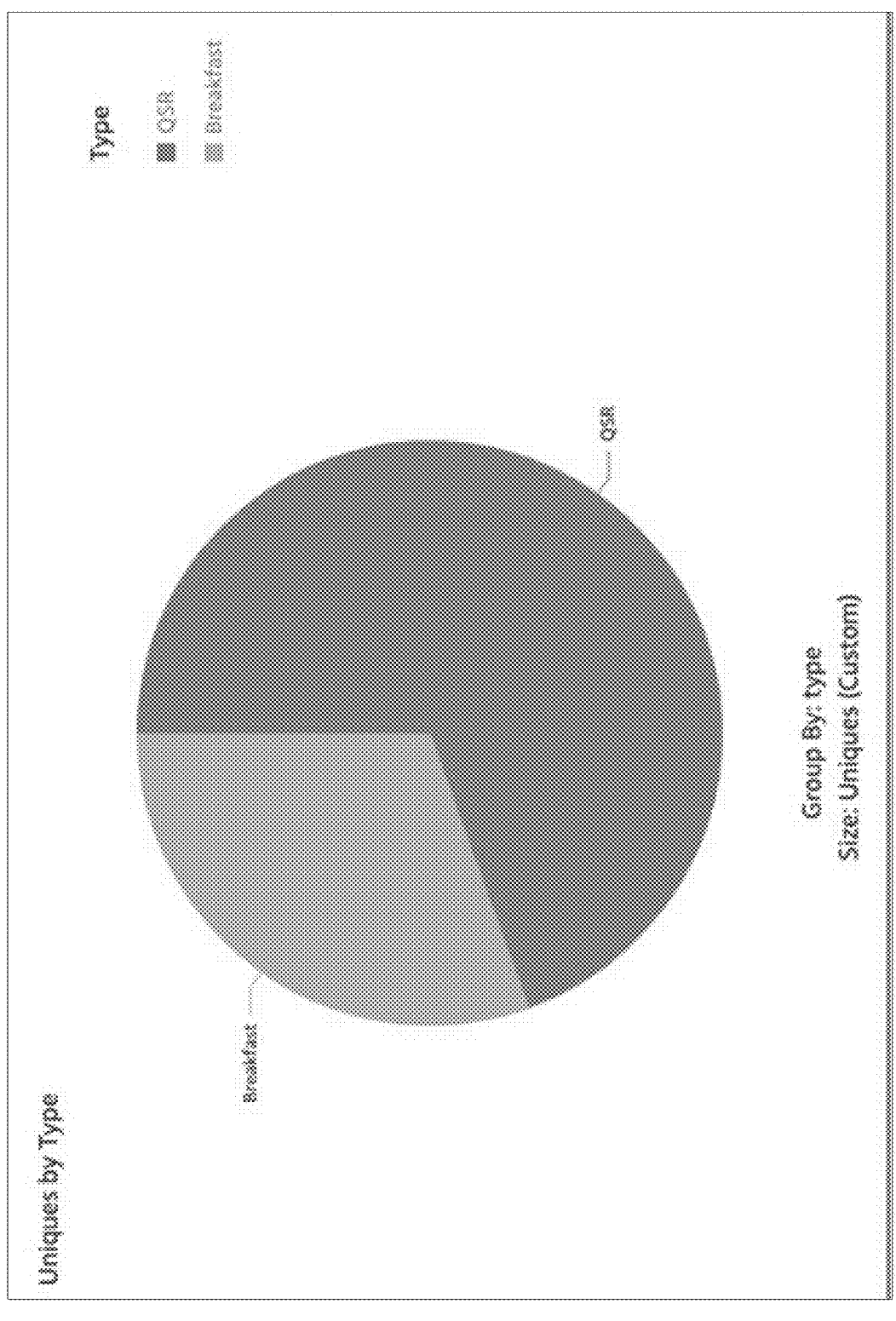

FIG. 17E shows what app category the selections fall under. The displayed data may be automatically and/or dynamically generated by the Intuizi System using App-Graph+Mobile Signals data sets.

FIG. 17F shows the total uniques and available signals within a specified time period (e.g., w/in last 7 days) by one or more signal provider(s). The displayed data may be automatically and/or dynamically generated by the Intuizi System using AppGraph+Mobile Signals data sets. For example, in one embodiment, the displayed client data may be generated using Mobile Signal data set, and the displayed Uniques and signals data may be calculated using Mobile Signals+Appgraph data sets.

FIG. 17G shows a pivot table characterizing Uniques and Signals by category, and may include category type data (e.g., generated using AppGraph data set), app name data (e.g., generated using AppGraph data set), total unique encrypted 1st party ids and total available signals (e.g., both calculated using AppGraph+Mobile Signals data sets). The displayed data may be automatically and/or dynamically generated by the Intuizi System using AppGraph+Mobile Signals data sets.

Figure 18A:
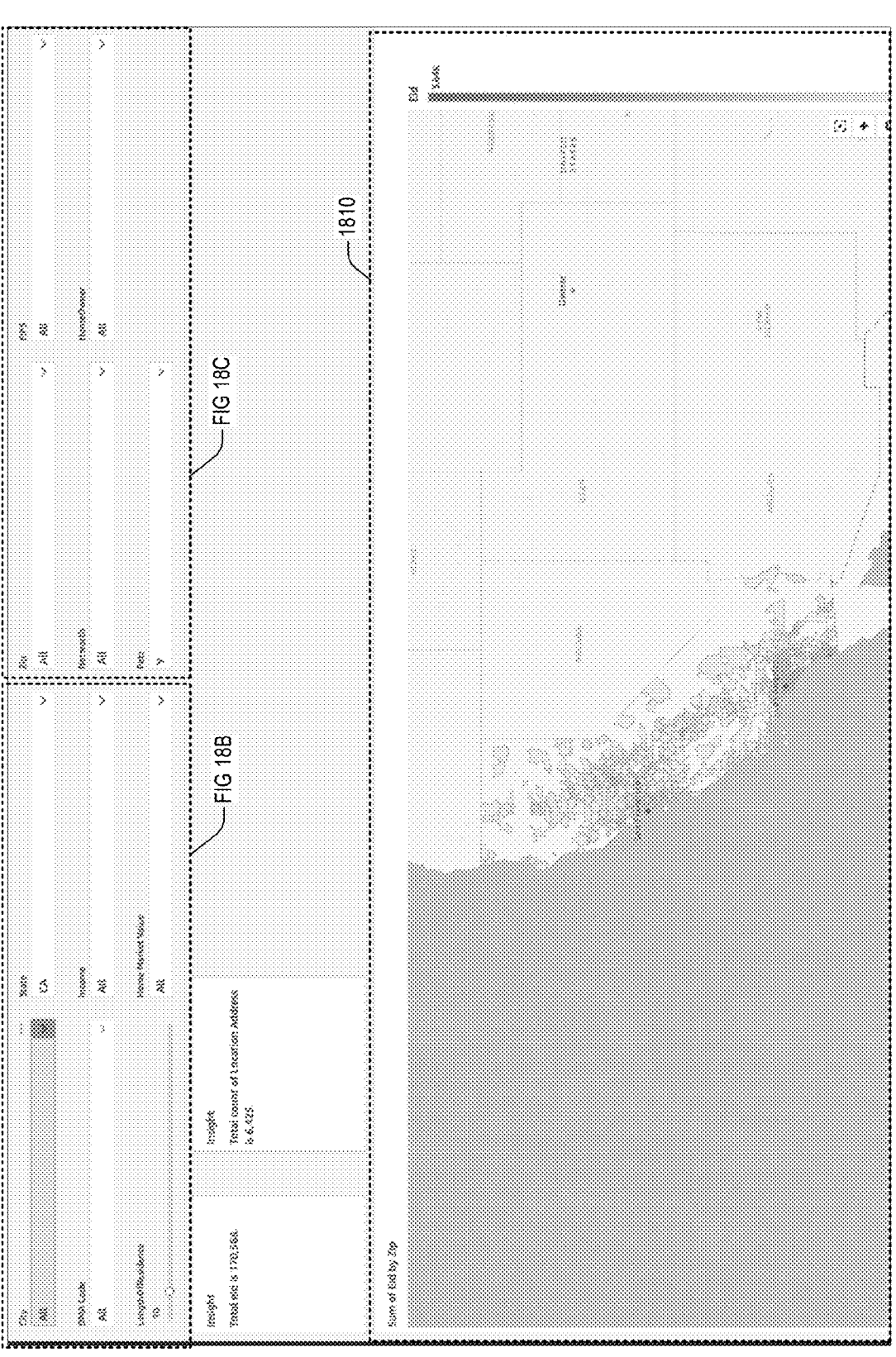
FIG. 18A shows an example screenshot of an interactive ECommerce Insights GUI in accordance with a specific embodiment.
Figure 18B:
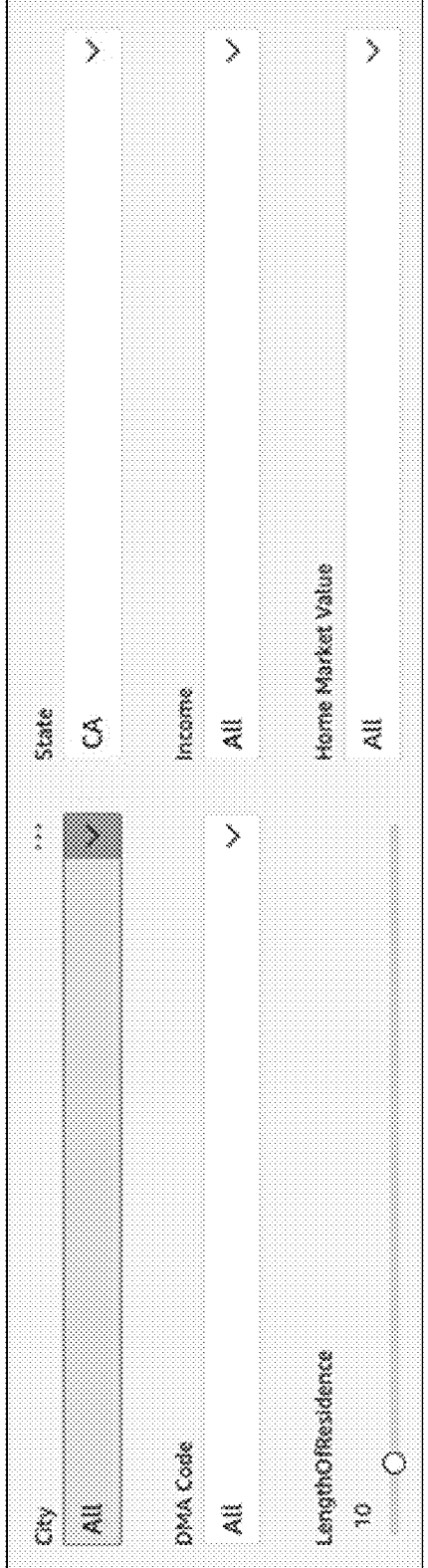
Figure 18C:
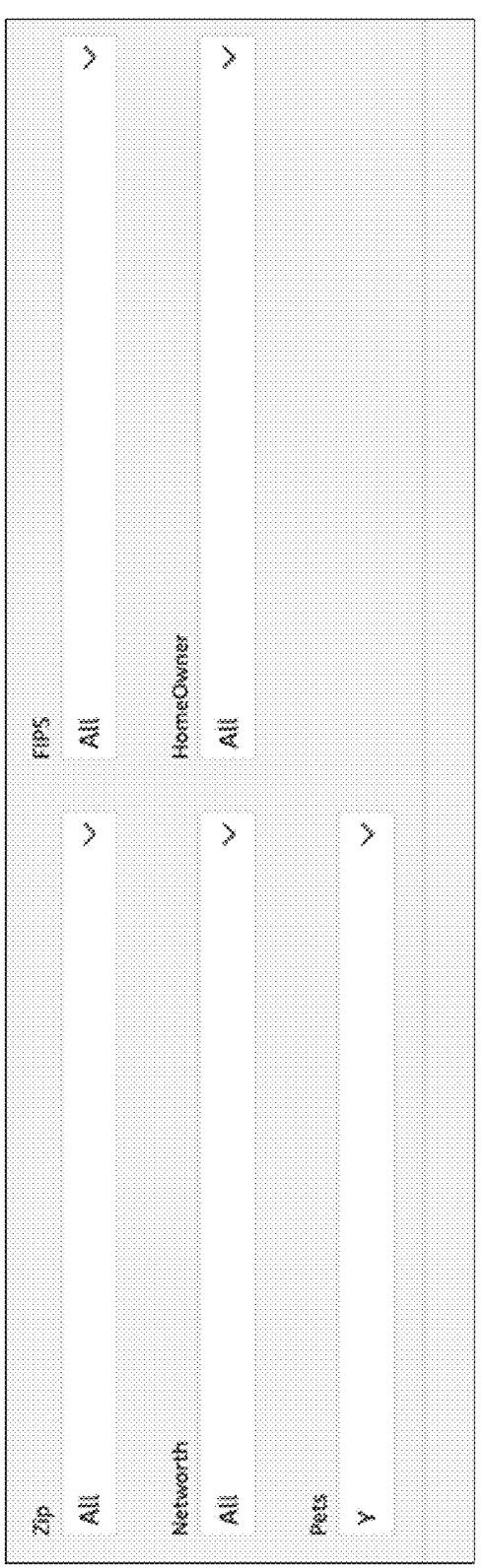
Figure 18D:
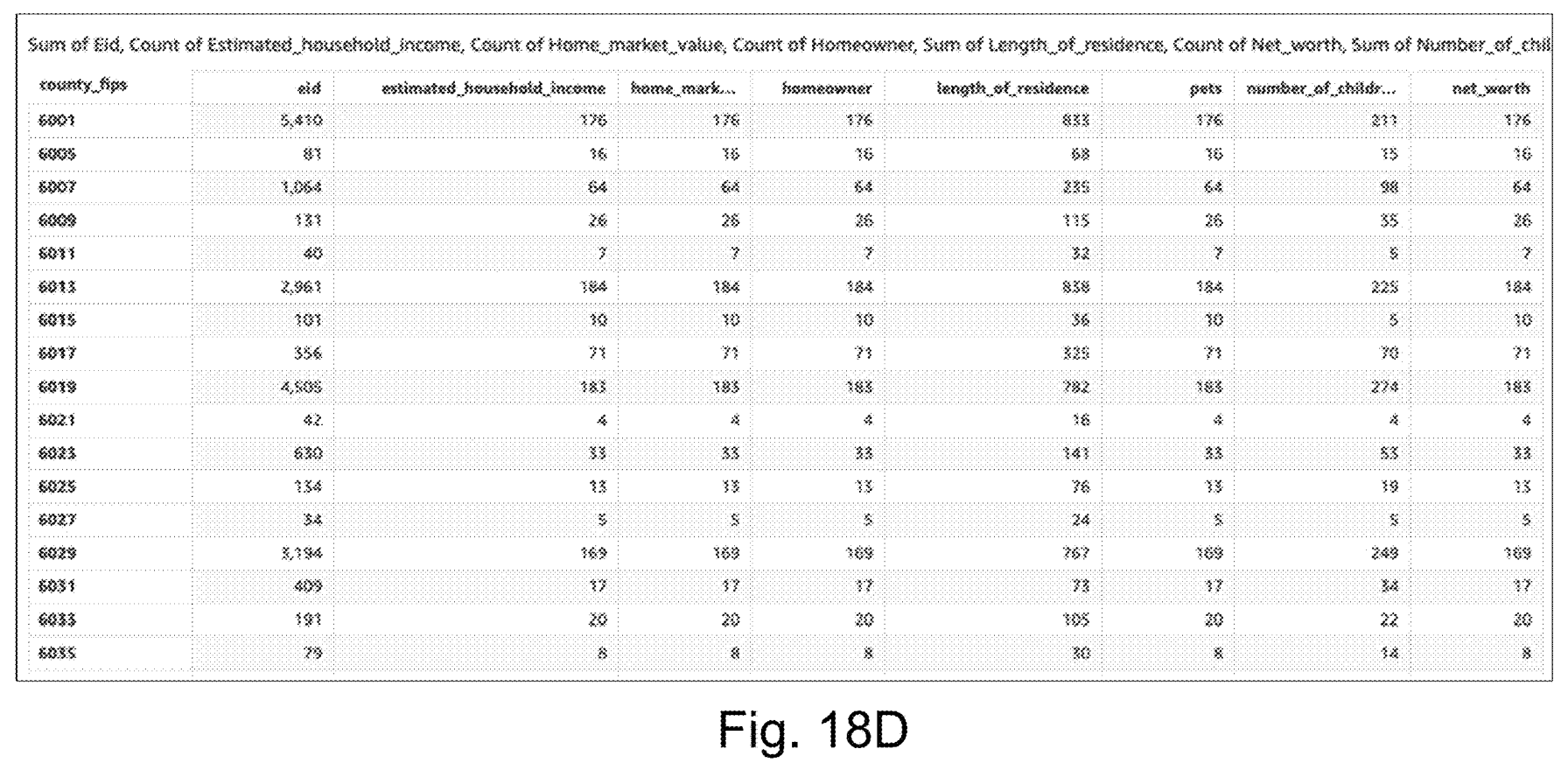

FIG. 18A shows an example screenshot of an interactive ECommerce Insights GUI in accordance with a specific embodiment. FIGS. 18B-18D show more detailed views of identified portions of the example GUI illustrated in FIG. 18A.

FIG. 18B and FIG. 18C show filterable drop downs and sliders that can be populated with various eCommerce Aggregate categories (e.g., pet ownership, length of residence, car maker preference, etc.) which can be applied to filter content displayed via the GUI. In at least one embodiment, the Ecommerce Insights GUI may be configured or designed to display a heat map visualization of the data, filtered according to the specified criteria. For example, as illustrated at 1810, a heat map is displayed of all county FIPS codes matching the specified filter criteria, some data of which may be highlighted and colorized based on the respective number of the result records.

In the specific example embodiment of FIG. 10A, it is assumed that a user has interacted with the Ecommerce Insights GUI to configure the following filter criteria:

City=All

State=CA

DMA Codes=All

Income=All

Length_of_Residence=at least 10 years

Zipcodes=All

FIPS=All

Networth=All

Is_Home_Owner=All

Has_Pets=Y

Figure 19:
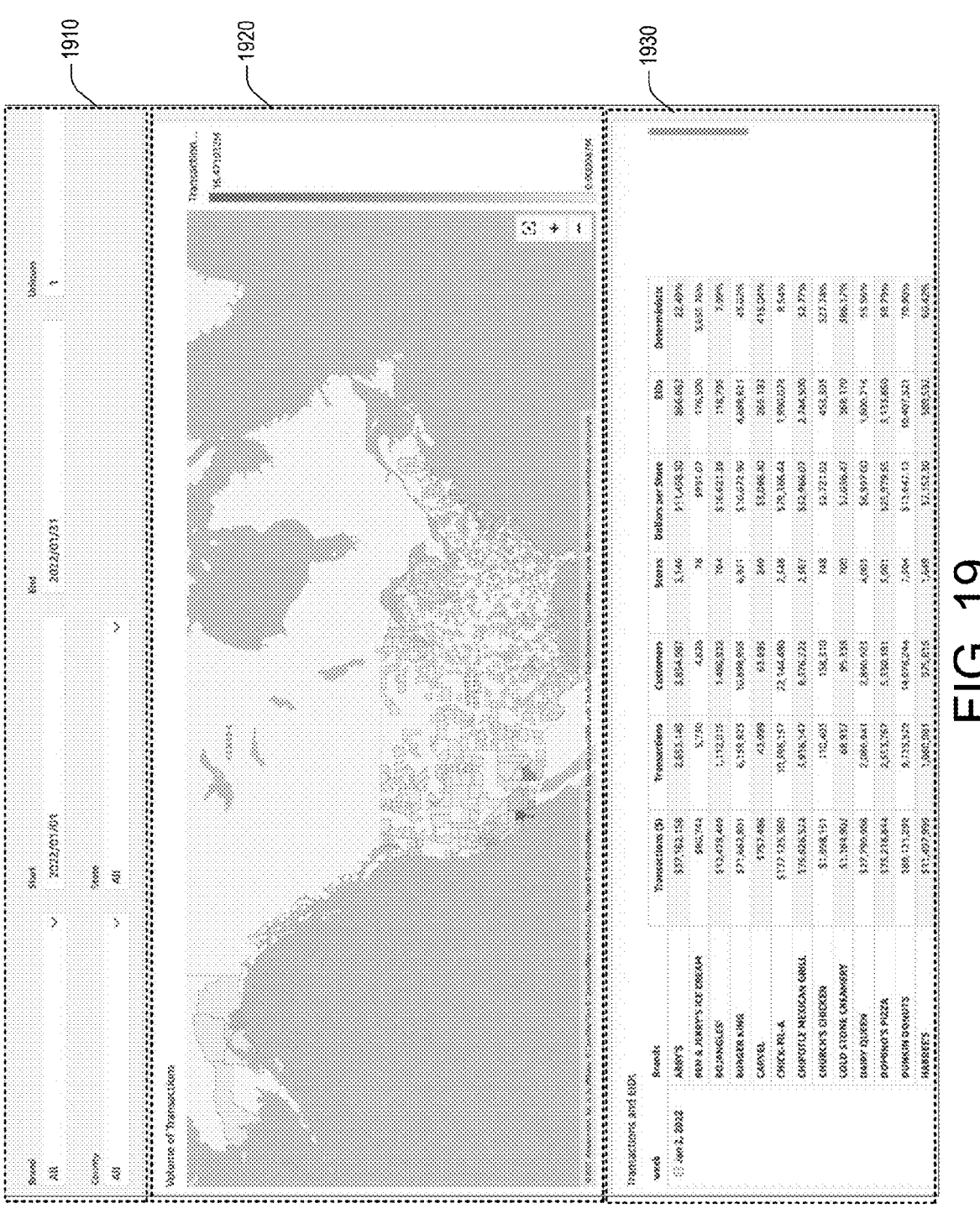
FIG. 19 shows an example screenshot of an interactive Aggregate Transaction GUI in accordance with a specific embodiment.

FIG. 19 shows an example screenshot of an interactive Aggregate Transaction GUI in accordance with a specific embodiment. More specifically, FIG. 19 shows a visualization of the aggregate transaction data set in conjunction with the signal and point of interest data sets. Filter GUI portion 1910 is configured or designed to display interactive, filterable drop downs which can be applied to filter content displayed via the GUI. In one embodiment, the default GUI enables functionality for filtering of Brand (e.g., Starbucks, McDonalds, etc), Time Series dropdowns, Minimum Unique counts, Country Name, State, etc.

GUI portion 1920 is configured or designed to display a visual representation (e.g., geographical "heat" map) of county FIPS colorized according to the number of FIPs records for different geographic regions.

GUI portion 1930 is configured or designed to display a pivot table aggregated by week and brand with values displaying total transaction volumes in dollars, total transaction volume in counts, customers, store counts in county, average tracked dollars per store, sum on encrypted identifiers, the deterministic percentage the identifiers represent of the customer count, etc.

In at least one embodiment, the GUI of FIG. 19 may be configured or designed to display an intersection of aggregated credit card transaction data as aggregated by week, brand, and county FIPS. The Intuizi System receives first party data which includes aggregated credit card transaction receipts from a subset of brands from point of sale systems, and processes the received data to determine the total amount of transactions, for example, by week and by a particular county. The Aggregate Transaction GUI is configured or designed to enable users to explore the processed data as it is joined against the Intuizi dataset of point of interest, as well as the PII Anonymized signal data that is generated from GPS coordinates from mobile phones with their encrypted identifiers.

Figure 20A:
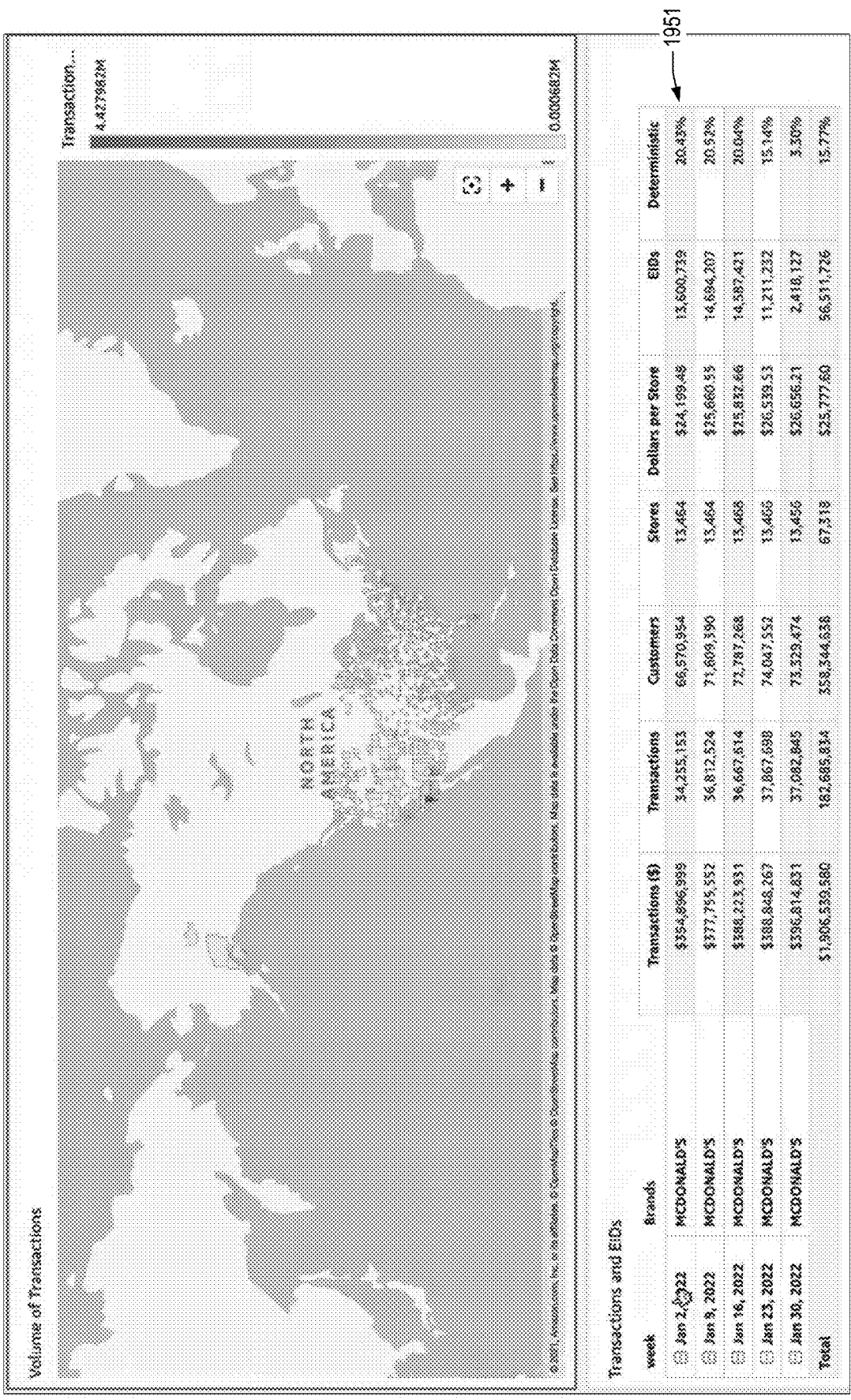

FIG. 20A shows and example screenshot of an interactive Aggregate Transaction GUI portion which has been configured or designed to display filtered transaction data in accordance with the filter criteria selected by the user/signal viewer.

By way of illustration with reference to FIG. 20A, Filter GUI portion (e.g., 1910, FIG. 19) may be configured (e.g., by a signal viewer) to select the brand "McDonalds" from the "Brands" filtering interface. In response, as illustrated in the example embodiment of FIG. 20A, the Intuizi System may display McDonalds-related credit card transaction data (e.g., for all US states). As illustrated at 1951 in the example embodiment of FIG. 20A, the week of January 2nd had $354 million worth of transactions from 13,464 stores, with 34 million individual transactions from 66,570 individual customers. The Intuizi System may automatically and dynamically determine the number of stores (e.g., 13,464) by looking at the entire county and identifying how many points of interests are in that county. The Intuizi System may automatically and dynamically calculate dollars per store as a division of the transaction totals (e.g., for a given week) divided by the number of stores. Additionally, using the number of stores data (e.g., which may be determined using point of interest data), the Intuizi System can also determine the aggregate number of encrypted identifiers (13,600,739) in that location. Additionally, using this information, the Intuizi System can also determine the relative amount of determinism which is represented by the total number of customers over the specified time period. For example, as illustrated in the example embodiment of FIG. 20A, the Intuizi System is able to identify anonymous signals from 13.6 million encrypted identifiers from 66 million customers, which allows the Intuizi System to calculate that there is about 20% deterministic match of customers. This information is presented by the Intuizi System to the end user or signal viewer via GUIs in an intuitive and easily interpretable manner which enables the end user to quickly and easily interpret the data, and identify patterns and/or other notable aspects of the data, thereby facilitating the user in evaluating and understanding the relative sample size of the data being viewed, and whether any decisions can be made and applied to the whole of the customers.

According to different embodiments, the Intuizi System may be configured or designed to include functionality for processing and displaying comparisons across week, across brands, etc. For example, as illustrated in the example embodiment of FIG. 20B, it is assumed that the user has added "Burger King" to the Brand filter field. In response, the Intuizi System updates the content displayed in the GUI to include both McDonalds-related transactions and Burger King-related transactions, which may be organized and compared in accordance with to the user's comparison preferences (e.g., compare weekly aggregated transaction data), as illustrated, for example, in FIG. 20B. This may be useful for a variety of use cases in aggregate form as well as for other decision making tools/procedures.

Example Audience Explorer GUIs

FIGS. 21A-26 illustrate example screenshots of various Audience Explorer-related GUI embodiments which may be used to facilitate, initiate and/or perform various operation(s) and/or action(s) relating to the Intuizi Technology, including, for example, presentation of dynamically filterable, encrypted Aggregated Signal Data organized in a manner which facilitate insights of trading area-related consumer behavioral activity, as well as strategic business opportunities related thereto.

Figure 21A:
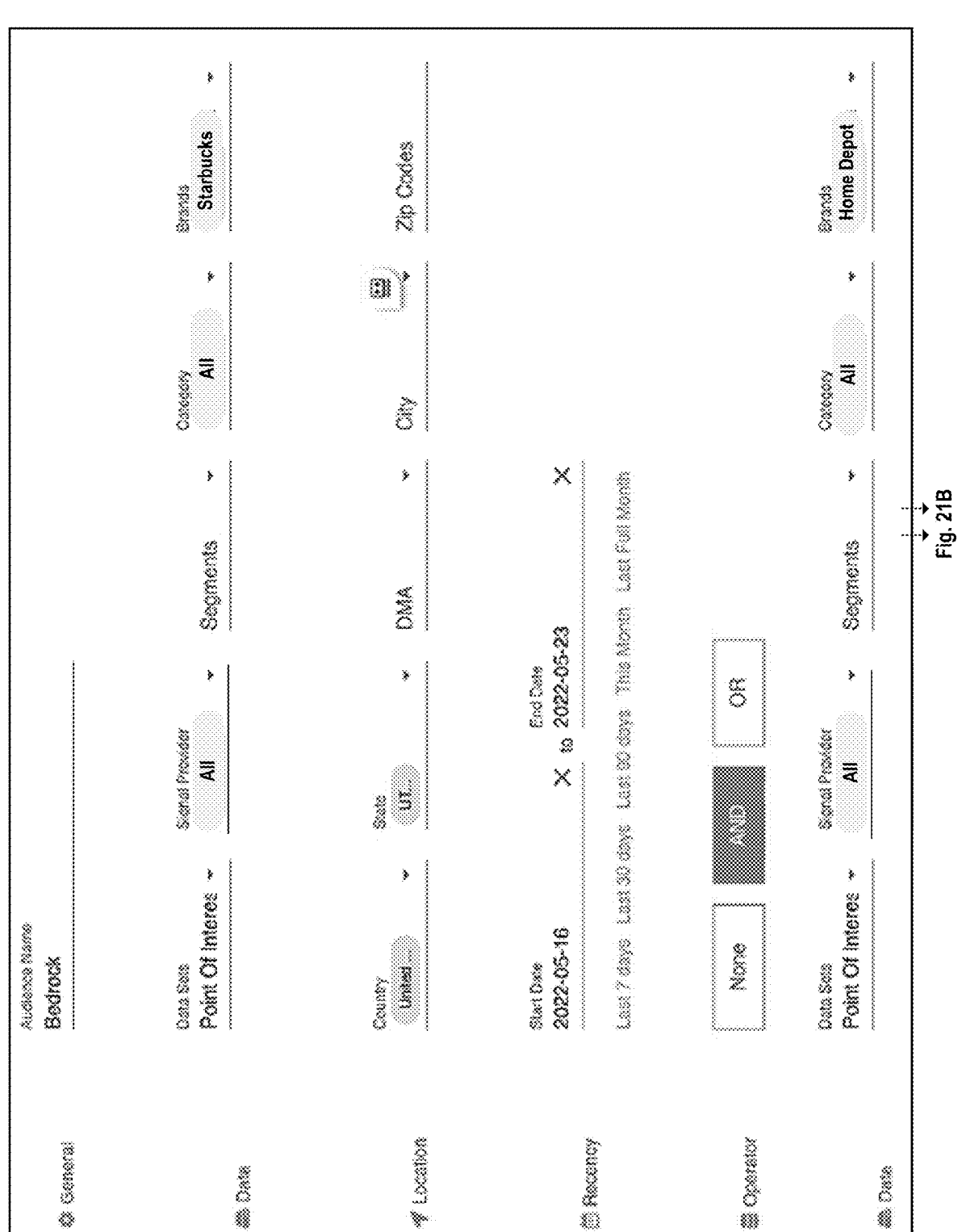
FIGS. 21A-B, and 22-26 illustrate example screenshots of various Audience Explorer-related GUI embodiments.
Figure 21B:
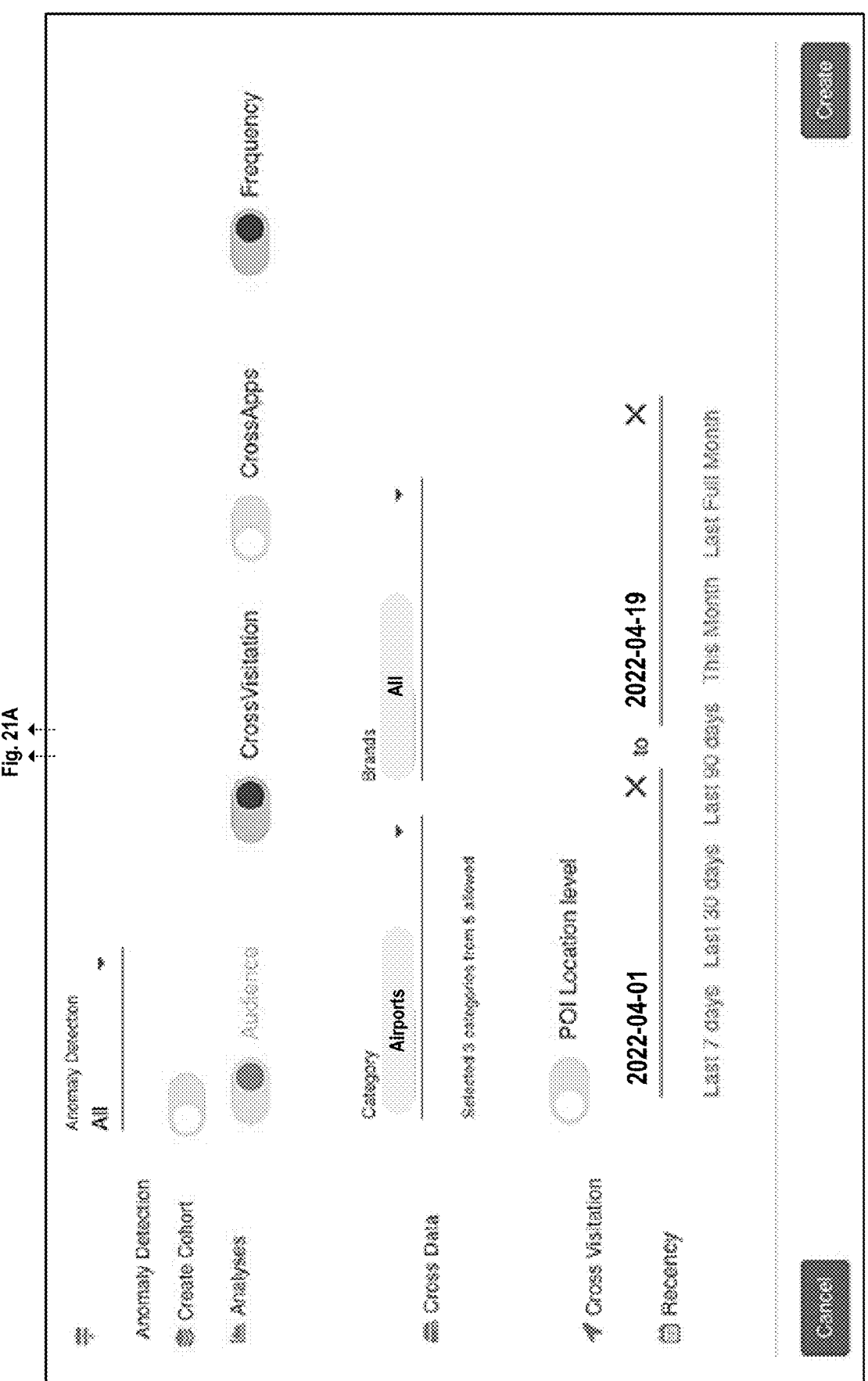

FIGS. 21A and 21B show example screenshots of portions of an interactive Custom Audience Creation GUI in accordance with a specific embodiment. In at least one embodiment, the Custom Audience Creation GUI is configured or designed to enable a user to select and configure the various filter parameters to be applied to generate the desired set of audience data, in accordance with the user's preferences.

According to different embodiments, the Custom Audience Creation GUI is configured or designed to enable users to select desired Audience data set(s) from a drop-down selection interface, which may include, for example:
Point of Interest data,
IoT Data,
Appgraph Data,
Financial Transaction Data, eCommerce Data,
Geolocation Data,
Mobile Signal Data,
Brand Data,
and/or other types of data.

Each data set triggers custom filters that pertain to the selected data set. Each data set can be combined with one or more Boolean operators such as, for example, AND, OR, etc. If applicable the user may select a specific time series (e.g., Last 7 Days, Last 30 Days, etc.) or may specify a custom time series to limit the data that is being queried.

In at least one embodiment, the Custom Audience Creation GUI may be configured or designed to provide different levels of anomaly detection functionality which may be selected by the user, for example, to remove statistically abnormal outliers from the results of the query. In one embodiment, an Anomaly Detection Review drop-down interface allows the user to select a desired level of confidence in the result set which affects any probabilistic matching.

In at least one embodiment, the Custom Audience Creation GUI may also be configured or designed to provide additional functionality for enabling users to selectively add other analyses features, such as, for example:
CrossVisitation—e.g., for mobile devices/signals associated with a given cohort, where else (or which other PoIs) did those mobile devices/signals visit?
CrossApps—e.g., for mobile devices/signals associated with a given cohort, what other apps have been recorded to (or associated with) the same persistent anonymous identifiers associated with the cohort?
Frequency—e.g., for mobile devices/signals associated with a given cohort, how many occurrences is each mobile signal detected in the cohort data over one or more specified time periods?

In at least one embodiment, a cohort may be defined as a resulting set of Audience data matching a given set of Audience selection criteria (e.g., which may be specified via the Custom Audience Creation GUI).

By way of illustration, using the Custom Audience Creation GUI, a user may start with creating a custom audience with the intersection of two separate data sets. The user may use the Custom Audience Creation GUI to query these data sets and find the commonalities between them. For example, the user may create a custom audience named "Bedrock", and may selectively configure the various fields of the Custom Audience Creation GUI according to the user's preferences. For example, referring FIGS. 21A and 21B, the user may configure the fields of the Custom Audience Creation GUI as follows:
Audience Name=Bedrock
Data Set1=Point of Interest
   Signal Provider(s)=All
   Segments=All
   Category=All
   Brands=Starbucks
Location1
   Country=USA
   State=CA
   DMA=All
   City=All
   Zip Code=All
Operator: AND
Data Set2=POI
   Signal Provider(s)=All
   Segments=All
   Category=All Brands=Home Depot
Location2
   Country=USA
   State=CA
   DMA=All
   City=All
   Zip Code=All
Recency
   Start Date=2022 Apr. 1
   End Date=2022 Apr. 19
Anomaly Detection=All
Create Cohort=Off
Analyses
   Audience=On
   CrossVisitation=On
      Category=Airports
      Brands=All
   CrossApps=Off
   Frequency=On In this example, it is assumed that the user is querying to see how many people (in an encrypted identifier form, particularly the anonymous versions of the ad identifiers associated with GPS coordinates) visited a Starbucks and then also visited a Home Depot within the specified time window(s).

Figure 22:
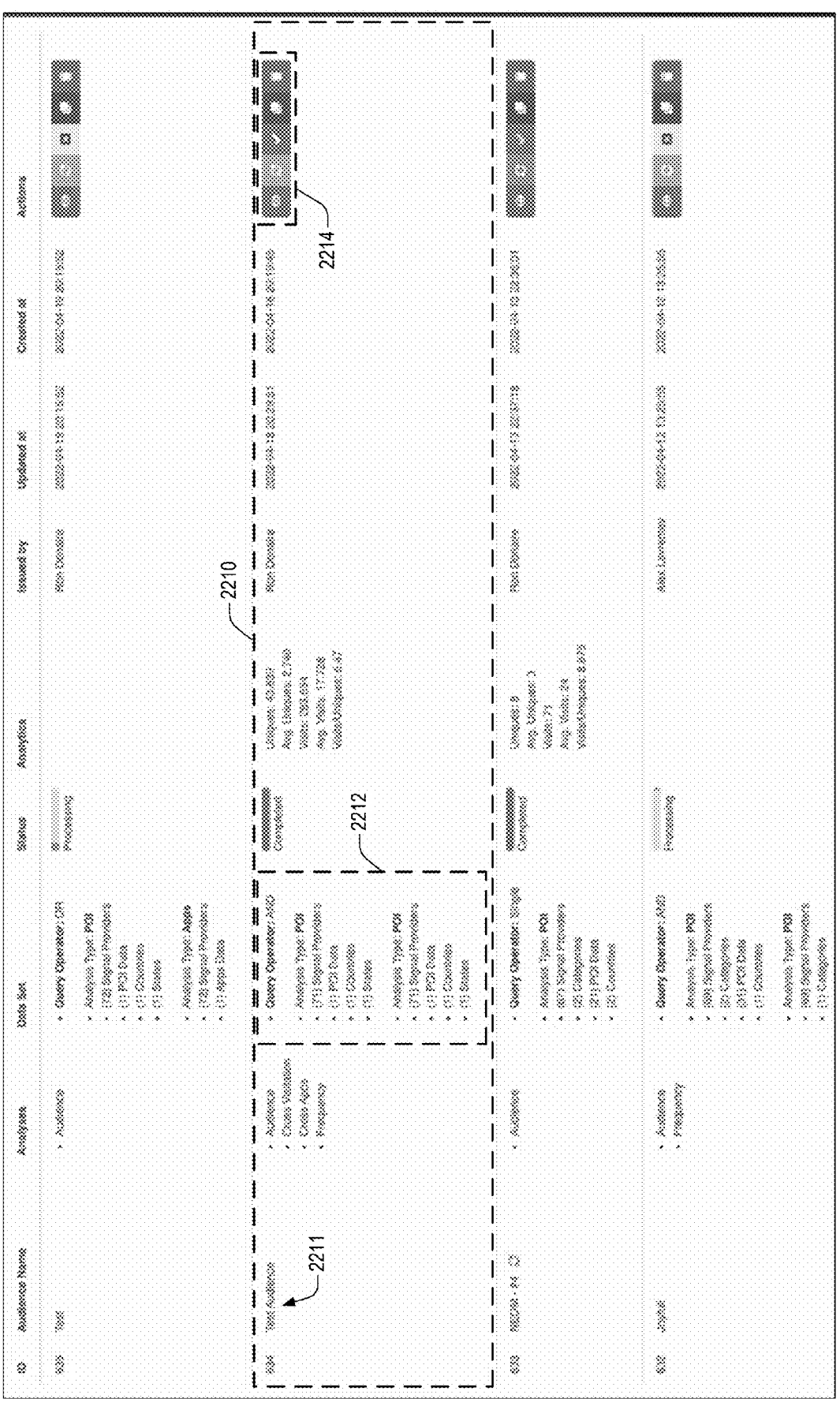

FIG. 22 shows an example screenshot of an interactive My Audiences GUI in accordance with a specific embodiment. As illustrated in the example embodiment of FIG. 22, My Audiences GUI shows a historical list of the most recently created Custom Audiences ("Audience records") which were created by a user via the Custom Audience Creation GUI, along with the current status or state of analysis. According to different embodiments, each Customized Audience record 2210 may include one or more of the following (or combinations thereof):

Audience ID (e.g., 634)

Customer-defined Audience Name 2211 (e.g., "Test Audience")

Analyses—Listing of Analyses performed (e.g., Audience, Cross Visitation, Cross Apps, Frequency, etc.)

Data Set 2212— Summary of customized audience selection criteria associated with Audience record.

Status—Current status of customized audience creation processing.

Analytics—Summary of analytic data associated with Audience record such as, for example summary of total unique identifiers, the average uniques per day, total summed visits for the time period, average visits per day, total visits per unique, etc.

Issued by—Identity of user who created the Audience record.

Updated at—Information relating to when the Audience record was last updated.

Created at—Information relating to when the Audience record was created.

Available Actions 2214—Available follow-up actions which may be performed using the Audience record, such as, for example: reviewing the detail, setting a recurring schedule, activating to a 3rd party endpoint, cloning the audiences, modifying the audience selection criteria, deleting the audience, etc.

Figure 23:
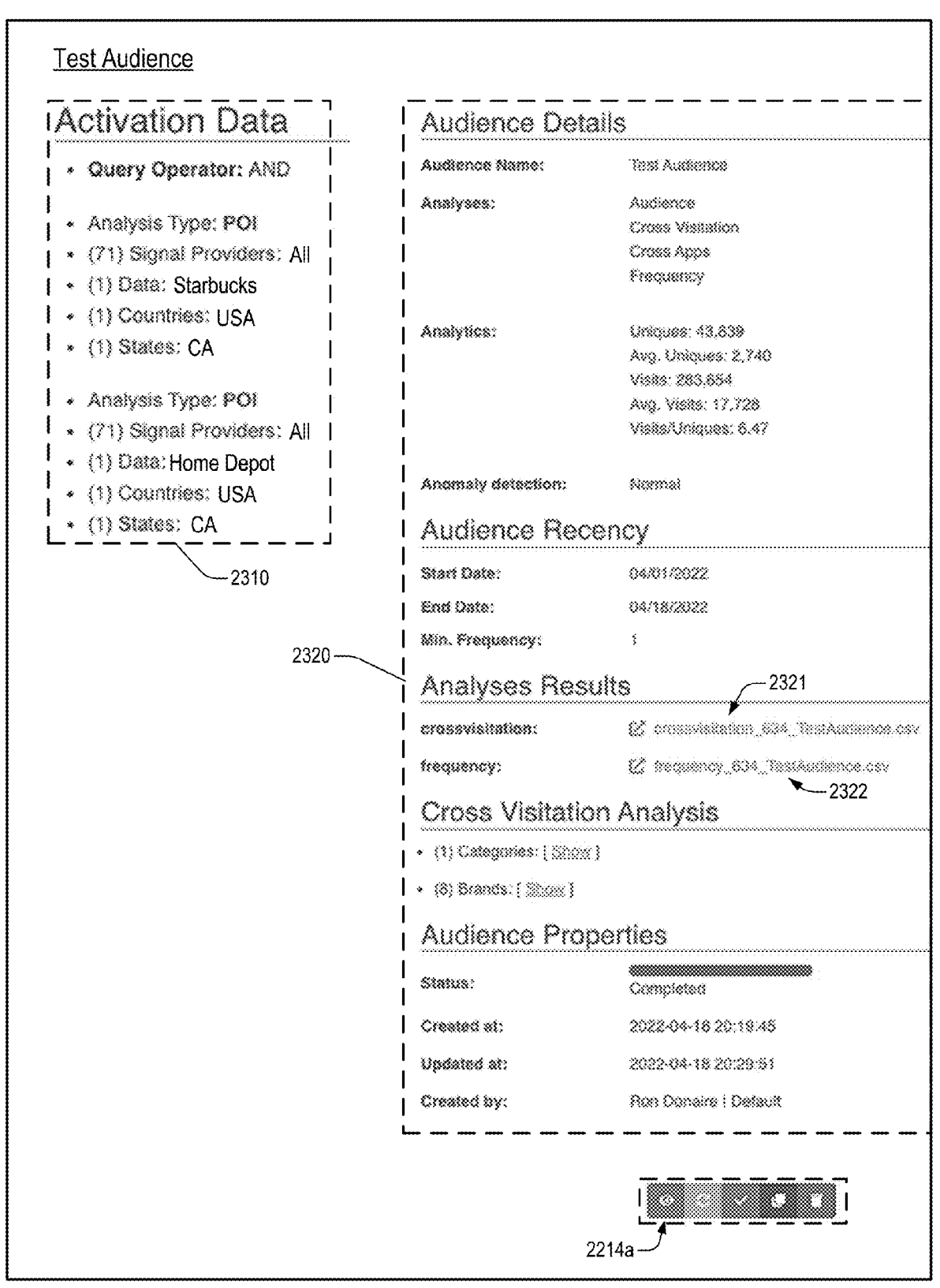

FIG. 23 shows an example screenshot of an interactive Custom Audience Details GUI in accordance with a specific embodiment. In at least one embodiment, the Custom Audience Details GUI may be configured or designed to display details relating to a selected Audience record. For example, a user may elect to view and/or access the details of Audience record 2210. The Intuizi System may respond by dynamically generating and displaying the Custom Audience Details GUI of FIG. 23.

As illustrated in the example embodiment of FIG. 23, the Custom Audience Details GUI may be configured or designed to display various types of content relating to the identified Audience record, including, for example, one or more of the following (or combinations thereof):

Activation Data 2310—Summary of customized audience selection criteria associated with identified Audience record.

Audience Details data, including, for example:
   Audience Name
   Analyses data—Listing of Analyses performed (e.g., Audience, Cross Visitation, Cross Apps, Frequency, etc.)
   Analytics data—Summary of analytic data associated with Audience record such as, for example: summary of total unique identifiers, the average uniques per day, total summed visits for the time period, average visits per day, total visits per unique, etc.
   Anomaly Detection criteria Audience Recency data, including, for example: Start Date, End Date, Min. Frequency data, etc.

Analyses Results data, including, for example: data and/or links/URLs for viewing results of Cross Visitation analysis, Cross Apps analysis, Frequency analysis, etc.

Cross Visitation Analysis data, including, for example: data and/or links/URLs for viewing results of Cross Visitation analysis relating to various data set features such as, for example, signal providers, segments, categories, brands, etc.

Audience Properties data, including, for example: Status, Audience record creation data, Audience record update data, etc.

Figure 24:
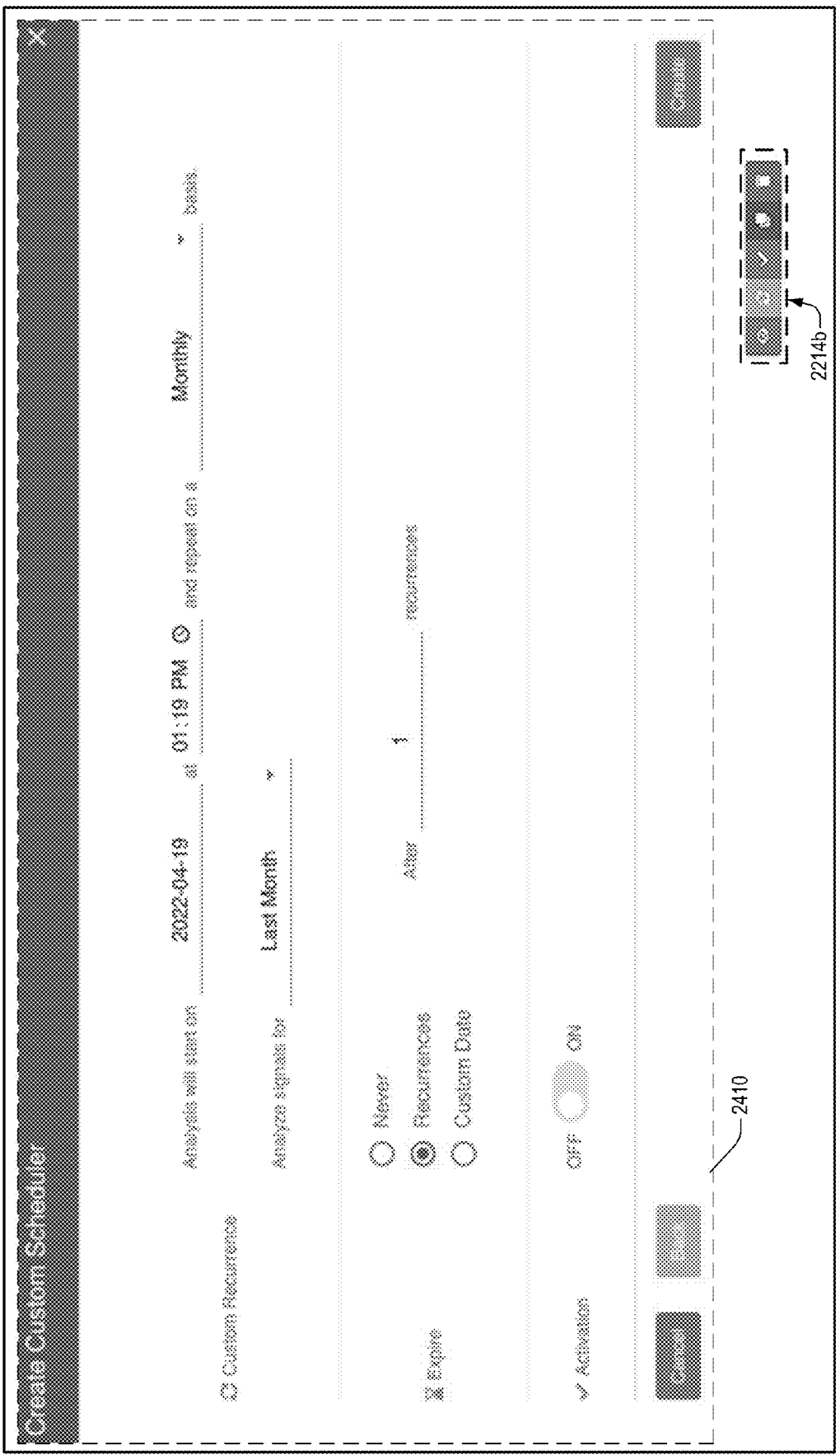

FIG. 24 shows an example screenshot of an interactive Custom Scheduler GUI in accordance with a specific embodiment. In at least one embodiment, the Custom Scheduler GUI may be configured or designed to enable a user to periodically re-execute one or more identified Custom Audience selection query(s) in accordance with a specified time schedule, which is configurable by the user. Additionally, the Custom Scheduler GUI may be configured or designed to include functionality for automatically sending the update results of the periodic queries to a predefined destination.

Figure 25:
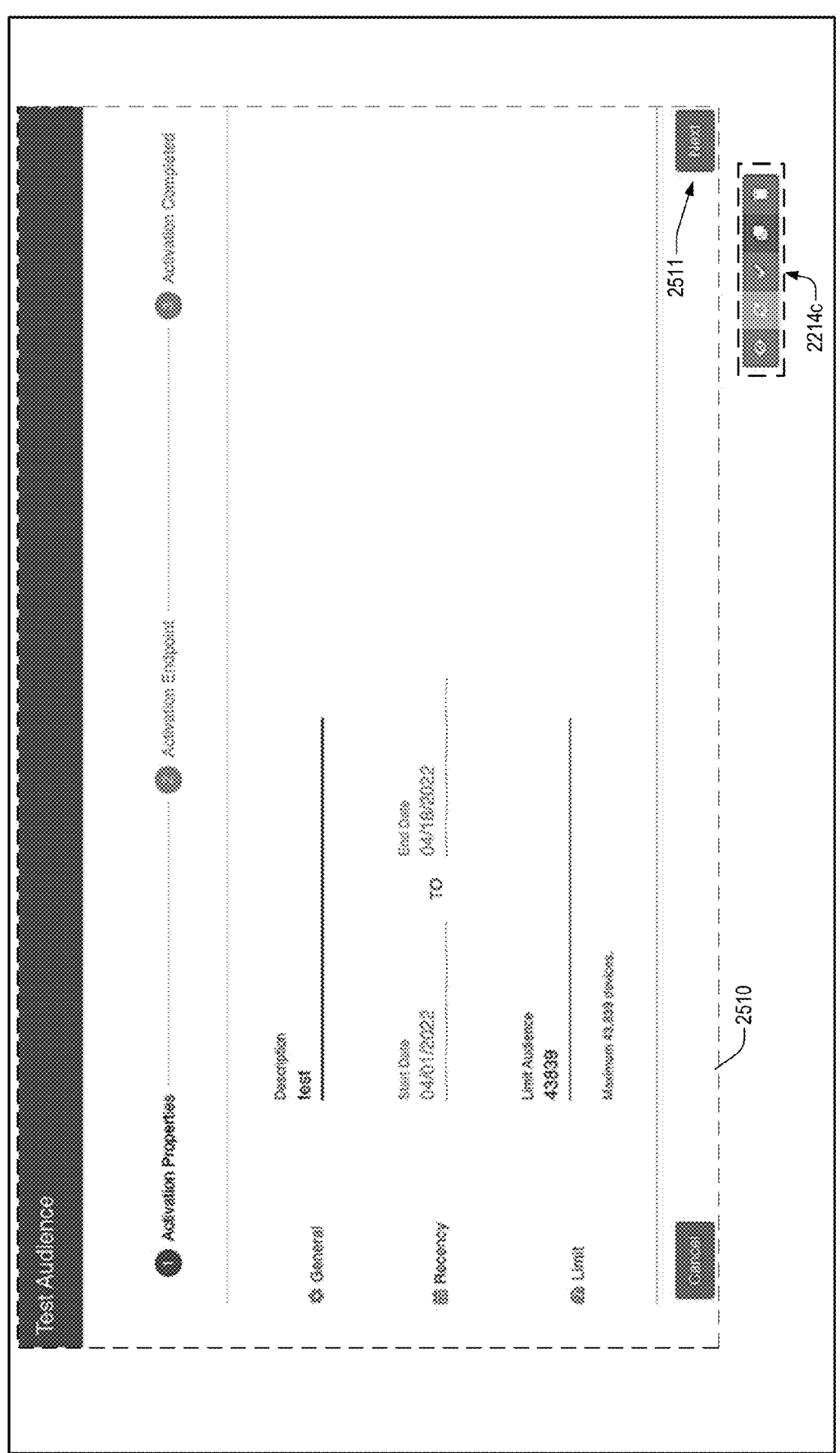
Figure 26:
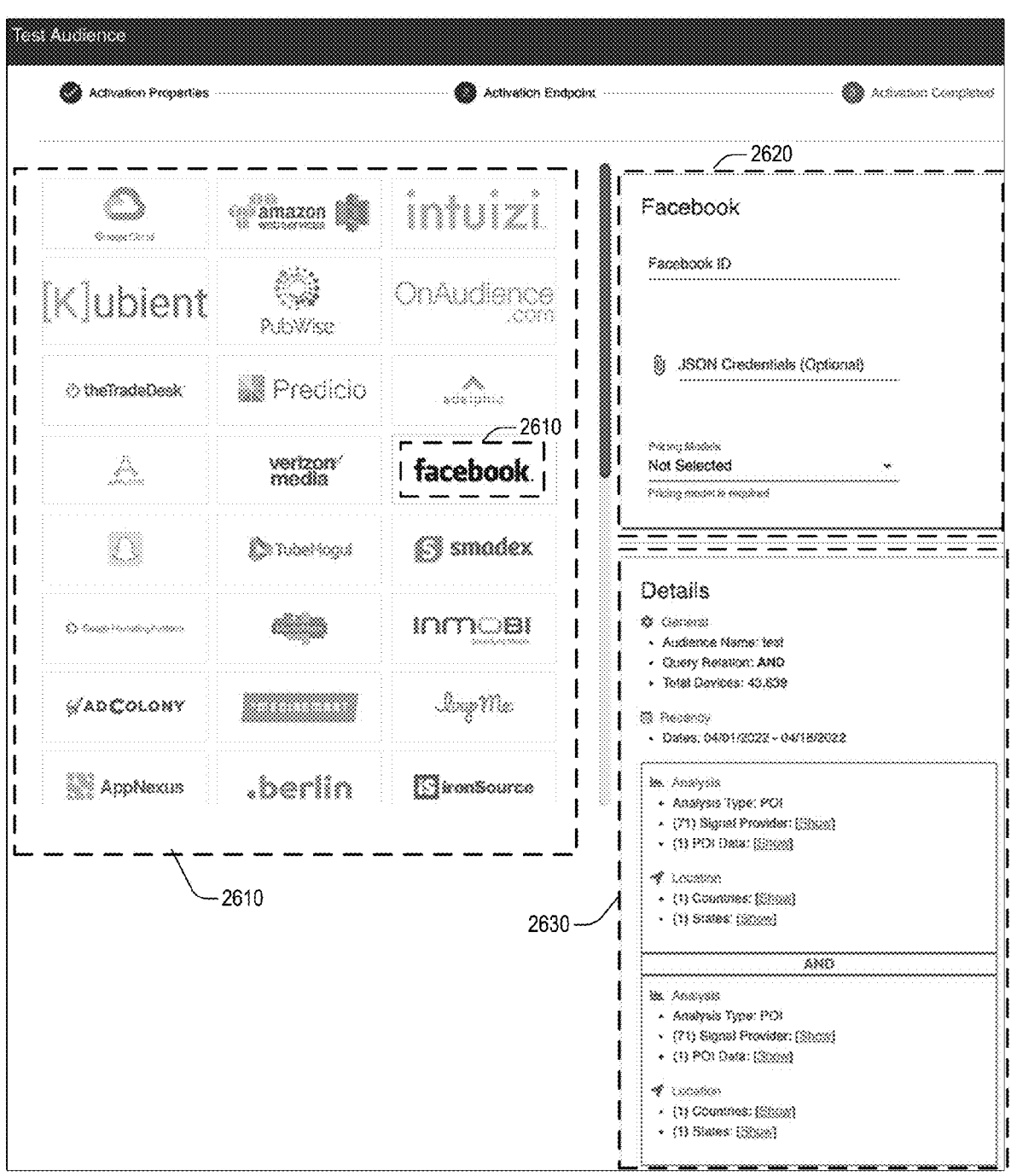

In at least one embodiment, the Intuizi System may be configured or designed to include functionality for enabling users or signal viewers to initiate one or more Data Activation Requests using the results data set(s) of one or more Custom Audience selection query(s). In at least one embodiment, the process of initiating one or more Data Activation Requests may include, for example:

Defining Data Activation Request properties (e.g., via Activation Properties Configuration GUI, FIG. 25); and Defining Activation endpoint properties (e.g., via Activation Endpoint GUI, FIG. 26).

FIG. 25 shows an example screenshot of an interactive Activation Properties Configuration GUI in accordance with a specific embodiment. In at least one embodiment, the Activation Properties Configuration GUI may be configured or designed to enable a user to initiate one or more Data Activation Request(s) using the results data set(s) of one or more Custom Audience selection query(s). For example, using the Activation Properties Configuration GUI, a user may identify a result data set of a custom audience, and assign various properties to be associated with the identified results data set, including, for example, name, description, recency, audience limit (e.g., the total size) of the result data set, etc.

FIG. 26 shows an example screenshot of an interactive Activation Endpoint GUI in accordance with a specific embodiment. In at least one embodiment, the Activation Endpoint GUI may be configured or designed to enable a user to identify and select one or more destinations (e.g., 2610) as activation endpoint(s) of a given Data Activation Request. In some embodiments, Activation Endpoint destinations may be selected individually and the Activation Endpoint GUI may be configured or designed to automatically and/or dynamically modify the displayed content of the GUI to facilitate completion of that specific Data Activation Request. For example, in some embodiments, Activation Endpoint GUI may be configured or designed to automatically and/or dynamically modify the displayed content of the GUI to display one or more fields (e.g., 2620) which may need to be configured by the user in order to complete the Data Activation Request. as illustrated in the example embodiment of FIG. 26, the Activation Endpoint GUI may also be configured or designed to display a summary and/or details of the Data Activation Request (e.g., as shown at 2630).

Figure 27:
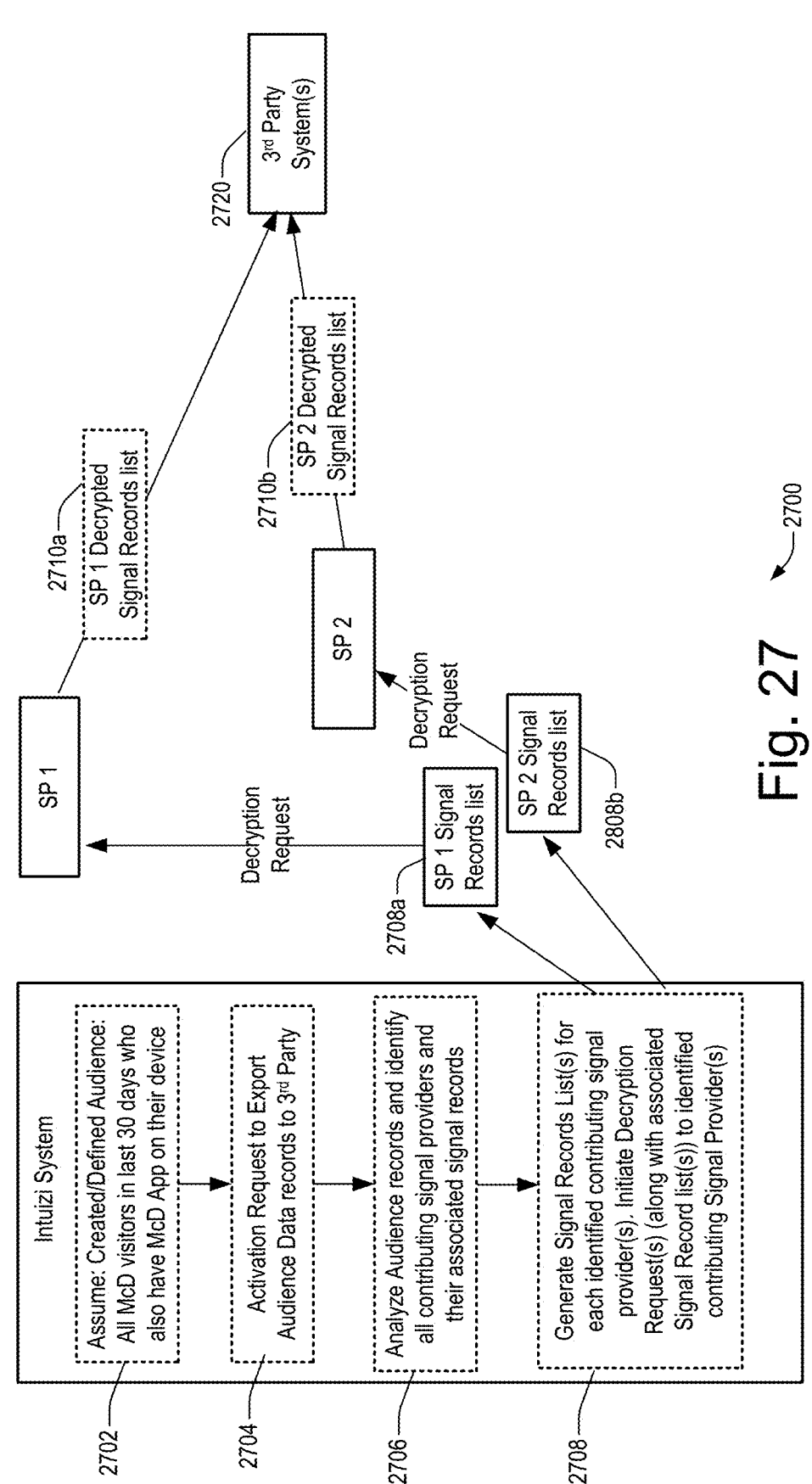
FIG. 27 shows an example Data Activation flow representing an example illustration of an Audience Data Export Procedure 2700.

FIG. 27 shows an example Data Activation flow representing an example illustration of an Audience Data Export Procedure 2700. In the example scenario of FIG. 27, it is assumed that a signal viewer has created/defined a first audience group (e.g., a first results data set of a first Custom Audience selection query), which includes first PII Anonymized signal data representing a first portion of encrypted signal data which satisfies the signal viewer's specified filter criteria.

In the specific example embodiment of FIG. 27, it is assumed that a signal viewer has created/defined a first audience group representing a first portion of encrypted signal data matching the following criteria: all US McDonald's visitors in the last 30 days who also have a McDonald's App installed on their smartphone device. (2702)

As shown at 2704, the signal viewer initiates an Activation Request to be executed by the Intuizi System for exporting data records corresponding to the first audience group to a specified Activation Endpoint destination or third party system (e.g., such as, for example, AWS). In at least one embodiment, pricing for export of the Activation results data records may be determined dynamically (e.g., via real-time bidding), may be determined by predefined Intuizi rule sets, and/or may be determined by other means.

In at least one embodiment, an audience group may include signals and/or data relating to one or more of the following (or combinations thereof):
Point of Interest data,
IoT Data,
Appgraph Data,
Financial Transaction Data,
eCommerce Data,
Geolocation Data,
Mobile Signal Data,
Brand Data,
and/or other types of data.

As shown at 2706, the The Intuizi System analyzes the activated audience records and identifies any/all contributing signal providers and their associated subset of encrypted signal records of the activated audience records (e.g., Signal Records List(s)).

As shown at 2708, using information relating to the identified identifies all contributing signal providers the the Intuizi System generates separate Signal Records List(s) (e.g., 2708a, 2708b) for each identified contributing signal provider(s), and initiates separate decryption requests to each identified contributing signal provider. In at least one embodiment, a decryption request may include information identifying the subset(s) of signal records (of the activated audience records) to be decrypted by that identified contributing signal provider. A decryption request may also include information identifying one or more addresses to $3^{rd}$ party system(s) or Activation Endpoint destination(s) where the decrypted signal record list is to be delivered.

In at least one embodiment, payment to signal provider(s) for processing each decryption request(s) may be determined dynamically (e.g., via real-time bidding), may be determined by predefined Intuizi rule sets, and/or may be determined by other means.

In at least one embodiment, the Intuizi System may be configured or designed to include functionality for providing an encrypted aggregate repository of consumer signal data (e.g., that is fully compliant with GDPR & CCPA/CPRA privacy laws) originating from disparate data sources which is processed on a distributed processing system of high compute machines to sift through various data points at high speed.

Visual reporting is provided to Signal Providers for the signal data that the Signal Provider provides to the Intuizi System. In at least one embodiment, this signal data is presented to the Intuizi System in a pseudonymous form, and only the originating Signal Provider can re-identify the PII data relating to the individual(s) (or devices) which correspond to the source of that data.

When processing a received decryption requests, each signal provider may use the Signal Records data set (associated with the decryption request) to generate a corresponding Decrypted Signal Records data set (e.g., 2710a, 2710b), and may send the Decrypted Signal Records data set to the appropriate $3^{rd}$ party system(s) 2720 or Activation Endpoint destination(s) specified in the corresponding decryption request. Examples of Activation Endpoint destinations may include, but are not limited to, one or more of the following (or combinations thereof):
Marketing-related Activation Endpoints
Analysis-related Activation Endpoints
Business Intelligence-related Activation Endpoints
Advertising-related Activation Endpoints
Etc.

In at least one embodiment, de-identification or pseudonymization may be performed by hashing the identifying information prior to depositing that data onto the Intuizi System Database(s). According to different embodiments, the hashing may occurs either on the Signal Provider side or on-the-fly using the Intuizi RTB Collection Endpoint.

In at least one embodiment, the Intuizi System provides the Signal Viewer (e.g., client) with one or more GUIs in which they can explore the data to see general trends.

Advertisement logs may be provided back to the Signal Activator for the purposes of auditing and reporting.

Figure 32:
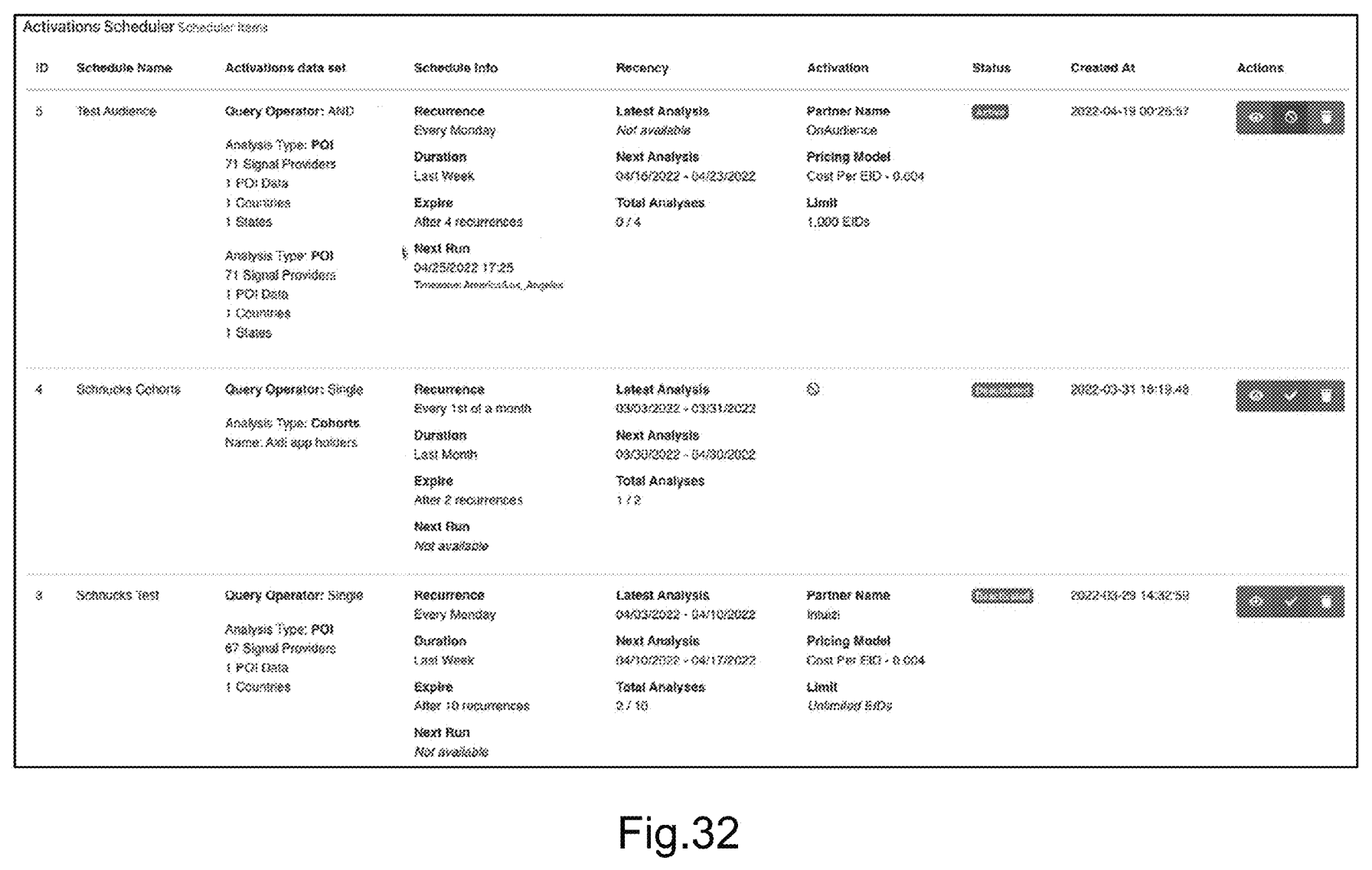

FIG. 32 shows an example screenshot of an interactive Activation Scheduler Management GUI in accordance with a specific embodiment. In at least one embodiment, the Activation Scheduler Management GUI may be configured or designed to display details relating to Scheduled Activations, including, for example, one or more of the following (or combinations thereof):
Schedule information, such as, for example:
Recurrence details
Duration details Expiration details Next run details Recency information, such as, for example:

Latest analysis details

Next analysis details

Total analyses details

Activation information, such as, for example:

Partner name details

Pricing model details

Limit details

Status information, such as, for example:

Active

Deactivated

Creation date information, such as, for example:

Day, month, year, timestamp

Etc.

In at least some embodiments, the Activation Scheduler Management GUI may be configured or designed to provide functionality for enabling a user to manage Scheduled Activations, such as, for example:

View/modify details of selected scheduled activations

Activate/deactivate selected scheduled activations

Add/delete/modify selected scheduled activations

Etc.

Figure 33:
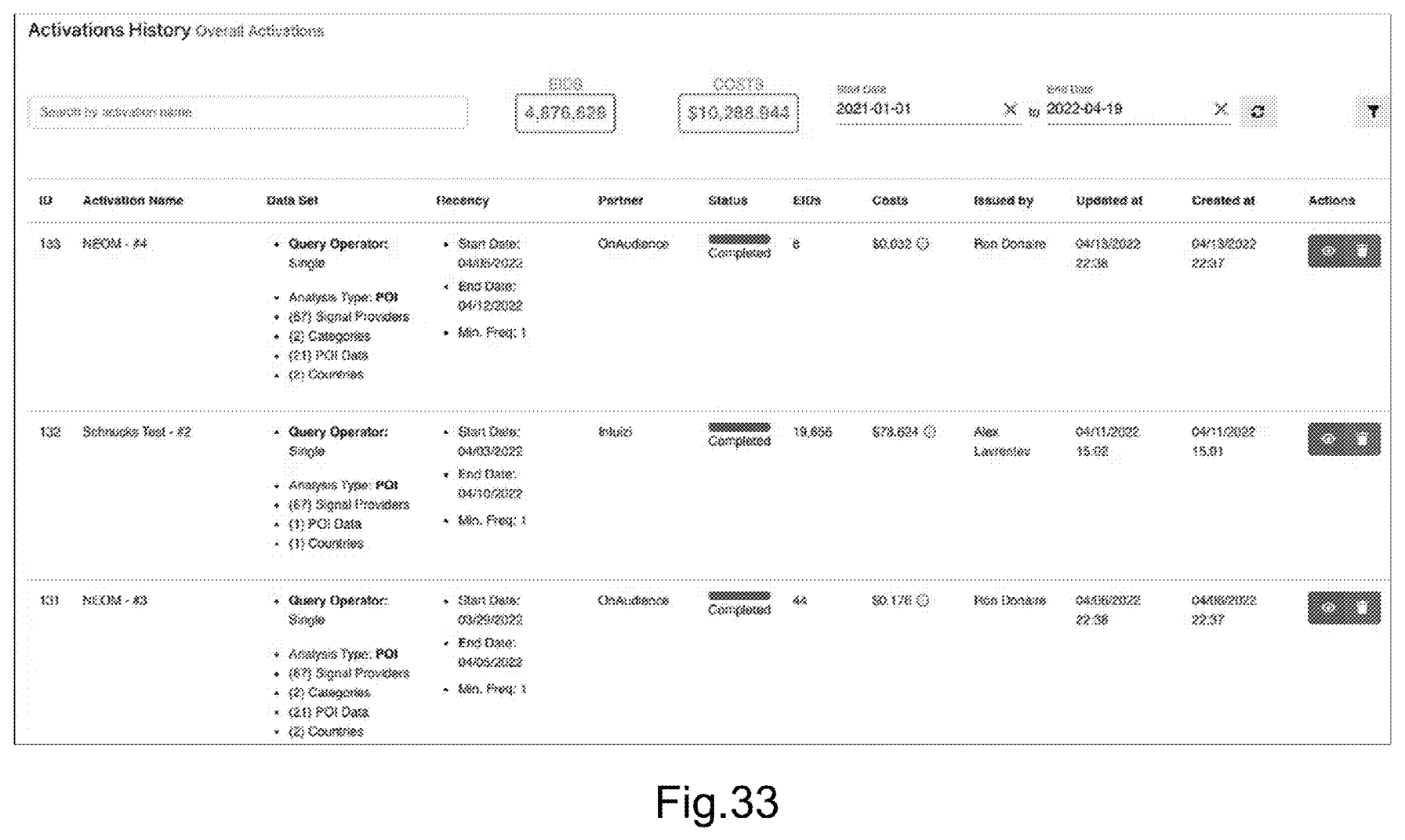

FIG. 33 shows an example screenshot of an interactive Activations History GUI in accordance with a specific embodiment. In at least one embodiment, the Activations History GUI may be configured or designed to display historical details relating to one or more scheduled, active, and/or completed Activations, including, for example, one or more of the following (or combinations thereof):

Activation ID details

Activation name details

Data set information, such as, for example:

Query operator details

Analysis type details

Signal provider details

Categories details

POI data details

Countries details

Signal provider details

Recency information, such as, for example:

Activation start date

Activation end date

Minimum Activation frequency details

Activation Partner information

EID information, including, for example, total EIDs for that particular Activation Cost information, including, for example, total cost for that particular Activation User ID information (e.g., corresponding to the user who initiated that Activation)

Activation Update information, such as, for example, when that particular activation was last updated or executed Activation creation date information Information relating to total EIDs across all completed Activations Information relating to total costs across all completed Activations Information relating to earliest start date across all completed Activations Information relating to latest end date across all completed Activations Additionally, in at least some embodiments, Activations History GUI may be configured or designed to include functionality for one or more of the following features:

Filtering functionality for enabling the user to selectively filter the activations history data according to user-specified filter criteria.

Functionality for enabling a user to view more granular details relating to one or more historical Activations.

Functionality for enabling a user to update, modify, and/or details relating to one or more historical Activations.

FIGS. 28-31 illustrate example portions of different customized Audience Data files or customized Audience Data-sets which may be requested by one or more users and/or which may be exported to one or more Activation Endpoints and/or r party systems.

FIG. 28 shows an example of a portion of an Audience Datafile Visitations Datastream ("Datafile A"). This data file is an example comma-separated value file (CSV) for the audience visitation data stream. It has a preset field list of anonymized signal providers, a persistent location id, a date time stamp in UTC time, Physical address fields, city, state, DMA, country, latitude, longitude, point of interest name, categorization, and the sum of visits.

FIG. 29 shows an example of a portion of an Audience Datafile POI Datastream ("Datafile B"). This data file is an example comma-separated value file (CSV) for the POI data stream. This has preset fields pertaining to individual locations without an association with other data set. It has a preset field list of anonymized signal providers, categorization, POI name, persistent ID, address, city, state, zip, DMA, country, latitude and longitude.

FIG. 30 shows an illustrative example embodiment of a portion of a Cross Visitation Audience data set, which may be automatically and/or dynamically generated by the Intuizi System during processing of a Custom Audience creation request. In at least one embodiment, the Cross Visitation Audience data set may be accessed from the Custom Audience Details GUI by clicking or selecting cross visitation data set link 2321 (FIG. 23)

According to different embodiments, Cross Visitation Audience data may be automatically and/or dynamically generated by the Intuizi System using user specified criteria and custom Audience data set(s). For example, in one embodiment, to generate Cross Visitation Audience data, the Intuizi System may identify mobile devices/signals associated with a given Audience data set ("Cohort"), and then analyze additional data set(s) associated with the identified Cohort mobile signals to identify other patterns, activities, correlations involving one or more of the identified Cohort mobile signals.

By way of illustration, the Cross Visitation Audience data set of FIG. 30 shows Airport category cross visitation information associated with the "Test" Audience data set as defined in FIG. 23. In this example, the Test Audience data set comprises a plurality of PH Anonymized mobile signals which have been identified as having visited both a Starbucks POI and a Home Depot POI within a specified time period (e.g., Apr. 1, 2022-Apr. 18, 2022). Using this identified cohort of Test Audience mobile signals, the Intuizi System may analyze one or more POI data set(s) to identify other POI categories (e.g., Airports) which have also been visited by any of the identified cohort of Test Audience mobile signals during the same specified time period. The Intuizi System may use results from this analysis to generate and populate an Airport Category Cross Visitation Audience data set, as illustrated, for example, in FIG. 30.

Thus, for example, referring to FIG. 30, it can be seen that:

A total of 13,297 cohort mobile signals also visited Los Angeles International Airport during the specified time period.

A total of 2,744 cohort mobile signals cohort mobile signals also visited at least one of the San Francisco, Oakland, San Jose Airports during the specified time period.

Etc.

FIG. 31 shows an illustrative example embodiment of a portion of a Frequency Audience data set, which may be automatically and/or dynamically generated by the Intuizi System during processing of a Custom Audience creation request. In at least one embodiment, the Frequency Audience data set may be accessed from the Custom Audience Details GUI by clicking or selecting frequency data set link 2322 (FIG. 23)

According to different embodiments, Frequency Audience data may be automatically and/or dynamically generated by the Intuizi System using user specified criteria and custom Audience data set(s). For example, in one embodiment, to generate Frequency Audience data, the Intuizi System may identify mobile devices/signals associated with a given Audience data set ("Cohort"), and analyze the Audience data set to determine the relative frequency of occurrences or conditions matching the specified custom Audience criteria which each identified cohort mobile signal satisfies during the specified time period.

By way of illustration, the Frequency Audience data set of FIG. 31 shows frequency information associated with the "Test" Audience data set as defined in FIG. 23. In this example, the Test Audience data set comprises a plurality of PII Anonymized mobile signals which have been identified as having visited both a Starbucks POI and a Home Depot POI within a specified time period (e.g., 04/01/2022-04/18/ 2022). Using this identified cohort of Test Audience mobile signals, the Intuizi System may analyze the Test Audience data set to determine the relative frequency of visits each identified cohort mobile signal makes to both Starbucks and Home Depot during the specified time period. Thus, for example, referring to FIG. 31, it can be seen that:

A total of 15,818 cohort mobile signals made one trip to both Starbucks and Home Depot during the specified time period.

A total of 7,918 cohort mobile signals made two trips to both Starbucks and Home Depot during the specified time period.

A total of 5,012 cohort mobile signals made two trips to both Starbucks and Home Depot during the specified time period.

Etc.

In at least one embodiment, the Intuizi System uses encrypted identifiers to identify and create cohort groups of anonymous devices which can be displayed to end users/ clients (e.g., Signal Viewers)

In at least one embodiment, the Intuizi System may be configured or designed to automatically and dynamically categorize Cohort groups using deterministic matching algorithms, such as, for example, one-way matching/hashing algorithm(s).

FIG. 9 shows an example embodiment of a portion of a global Signals datastream. In at least one embodiment, the Global Signal data stream provides a benchmark of known estimated market penetration for each country and its probabilistic translation to a unique smartphone along with the uniques identified by the intuizi platform for eligible analysis.

In at least one embodiment, the Intuizi System may be configured or designed to include one or more databases which are optimized for engagement with each different region's current consumer device network(s). In this way, the Intuizi Platform may be deployed world-wide, enabling signal viewers from different countries to utilize Intuizi's Database(s) and services to optimize engagement with each region's current consumer device network(s).

Figure 6:
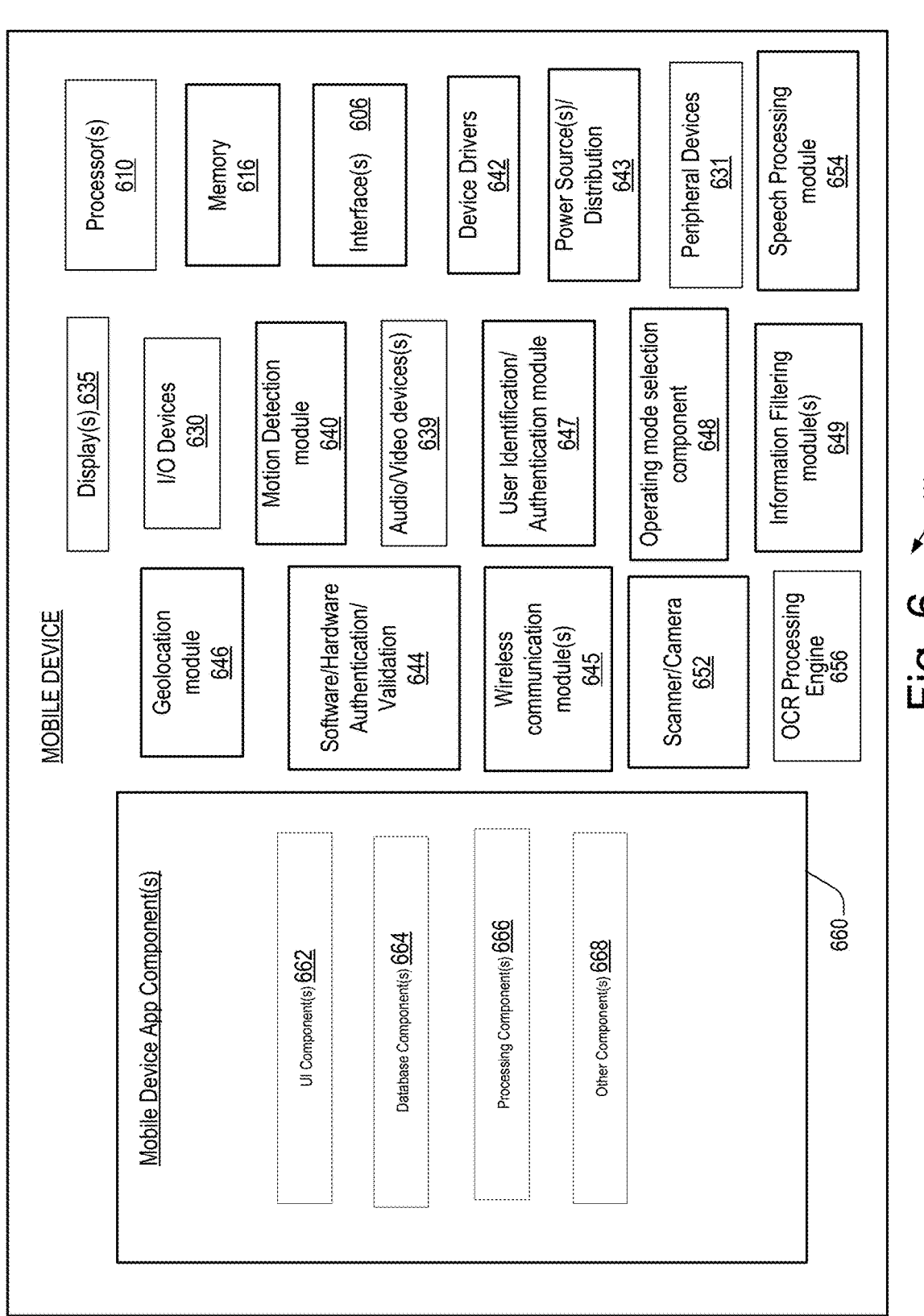
FIG. 6 is a simplified block diagram of an exemplary mobile device system 600 in accordance with a specific embodiment.

FIG. 6 is a simplified block diagram of an exemplary mobile device system 600 in accordance with a specific embodiment. In at least one embodiment, the mobile device system may include Mobile Device App Component(s) 660.

According to specific embodiments, various aspects, features, and/or functionalities of the Mobile Device may be performed, implemented and/or initiated by one or more of the following types of systems, components, systems, devices, procedures, processes, etc. (or combinations thereof):

Processor(s) 610
Device Drivers 642
Memory 616
Interface(s) 606
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654
Scanner/Camera 652
OCR Processing Engine 656
etc.

As illustrated in the example of FIG. 6 Mobile Device 600 may include a variety of components, modules and/or systems for providing various functionality. For example, as illustrated in FIG. 6, Mobile Device 600 may include Mobile Device Application components (e.g., 660), which, for example, may include, but are not limited to, one or more of the following (or combinations thereof):

In at least one embodiment, the Mobile Device Application component(s) may be operable to perform and/or implement various types of functions, operations, actions, and/or other features such as, for example, one or more of those described and/or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, etc. (or combinations thereof) described and/or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more types of conditions and/or events described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more different types of data, metadata, and/or other information described and/or referenced herein.

According to different embodiments, Mobile Device System 600 may further include, but is not limited to, one or more of the following types of components, modules and/or systems (or combinations thereof):

At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various Intuizi techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the Intuizi techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 642. In at least one implementation, the device driver(s) 642 may include functionality similar to at least a portion of functionality implemented by one or more computer system driver devices such as those described herein and/or generally known to one having ordinary skill in the art.

At least one power source (and/or power distribution source) 643. In at least one implementation, the power source may include at least one mobile power source (e.g., battery) for allowing the client system to operate in a wireless and/or mobile environment. For example, in one implementation, the power source 643 may be implemented using a rechargeable, thin-film type battery. Further, in embodiments where it is desirable for the device to be flexible, the power source 643 may be designed to be flexible.

Geolocation module 646 which, for example, may be configured or designed to acquire geolocation information from remote sources and use the acquired geolocation information to determine information relating to a relative and/or absolute position of the client system.

Motion detection component 640 for detecting motion or movement of the client system and/or for detecting motion, movement, gestures and/or other input data from user. In at least one embodiment, the motion detection component 640 may include one or more motion detection sensors such as, for example, MEMS (Micro Electro Mechanical System) accelerometers, that can detect the acceleration and/or other movements of the client system as it is moved by a user.

User Identification/Authentication module 647. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, MA, www.eink.com), or other suitable technology for reducing the power consumption of information displayed on the display(s) 635.

One or more user I/O Device(s) 630 such as, for example, keys, buttons, scroll wheels, cursors, touchscreen sensors, audio command interfaces, magnetic strip reader, optical scanner, etc.

Audio/Video device(s) 639 such as, for example, components for displaying audio/visual media which, for example, may include cameras, speakers, microphones, media presentation components, wireless transmitter/receiver devices for enabling wireless audio and/or visual communication between the client system 600 and remote devices (e.g., radios, telephones, computer systems, etc.). For example, in one implementation, the audio system may include componentry for enabling the client system to function as a cell phone or two-way radio device.

Other types of peripheral devices 631 which may be useful to the users of various client systems, such as, for example: PDA functionality; memory card reader(s); fingerprint reader(s); image projection device(s); social networking peripheral component(s); etc.

Information filtering module(s) 649 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 649 may also be adapted to display, in real-time, filtered information to the user based upon a variety of criteria such as, for example, geolocation information, contextual activity information, and/or other types of filtering criteria described and/or referenced herein.

Wireless communication module(s) 645. In one implementation, the wireless communication module 645 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 644 which, for example, may be used for authenticating and/or validating local hardware and/or software components, hardware/software components residing at a remote device.

Operating mode selection component 648 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 652) which may be configured or designed for use in scanning identifiers and/or other content from other devices and/or objects such as for example: mobile device displays, computer displays, static displays (e.g., printed on tangible mediums), etc.

OCR Processing Engine (e.g., 656) which, for example, may be operable to perform image processing and optical character recognition of images such as those captured by a mobile device camera, for example.

Speech Processing module (e.g., 654) which, for example, may be operable to perform speech recognition, and may be operable to perform speech-to-text conversion. Etc.

Figure 7:
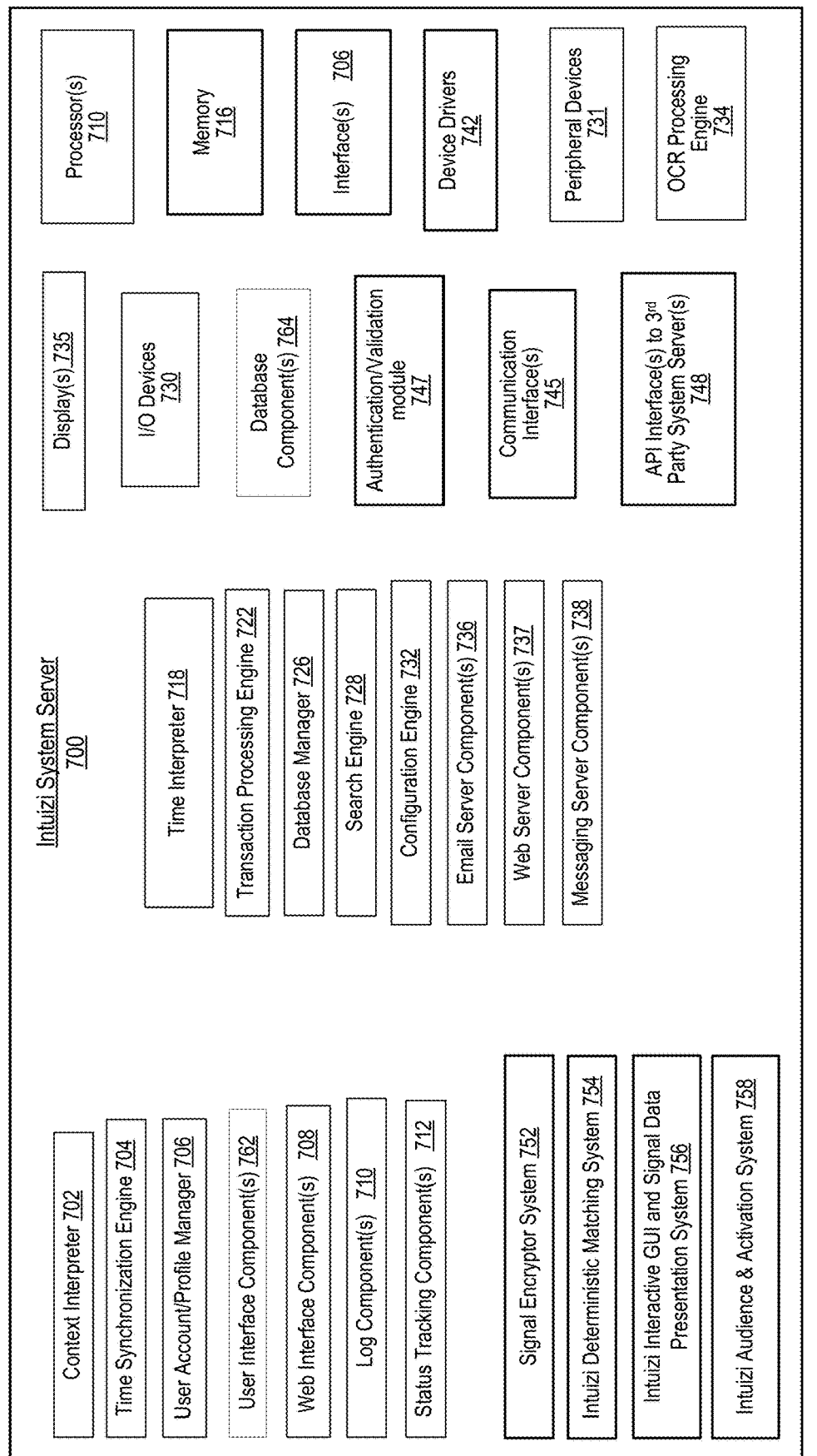
FIG. 7 illustrates an example of a functional block diagram of a Intuizi System Server in accordance with a specific embodiment.

FIG. 7 illustrates an example of a functional block diagram of a Intuizi System Server in accordance with a specific embodiment.

In at least one embodiment, the Intuizi System Server may be operable to perform and/or implement various types of functions, operations, actions, and/or other features, such as, for example, one or more of those described and/or referenced herein.

In at least one embodiment, the Intuizi System Server may include a plurality of components operable to perform and/or implement various types of functions, operations, actions, and/or other features such as, for example, one or more of those described and/or referenced herein.

In at least one embodiment, the Intuizi System Server may include a plurality of components operable to perform and/or implement various types of functions, operations, actions, and/or other features such as, for example, one or more of the following (or combinations thereof):

Context Interpreter (e.g., 702) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):

location-based criteria (e.g., geolocation of client device, geolocation of agent device, etc.)

time-based criteria identity of user(s)

user profile information transaction history information recent user activities proximate business-related criteria (e.g., criteria which may be used to determine whether the client device is currently located at or near a recognized business establishment such as a bank, gas station, restaurant, supermarket, etc.)

etc.

Time Synchronization Engine (e.g., 704) which, for example, may be operable to manages universal time synchronization (e.g., via NTP and/or GPS)

Search Engine (e.g., 728) which, for example, may be operable to search for transactions, logs, items, accounts, options in the Intuizi databases Configuration Engine (e.g., 732) which, for example, may be operable to determine and handle configuration of various customized configuration parameters for one or more devices, component(s), system(s), process(es), etc.

Time Interpreter (e.g., 718) which, for example, may be operable to automatically and/or dynamically modify or change identifier activation and expiration time(s) based on various criteria such as, for example, time, location, transaction status, etc.

Authentication/Validation Component(s) (e.g., 747) (password, software/hardware info, SSL certificates) which, for example, may be operable to perform various types of authentication/validation tasks such as, for example, one or more of the following (or combinations thereof):

verifying/authenticating devices, verifying passwords, passcodes, SSL certificates, biometric identification information, and/or other types of security-related information verify/validate activation and/or expiration times etc.

In one implementation, the Authentication/Validation Component(s) may be adapted to determine and/or authenticate the identity of the current user or owner of the mobile client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The user's biometric information (e.g., fingerprints, face, voice, eye/iris, etc.). In at least one implementation, various security features may be incorporated into the mobile client system to prevent unauthorized users from accessing confidential or sensitive information.

Transaction Processing Engine (e.g., 722) which, for example, may be operable to handle various types of transaction processing tasks such as, for example, one or more of the following (or combinations thereof):

identifying/determining transaction type determining which payment gateway(s) to use associating databases information to identifiers etc.

OCR Processing Engine (e.g., 734) which, for example, may be operable to perform image processing and optical character recognition of images such as those captured by a mobile device camera, for example.

Database Manager (e.g., 726) which, for example, may be operable to handle various types of tasks relating to database updating, database management, database access, etc. In at least one embodiment, the Database Manager may be operable to manage TISS databases, Intuizi Device Application databases, etc.

Log Component(s) (e.g., 710) which, for example, may be operable to generate and manage transactions history logs, system errors, connections from APIs, etc.

Status Tracking Component(s) (e.g., 712) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.

Gateway Component(s) (e.g., 714) which, for example, may be operable to facilitate and manage communications and transactions with external Payment Gateways.

Web Interface Component(s) (e.g., 708) which, for example, may be operable to facilitate and manage communications and transactions with Intuizi web portal(s).

API Interface(s) to Intuizi System Server(s) (e.g., 746) which, for example, may be operable to facilitate and manage communications and transactions with API Interface(s) to Intuizi System Server(s)

API Interface(s) to 3rd Party System Server(s) (e.g., 748) which, for example, may be operable to facilitate and manage communications and transactions with API Interface(s) to 3rd Party System Server(s)

OCR Processing Engine (e.g., 734) which, for example, may be operable to perform image processing and optical character recognition of images such as those captured by a mobile device camera, for example.

At least one processor 710. In at least one embodiment, the processor(s) 710 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 716, which, for example, may include volatile memory (e.g., RAM), non-volatile memory (e.g., disk memory, FLASH memory, EPROMs, etc.), unalterable memory, and/or other types of memory. In at least one implementation, the memory 716 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the Intuizi System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 706 which, for example, may include wired interfaces and/or wireless interfaces. In at least one implementation, the interface(s) 706 may include functionality similar to at least a portion of functionality implemented by one or more computer system interfaces such as those described herein and/or generally known to one having ordinary skill in the art.

Device driver(s) 742. In at least one implementation, the device driver(s) 742 may include functionality similar to at least a portion of functionality implemented by one or more computer system driver devices such as those described herein and/or generally known to one having ordinary skill in the art.

One or more display(s) 735. According to various embodiments, such display(s) may be implemented using, for example, LCD display technology, OLED display technology, and/or other types of conventional display technology. In at least one implementation, display(s) 735 may be adapted to be flexible or bendable. Additionally, in at least one embodiment the information displayed on display(s) 735 may utilize e-ink technology (such as that available from E Ink Corporation, Cambridge, MA, www.eink.com), or other suitable technology for reducing the power consumption of information displayed on the display(s) 735.

Email Server Component(s) 736, which, for example, may be configured or designed to provide various functions and operations relating to email activities and communications.

Web Server Component(s) 737, which, for example, may be configured or designed to provide various functions and operations relating to web server activities and communications.

Messaging Server Component(s) 738, which, for example, may be configured or designed to provide various functions and operations relating to text messaging and/or other social network messaging activities and/or communications.

Signal Encryptor System Component(s) 752 (e.g., having functionality similar to other Signal Encryptor System Component(s) described herein)

Intuizi Deterministic Matching System Component(s) 754 (e.g., having functionality similar to other Intuizi Deterministic Matching System Component(s) described herein)

Intuizi Interactive GUI and Signal Data Presentation System Component(s) 756 (e.g., having functionality similar to other Intuizi Interactive GUI and Signal Data Presentation System Component(s) described herein)

Intuizi Audience & Activation System 758 (e.g., having functionality similar to other Intuizi Audience & Activation GUIs and System(s) described herein)

Etc.

Additional Example GUI Embodiments

FIGS. 34-42 illustrate example screenshots of various GUIs which may be used for facilitating activities relating to one or more of the Intuizi System aspects disclosed herein.

Figure 34:
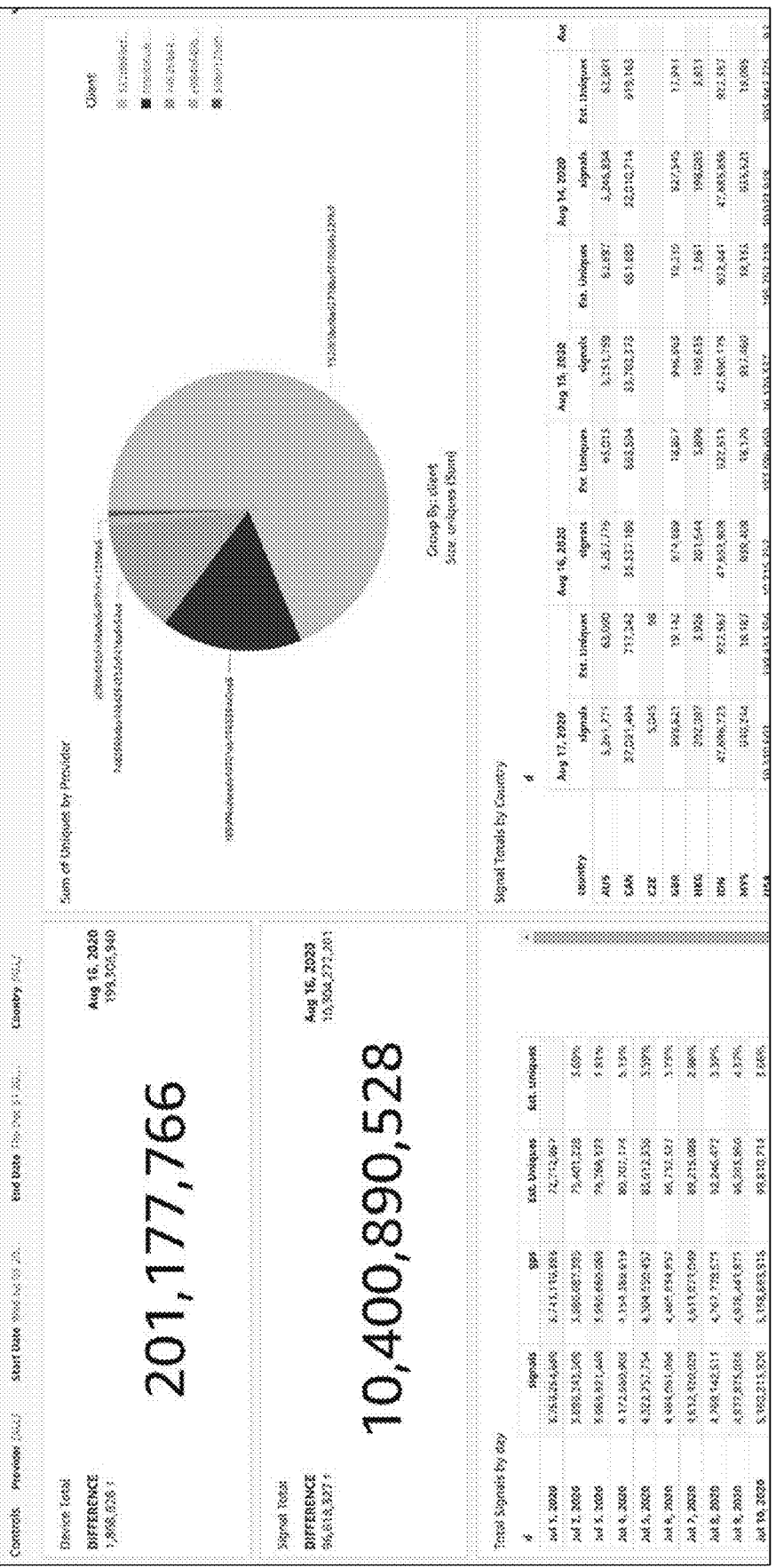

FIG. 34 illustrates an example screenshot of a Dashboard graphical user interface (GUI) which may be dynamically generated by the Intuizi System and provided to facilitate, initiate and/or perform various operation(s) and/or action(s) relating to the Intuizi Technology such as, for example, generating and displaying customized User Dashboard GUIs which are configured or designed to enable users to access various types of information, data, and/or functionality relating to the user's Dashboard, such as, for example:

System Functionality Admin Section

Access Functionality allows users to create companies, create users and assign specific roles by user by company.

Log Viewer Functionality Admin Section

Enables admins to see the logs and system health

Client viewer related functionality/activities

Analysis Functionality Admin Section

Enables admins to add App bundle id data and create categories

POI admin allows for the addition of POI Names and to manage the individual locations of the POI's According to different embodiments, at least some of the Intuizi GUIs are configured or designed to display interactive links or objects such as, for example:

Dashboard Menu Link—This link may be dynamically generated by the Intuizi System and provided to access various types of information, data, and/or functionality such as, for example:

Real-time and historical information, data, and/or functionality relating to the user's customizable dashboard GUI, such as, for example:

Dashboard GUI,

Real-time and historical information relating to details total amount of raw signals, Real-time and historical information relating to summary count of signal providers, which can be grouped by date, country, unique device(s), etc.

App Data Menu Link—This link may be dynamically generated by the Intuizi System and provided to access various types of information, data, and/or functionality such as, for example, those illustrated and described with respect to FIGS. 108-113:

Information, data, and/or functionality relating to Bundle IDs

Information, data, and/or functionality relating to Categories

Etc.

Locations Menu Link—This link may be dynamically generated by the Intuizi System and provided to access various types of information, data, and/or functionality such as, for example:

Information, data, and/or functionality relating to Locations

Information, data, and/or functionality relating to Categories

Etc.

POI Menu Link—This link may be dynamically generated by the Intuizi System and provided to access various types of information, data, and/or functionality such as, for example:

Information, data, and/or functionality relating to POIs

Etc.

Access Menu Link—This link may be dynamically generated by the Intuizi System and provided to access various types of information, data, and/or functionality such as, for example:

Information, data, and/or functionality relating to Companies

Information, data, and/or functionality relating to User Management

Information, data, and/or functionality relating to Role Management

Etc.

Log Viewer Menu Link—This link may be dynamically generated by the Intuizi System and provided to access various types of information, data, and/or functionality such as, for example:

Information, data, and/or functionality relating to Companies

Etc.

According to different embodiments, various App Data graphical user interfaces (GUIs) may be dynamically generated by the Intuizi System and provided to facilitate, initiate and/or perform various operation(s) and/or action(s) relating to the Intuizi Technology such as, for example, generating and displaying customized App Data GUIs which are configured or designed to enable users to access various types of information, data, and/or functionality relating to App Data, such as, for example:

Displaying various types of App Data related information such as, for example:

Bundle ID information

App Name information

Store URL information

Category information

Company information

Last Updated information

Enabling the user to perform various App Data related activities or actions such as, for example:

Editing, updating, modifying, and/or deleting App Data information;

Performing customized searches for specific App Data related information, such as, for example:

search by bundle ID search by app name search by store URL search by other specified criteria Generating and displaying filtered information, in accordance with selected filter criteria, such as, for example:

Filter by one or more of the following (or combinations thereof):

Category

Company

App name

Administrative GUIs—Defines what is being searched for from App download histories.

Bundle ID—App store identifier (unique for each App)

Friendly Name Identifier (App Name)

App Store URL

Company Category—Category information assigned to each App

Company Ownership—Requesting company. Allows INTZ system to segment permissions and visibility for accessing various information.

Other user specified criteria.

Sort by one or more of the following (or combinations thereof):

App name

Bundle ID

Last updated

Store URL

Category

Company

Other user specified criteria.

Figure 35:
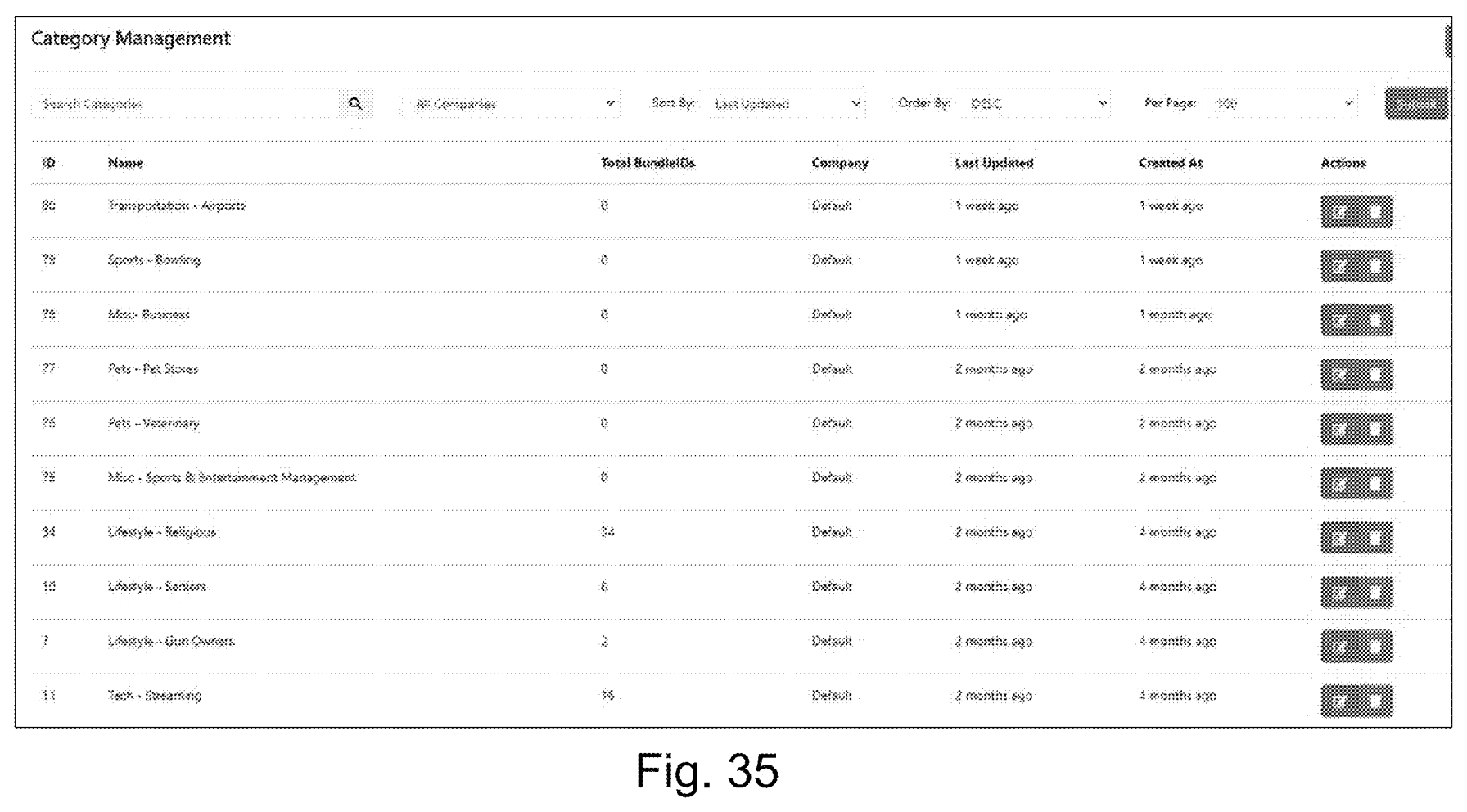

FIG. 35 illustrates an example screenshot of a Category Management GUI which may be dynamically generated by the Intuizi System and provided to facilitate, initiate and/or perform various operation(s) and/or action(s) relating to the Intuizi Technology such as, for example, generating and displaying customized Category Management GUIs which are configured or designed to enable users to access various types of information, data, and/or functionality relating to Category Management, such as, for example:

Displaying various types of Category Management related information such as, for example:

Category ID information

Category Name information

Total Bundle IDs information

Category information

Company information

Last Updated information

Created At information

Enabling the user to perform various Category Management related activities or actions such as, for example:

Editing, updating, modifying, and/or deleting Category Management information;

Performing customized searches for specific Category Management related information, such as, for example:

search by category name search by category type search by other specified criteria Generating and displaying filtered information, in accordance with selected filter criteria, such as, for example:

Filter by one or more of the following (or combinations thereof):

Category

Company

App name

Bundle ID

App Name

Store URL

Other user specified criteria.

Sort by one or more of the following (or combinations thereof):

App name

Bundle ID

Last updated
Store URL
Category
Company
Other user specified criteria.

Figure 36:
Figure 37:
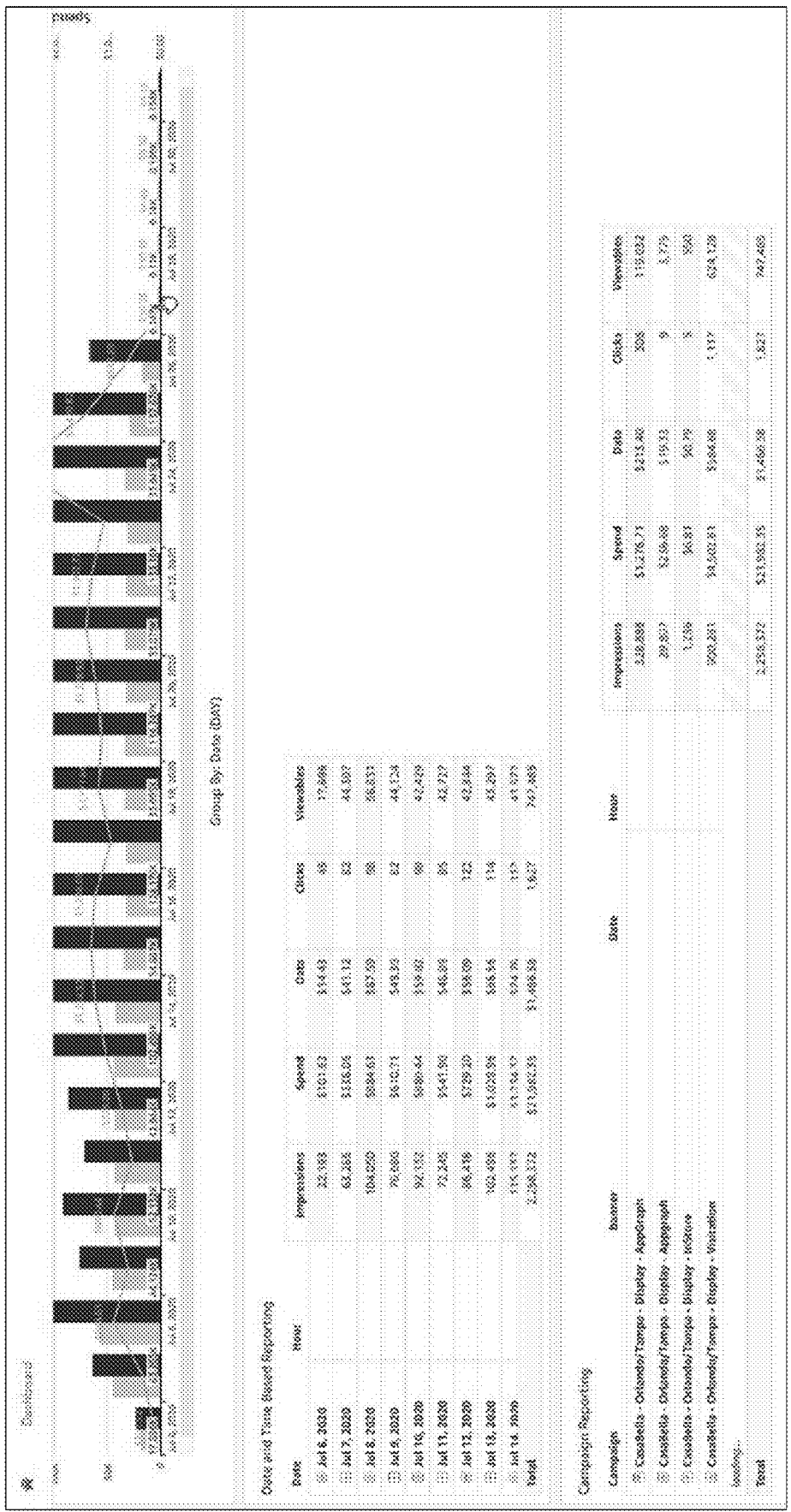

FIGS. 36-37 illustrate example screenshots of various Advertising-Related GUIs which may be dynamically generated by the Intuizi System and provided to facilitate, initiate and/or perform various operation(s) and/or action(s) relating to the Intuizi Technology such as, for example, generating and displaying customized Advertising-Related GUIs which are configured or designed to enable users to access various types of information, data, and/or functionality relating to Ad-related Data, such as, for example:

Displaying various types of Ad-related Data related information such as, for example:
  information relating to impressions such as, for example:
    total impressions
    impressions by day of week
    impressions by date
    impressions over one or more time intervals (e.g., second(s), minute(s), hour(s), day(s), week(s), year(s), etc.)
  information relating to viewables (e.g., impressions that were viewed by an end-user) such as, for example:
    total viewables
    viewables by day of week
    viewables by date
    viewables over one or more time intervals (e.g., second(s), minute(s), hour(s), day(s), week(s), year(s), etc.)
  information relating to spends (e.g., how much money spent or paid) such as, for example:
    total ad spend
    spends by day of week
    spends by date
    spends over one or more time intervals (e.g., second(s), minute(s), hour(s), day(s), week(s), year(s), etc.)
  information relating to data such as, for example:
    total data
    data by day of week
    data by date
    data over one or more time intervals (e.g., second(s), minute(s), hour(s), day(s), week(s), year(s), etc.)
  information relating to time of day
  information relating to user clicks or interactions such as, for example:
    total clicks
    clicks by day of week
    clicks by date
    clicks over one or more time intervals (e.g., second(s), minute(s), hour(s), day(s), week(s), year(s), etc.)
  information relating to ad campaigns such as, for example:
    campaign name
    banner information
    date information
    time information
    impression information
    spend information
    data information
    clicks information
    viewables information campaign location information
    campaign sponsor information
    campaign reporting information
Displaying various types of Ad-related Data charts, graphs, spreadsheets, etc., such as, for example:
  bar graphs configured or designed to present various types of data and/or data comparisons
  pie charts configured or designed to present various types of data and/or data comparisons
  spreadsheets configured or designed to present various types of data and/or data comparisons
  line graphs configured or designed to present various types of data and/or data comparisons
  overlay graphs configured or designed to present various types of data sets and/or data set comparisons
Enabling the user to perform various Ad-related Data related activities or actions such as, for example:
  Editing, updating, modifying, and/or deleting Ad-related Data information;
  Performing customized searches for specific Ad-related Data related information, such as, for example:
    search by client
    search by ad campaign
    search by keyword
    search by date range
    search by value range
    search by banner
    search by other specified criteria
  Enabling users to access more detailed information by interacting with one or more portions of content displayed in the GUI(s).
Generating and displaying filtered information, in accordance with selected filter criteria, such as, for example, using one or more of the following (or combinations thereof):
  filter by category
  filter by company
  filter by ad campaign
  filter by time range
  filter by impressions
  filter by spend
  filter by data
  filter by clicks
  filter by viewable
  filter by ad campaign start date
  filter by ad campaign and date
  filter by banner
  sort by app name
  sort by bundle ID
  sort by last updated
  sort by store URL
  sort by category
  sort by company
  filter by other specified criteria
  sort by other specified criteria
  group by category
  group by company
  group by ad campaign
  group by time, day, and/or date
  group by impressions
  group by spend
  group by data
  group by clicks
  group by viewable
  group by ad campaign start date
  group by ad campaign and date
  group by banner In at least one embodiment, displayed data may be pulled from multiple different sources (e.g., in real-time) and aggregated and displayed in a single GUI or multiple different GUIs. For example, in one embodiment, the Advertising Reporting System ingests signal data from multiple different signal providers (e.g., in real-time), and aggregates and presents the aggregated signal data in a single GUI or multiple different GUIs Various POI Data graphical user interfaces (GUIs) may be dynamically generated by the Intuizi System and provided to facilitate, initiate and/or perform a various operation(s) and/or action(s) relating to the Intuizi Technology such as, for example, generating and displaying customized POI GUIs which are configured or designed to enable users to access various types of information, data, and/or functionality relating to POI and Signal Data, such as, for example:

Displaying various types of POI Data related information such as, for example:
Brand information
Category information
Store Location information
Company information
Last Updated information
Enabling the user to perform various POI Data related activities or actions such as, for example:
Visualizing the placement of each point of interest on a map that is categorized and represented by color and sized according to data volume.
Displayed on a pivot table allowing for various category POI dimensions to be displayed along with unique visit data.
Displayed a bar chart of the number of stores as organized by the filtration of the page.
Sorting the page via various geo-graphic related dimensions, such as:
Country
City
State
PostalCode
Address
DMA FIGS. 38-39 illustrate example screenshots of various POI-related GUI embodiments which may be dynamically generated by the Intuizi System and provided to facilitate, initiate and/or perform various operation(s) and/or action(s) relating to the Intuizi Technology such as, for example, generating and displaying customized POI-related GUIs which are configured or designed to enable users to access various types of information, data, and/or functionality relating to Signal Data and POI Data, such as, for example:

Displaying various types of POI Component Data related information such as, for example:
POI Name information
POI Location information
POI Category information
POI Country information
POI State information
POI City information
POI DMA information
POI Signals information
POI Store Count information
POI crosstab store information
Last Updated information
Enabling the user to perform various POI Component Data related activities or actions such as, for example:
Editing, updating, modifying, and/or deleting POI Data information;

Performing customized searches for specific POI Data related information, such as, for example:
search by POI Name
search by POI Location
search by POI Category
search by POI Country
search by POI State
search by POI City
search by POI DMA
search by POI crosstab store information
search by other specified criteria
Generating and displaying filtered information, in accordance with selected filter criteria, such as, for example:
filter by category
filter by company
sort by POI Name
sort by by POI Location
sort by last updated
sort by POI Country
sort by POI State
sort by POI City
sort by POI DMA
sort by POI crosstab store information
filter by other specified criteria
sort by other specified criteria
Generating heat map and displaying filtered information, in accordance with selected filter criteria, such as, for example:
heat map by category
heat map by company
heat map POI Name
heat map by POI Location
heat map by last updated
heat map by POI Country
heat map by POI State
heat map by POI City
heat map by POI DMA
heat map by POI crosstab store information
heat map store count information
heat map signals information
heat map by other specified criteria
Various Cross-Visit graphical user interfaces (GUIs) may be dynamically generated by the Intuizi System and provided to facilitate, initiate and/or perform a various operation(s) and/or action(s) relating to the Intuizi Technology such as, for example, generating and displaying customized Cross-Visit GUIs which are configured or designed to enable users to access various types of information, data, and/or functionality relating to POI, such as, for example:
Displaying various types of App Related Data information such as, for example:
Signal Provider
Category of Point of interest
Country
State
DMA
City
Address
Showing the signals which cross over into multiple pois and what distinct counts can be derived from specific combinations of POI selections.
Visually representing the filtered data according to one or more of the following (or combinations thereof):
Pie chart by the percentage of data provided by an PII anonymized client.
Pie chart by the percentage of category by volume of signals and uniques Pivot table by the dimension of category and POI, summing the encrypted IDs and Signals and providing a distinct total.

Pivot table by dimension client, summing the encrypted IDs and Signals and providing a distinct total.

Figure 40:
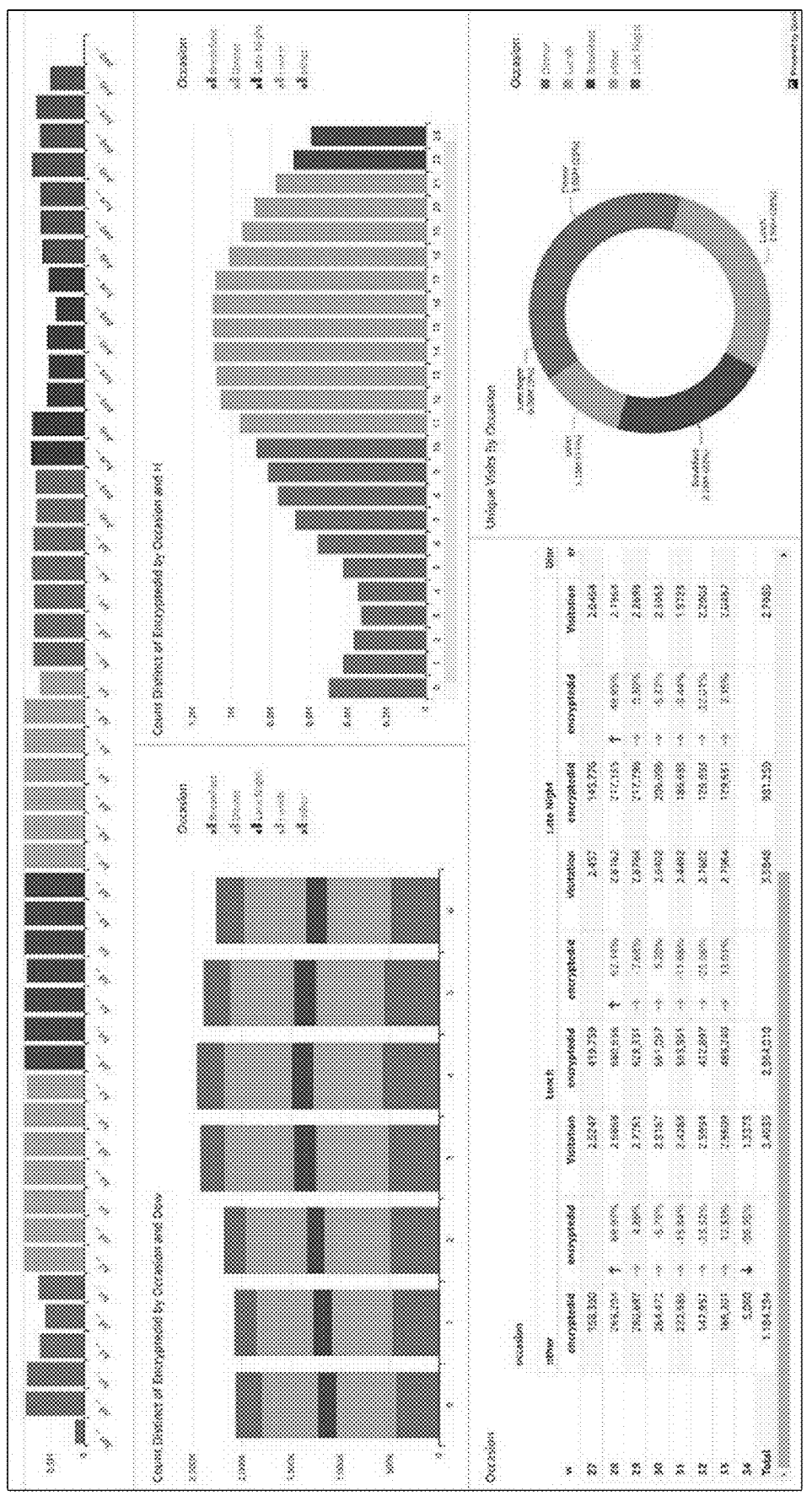
Figure 41:
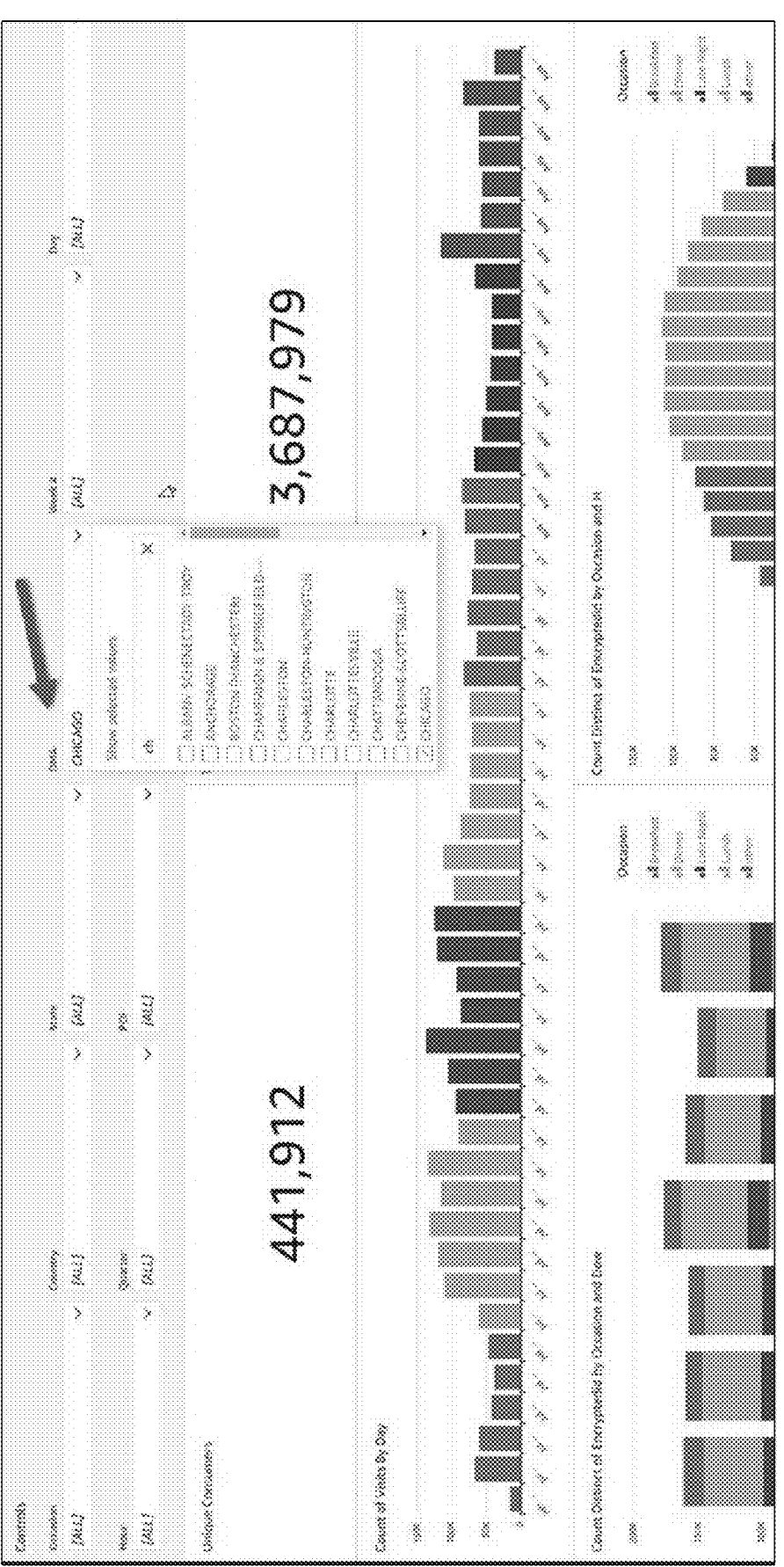
Figure 42:
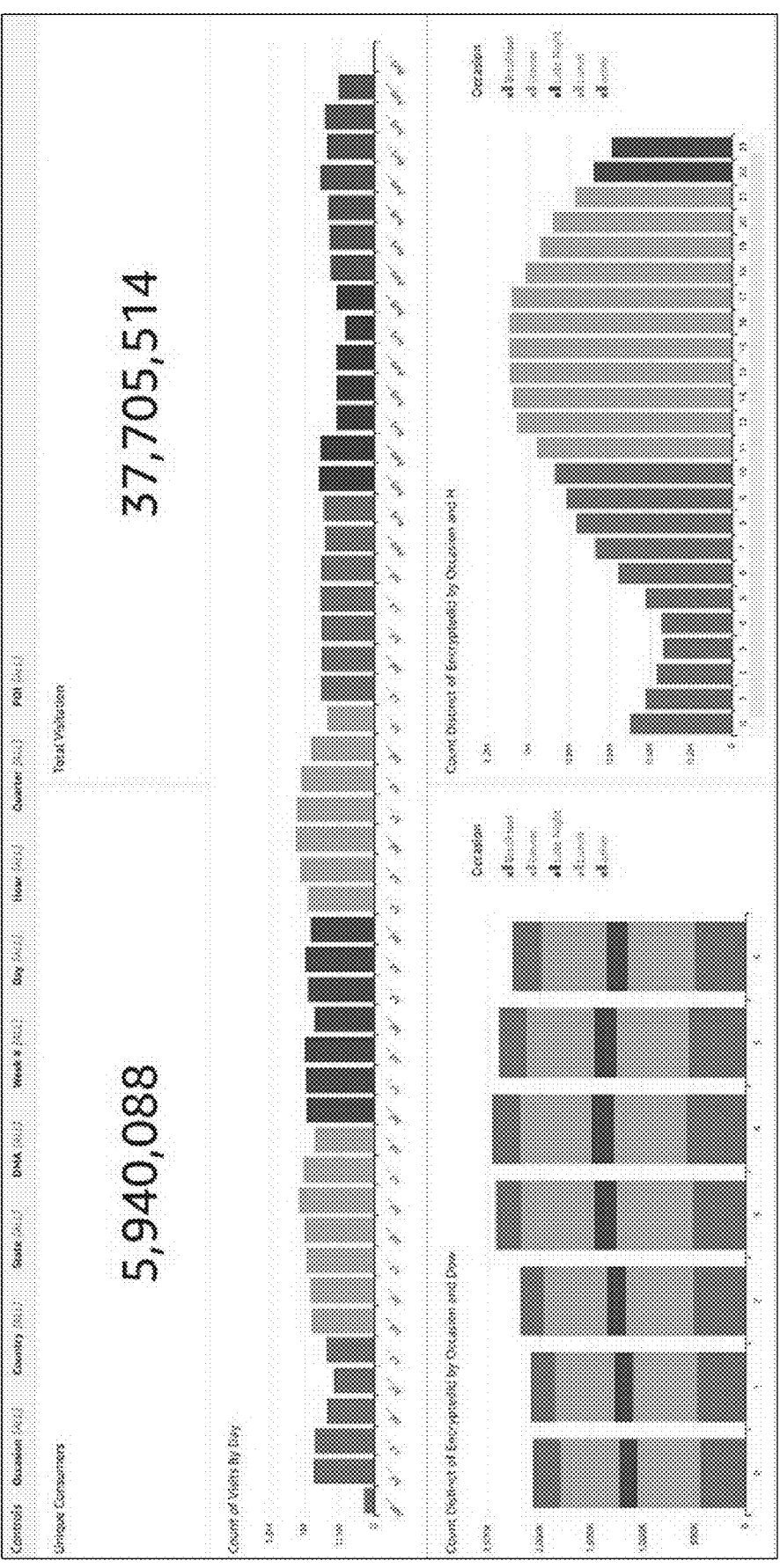

FIGS. 40-42 illustrate example screenshots of various Occasions-Related GUI embodiments which may be dynamically generated by the Intuizi System and provided to facilitate, initiate and/or perform various operation(s) and/or action(s) relating to the Intuizi Technology, including, for example, presentation of dynamically filterable, encrypted Aggregated Signal Data organized in a manner which facilitate insights of occasions-related consumer behavioral activity, as well as strategic business opportunities related thereto.

Various Trading Area-related GUI embodiments may be dynamically generated by the Intuizi System and provided to facilitate, initiate and/or perform various operation(s) and/or action(s) relating to the Intuizi Technology, including, for example, presentation of dynamically filterable, encrypted Aggregated Signal Data organized in a manner which facilitate insights of trading area-related consumer behavioral activity, as well as strategic business opportunities related thereto.

Various Backend Management-related GUI embodiments which may be used to facilitate, initiate and/or perform various operation(s) and/or action(s) relating to management of the Intuizi Backend System components, configurations, features, and functionalities.

Various IP address-related GUI embodiments may be used to facilitate, initiate and/or perform various operation(s) and/or action(s) relating to the Intuizi Technology, including, for example, presentation of dynamically filterable, encrypted Aggregated Signal Data organized in a manner which facilitate insights of IP address and IP address location-related consumer behavioral activity, as well as strategic business opportunities related thereto.

Example Intuizi Data Set Fields and Parameters

According to different embodiments, the Intuizi System software components are configured or designed to utilize various types of parameters representing different types of signal data characteristics and/or values. Example embodiments of at least some of the various Intuizi System parameters are described below.

Example Mobile Signal Data Field Types:

| Key | Value |
| --- | --- |
| deviceifa | Android Advertising ID or Apple IDFA |
| latitude | Latitude with up to 7 digits precision |
| longitude | Longitude with up to 7 digits precision |
| userAgent | URL Encoded USER AGENT of device |
| adwidth | Numeric Ad Width in Pixels |
| adheight | Numeric Ad Height in Pixels |
| campaignID | Alpha Numeric Campaign Identifier |
| bannerID | Alpha Numeric Banner Identifier |
| pubid | The assigned ID of a specific publisher grouping (apps or sites) |
| invType | Display or Video |
| deviceType | The numeric ID for the type of device. |
| country | The ISO code for the country |
| bid | Assigned Business Identifier |
| gender | M = male, F = Female, O = Other or unknown |
| age | The numeric age of the user |
| ip | The IP4 ip address of the record |
| d | This is the date of the record in Y-M-D H:i:s format |
| auctionID | unique/randomized identifier |

In at least one embodiment, the Intuizi System ingests event-level data and associates it with a user's account analysis. In some embodiments, the Signals ingestion may be based on a valid compressed (gzip) CSV file.

Example POI Data Fields:

| Key | Value |
| --- | --- |
| Category | The Friendly Meta Category Name of the Location |
| BrandName | The Brand Name of the individual location |
| LocationID | The unique integer value of the location |
| Addreess1 | The 1st address field of the location |
| Addreess2 | The 2nd address field of the location |
| City | The City of the location |
| State | The State of the location |
| Postal Code | The zipcode (US) or postal code (ROW) of the location |
| DMA | The designated marketing area (US only) of the location |
| Country | Three letter ISO code of Country |
| Lat | The Latitude of the location (up to 7 digits) |
| Lon | The Longitude of the location (up to 7 digits) |
| ExternalID | PlaceKey of POI |
| SquareFootage | The approximate square footage of the poi (if available) |

In at least one embodiment, the Point Of Interest (POI) Data Set is an individual location level report of physical location data which may include, but are not limited to, one or more of the following (or combinations thereof): Signal provider, Category, BrandName, Location ID, Address1, Address2, City, State, Postal, DMA, Latitude, and Longitude. In some embodiments, the Intuizi System may automatically and/or dynamically combine this data set with the Visitation Detail data set to generate the Visitation data sets.

Example IoT Data Field Types:

| Date | Provider | EncryptedIP | EncyrptedID |
| --- | --- | --- | --- |
| UserAgent | InventoryType | DeviceType | Country |
| CreativeLength | BundleID | CreativeURL | |

Example Appgraph Data Field Types:

| Key | Value |
| --- | --- |
| Provider | Hashed persistent value of provider |
| Category | The Meta-category of the application |
| Application Name | The Application Name as presented in the appstore, |
| BundleID | The AppstoreID in either the iOS App Store or the Google Play Store |
| Eid | The anonymous encrypted mobile ad identifier |

In at least one embodiment, the AppGraph Data Set is an individual EncryptedID level report of anonymous online behavior data. In some embodiments, it shows the presence of an app based on historical download, attribution or analytic data provided, for example, by first party SDKs. In some embodiments, this data set may include, but is not limited to, one or more of the following (or combinations thereof): provider, category of application, Application Name, AppStoreID (bundleID) and the encrypted Mobile Device identifier. This data set in combination with the visitation detail report can provide activity data on a mobile device to ensure the mobile device is still active.

Example Visitation Data Field Types:

| Key | Value |
|-----|-------|
| Provider | Hashed persistent value of provider |
| LocationID | A unique integer representing the physical |
| d_utc | date timestamp truncated to day |
| address1 | Street Address of the point of interest |
| city | City of the point of interest |
| state | 2 or 3 letter state/province code of the point of interest (USA, CAN) |
| dma | Designated Marketing Area of point of interest(USA) |
| country | 3 letter ISO code of the point of interest |
| lat | Latitude of the Point of interest (max 7 decimals) |
| lon | Longitude of the Point of interest (max 7 decimals) |
| poi | Friendly name of the Brand associated with the location |
| category | Categorical name of the Brand associate with the location |
| visits | Unique Visitation Sum aggregate by day (1 per day max) |

In at least one embodiment, the Visitation Data Set is an aggregated report of anonymous mobility data that may include, but is not limited to, one or more of the following (or combinations thereof): Category, Brand, Location/Store, and address/geography information and number of unique daily visits. In some embodiments, at least some of the Visitation Data sets may be automatically and/or dynamically generated by the Intuizi System using data from the POI and Visitation Detail data sets.

Example Visitation Details Data Field Types:

| Key | Value |
|-----|-------|
| Provider | Hashed persistent value of provider |
| LocationID | A unique integer representing the physical |
| eid | Encrypted Mobile Ad Identifier |

-continued

| Key | Value |
|-----|-------|
| Distance | Distance in miles from centroid of LocationID |
| d_utc | Human Readable time stamp of signal |

In at least one embodiment, the Visitation Detail Data Set is an individual signal level report of anonymous mobility data that may include, but are not limited to, one or more of the following (or combinations thereof): Provider, LocationID, Encrypted Mobile Ad ID, Distance from Location centroid and timestamp of signal. In some embodiments, the Intuizi System may automatically and/or dynamically combine data from this data set with the POI data set to generate the Visitation data sets.

Example Financial Transaction Details Data Field Types:

| Key | Value |
|-----|-------|
| week_starting | DateTime of the starting week |
| confirmed_cases | Confirmed cases. NULL for no confirmed cases. |
| new_cases | New cases. NULL for no new cases. |
| merchant_name | Merchant Name |
| is_return_or_reversal | Is return or reversal. t = TRUE, f = FALSE |
| is_online | Is online. t = TRUE, f = FALSE |
| transaction_amount | Transaction amount. |
| transaction_count | Transaction Count |
| county_fips_code | County FIPS code |
| county_name | County name |
| state_code | State code |

In at least one embodiment, the financial transactions (e.g., credit card transactions) data-set may include, but are not limited to, one or more of the following (or combinations thereof): Week Starting, Confirmed cases, New cases, Merchant name, is return or reversal, is online, transaction amount, transaction count, country fips code, county name and state code.

Example eCommerce Data Field Types:

| | | | |
|--|--|--|--|
| hashed maid | hashed ip | hashed email | matchcode |
| address1 | address2 | city | state |
| zip | zip+4 | apt3 | dob |
| gender | carrier_route | dwelling | dpv |
| latitude | longitude | congressional_district | lat_long_level |
| county_fips | census_tract | census_block | cbsa |
| dma | age | head_of_household | ethnic |
| religion | ethnic_minority_group | language | african_american_confidence |
| hispanic_country_of_origin | language_assimilation | recency_date | number_of_children |
| education_level | education_level_census | financial_status | credit_card |
| credit_card_premium | household_income_census | life_insurance_holder | estimated_household_income |
| net_worth | credit_lines | credit_card_amex | credit_card_discover |
| credit_card_visa | credit_card_mastercard | credit_card_bankcard | credit_card_gas_department_retail_store_card |
| credit_card_gas_card | homeowner | renter | home_value_census |
| home_purchase_amount | home_purchase_date | length_of_residence | home_market_value |
| political_party | soho | taking_care_of_parents | tv_service |
| smoker | marital_status | veteran_in_household | grandchildren |
| empty_nester | social_media_facebook | social_media_twitter | social_media_influencer |
| occupation | military_active | military_retired | mor_apparel |
| mor_automotive | mor_boats | mor_books | mor_children |
| mor_computer | mor_cooking | mor_crafts | mor_decorating |
| mor_do_it_yourself | mor_electronics | mor_entertainment | mor_health_fitness |
| mor_family | mor_female | mor_financial | mor_food |
| mor_gardening | mor_gifts | mor_golf | mor_hunting_fishing |
| mor_investing | mor_magazines | mor_male | mor_motorcycles |
| mor_music | mor_opportunity | mor_outdoor | mor_outdoor_sport_recreation |
| mor_photography | mor_religious | mor_sewing | mor_sports_collectibles |
| mor_stamps_coins | mor_sweepstakes_gambling | mor_travel | mor_upscale |
| donor_arts_or_cultural | donor | donor_charities | donor_environmental |
| donor_health | donor_political | donor_democrat | donor_republican |
| donor_religious | donor_veterans | donor_animal_welfare | donor_mail_order |
| donor_children | donor_international_aid | pets | pets_cat |

-continued

| | | | |
|---|---|---|---|
| pets_dog | pets_equestrian | vehicle_year | vehicle_make |
| vehicle_model | vehicle_type | vehicle_hybrid | hunter |
| fisherman | boat_owner | pilot | aircraft_owner |
| aircraft_type | mob_apparel_childrens | mob_apparel_mens | mob_apparel_mens_big_and_tall |
| mob_apparel_womens | mob_apparel_womens_petite | mob_apparel_womens_plus_sizes | mob_apparel_young_mens |
| mob_apparel_young_womens | mob_books | mob_books_audio_books | mob_childrens_apparel_infants_and_toddlers |
| mob_childrens_learning_and_activity_toys | mob_childrens_products_general | mob_childrens_products_general_baby_care | mob_childrens_products_general_back_to_school |
| mob_collectibles | mob_collectibles_and_antiques | mob_collectibles_arts | mob_collectibles_coins |
| mob_collectibles_sports_memorabilia | mob_collectibles_stamps | mob_collector_avid | mob_computer |
| mob_consumer_electronics | mob_cooking_and_food | mob_cooking_general | mob_cooking_gourmet |
| mob_electronics_and_computing_tv_video_movie_watcher | mob_electronics_computing_and_home_office | mob_food_wines | mob_foods_natural |
| mob_games_computer_games | mob_high_end_appliances | mob_jewelry | mob_luggage |
| mob_magazines | mob_military_memorabilia_weaponry | mob_online_purchasing_indicator | mob_photography_and_video_equipment |
| mob_tv_cable | mob_tv_satellite_dish | mob_value_priced_general_merchandise | mob_crafts_hobbies |
| mob_dvds_videos | mob_health_and_wellness | mob_home_furnishings_decorating | mob_membership_clubs |
| mob_music | mob_travel_domestic | mob_upscale_merchandise | mob_medicare_insurance |
| mor_african_american_professionals | mor_arts | mor_arts_and_antiques_antiques | mor_arts_and_antiques_art |
| mor_aviation | mor_beauty_cosmetics | mor_boating_sailing | mor_books_audio_books |
| mor_books_religious_inspirational | mor_books_science_fiction | mor_camping_hiking | mor_career |
| mor_career_improvement | mor_computing_home_office_general | mor_crafts_hobbies | mor_current_affairs_politics |
| mor_dieting_weight_loss | mor_dvds_videos | mor_education_online | mor_electronics_and_computers |
| mor_exercise_aerobic | mor_exercise_health_grouping | mor_exercise_running_jogging | mor_exercise_walking |
| mor_financial_publication_subscribers | mor_fishing | mor_games_board_games_puzzles | mor_games_video_games |
| mor_gaming | mor_gaming_casino | mor_health_and_beauty | mor_health_medical |
| mor_history_military | mor_home_and_garden | mor_home_furnishings_decorating | mor_home_improvement |
| mor_home_improvement_do_it_yourselfers | mor_house_plants | mor_hunting | mor_hunting_shooting |
| mor_investing_finance_grouping | mor_investments_foreign | mor_investments_personal | mor_investments_real_estate |
| mor_investments_stocks_bonds | mor_membership_clubs | mor_money_seekers | mor_movie_collector |
| mor_movie_music_grouping | mor_music_avid_listener | mor_music_collector | mor_music_home_stereo |
| mor_music_player | mor_musical_instruments | mor_nascar | mor_parenting |
| mor_science_space | mor_scuba_diving | mor_self_improvement | mor_single_parent |
| mor_smoking_tobacco | mor_snow_skiing | mor_spectator_sports_auto_motorcycle_racing | mor_spectator_sports_baseball |
| mor_spectator_sports_basketball | mor_spectator_sports_football | mor_spectator_sports_hockey | mor_spectator_sports_soccer |
| mor_spectator_sports_tv_sports | mor_sports_and_leisure | mor_sports_grouping | mor_telecommunications |
| mor_tennis | mor_theater_performing_arts | mor_travel_cruise_vacations | mor_travel_domestic |
| mor_travel_international | mor_woodworking | mor_working_woman | |

Signals: Impressions

The Intuizi Signals system ingests event-level data and associates it with your account analysis. The Signal ingestion is based on a client-side GET request with key-value pairs.

Example Impressions Data Field Types:

| Key | Value |
|---|---|
| deviceifa | Android Advertising ID or Apple IDFA |
| latitude | Latitude with up to 7 digits precision |
| longitude | Longitude with up to 7 digits precision |
| userAgent | URL Encoded USER AGENT of device |
| adwidth | Numeric Ad Width in Pixels |
| adheight | Numeric Ad Height in Pixels |
| campaignID | Alpha Numeric Campaign Identifier |
| bannerID | Alpha Numeric Banner Identifier |
| pubid | The assigned ID of a specific publisher grouping (apps or sites) |
| invType | Display or Video |
| deviceType | The numeric ID for the type of device. |
| country | The ISO code for the country |
| bid | Assigned Business Identifier |

-continued

| Key | Value |
|---|---|
| gender | M = male, F = Female, O = Other or unknown |
| age | The numeric age of the user |
| ip | The IP4 ip address of the record |
| d | This is the date of the record in Y-M-D H:M:S format |
| auctionID | unique/randomized identifier |
| bundleID | AppStore Identifier for the signal origination |
| appName | App Name for the signal origination |

Signals: App Download History

In some embodiments, The Intuizi Signals system ingests event-level data and associates it with your account analysis. The Signal App Download History may be based on a file side CSV delivery. In at least one embodiment, device identifiers may be idfa or idfv (iOS), or adid (Android) based and encrypted via MD5.

Example Parameters:

| Key | Value |
| --- | --- |
| os | adid for andoid, idfa or idfv for iOS |
| eid | Encrypted ID md5 representation of a idfa, idfv or adid |
| bundleID | AppStore Identifier of identified application |

Signal: Engagement—Leads

In at least one embodiment, the Intuizi engagement system ingests event-level data and associates it with your account analysis. The Signal ingestion is based on a client-side GET request with key-value pairs. The iframe checks for a first party cookie that has been set by either an Image View Through or Click Action.

Signals: Engagement—Sales

| Key | Value |
| --- | --- |
| orderID* | Numeric Unique ID |
| orderValue* | Monetary Value of Transaction |
| store* | Numeric ID of store. If online only set to 1 |

In at least one embodiment, the Intuizi System engagement system may be configured or designed to ingest event-level data and associates it with your account analysis. The Signal ingestion is based on a client-side GET request with key-value pairs. The iframe checks for a first party cookie that has been set by either an Image View Through or Click Action.

Various aspects described or referenced herein are directed to different methods, systems, and computer program products for providing a computer-implemented privacy compliant data insights and audience activation platform incorporating data signals from various sources.

One aspect disclosed herein is directed to different methods, systems, and computer program products via a data network, the data network including a plurality of mobile computing devices, the data network further including a plurality of signal providers, including a first signal provider and a second signal provide. In at least one embodiment, various method(s), system(s) and/or computer program product(s) may be operable to cause at least one processor to execute a plurality of instructions stored in non-transient memory for: accessing a first set of pseudonymized mobile device signal data provided by the first signal provider, the first set of pseudonymized mobile device signal data including a first plurality of mobile signal data records, including a first mobile signal data record identifying a first encrypted mobile identifier, and including a second mobile signal data record identifying a second encrypted mobile identifier; accessing a second set of pseudonymized mobile device signal data provided by the second signal provider, the second set of pseudonymized mobile device signal data including a second plurality of mobile signal data records, including a third mobile signal data record identifying a third encrypted mobile device identifier, and including a fourth mobile signal data record identifying a fourth encrypted mobile device identifier; accessing a first set of POI data from a first POI data source, the first set of POI data including a plurality of POI data records, including a first POI data record identifying a first POI Brand identifier and a first POI Geolocation identifier; accessing a first set of Appgraph data from a first Appgraph data source, the first set of Appgraph data including a plurality of Appgraph data records, including a first Appgraph data record identifying a fifth encrypted mobile device identifier and a first set of mobile application identifiers; accessing a first set of IoT data from a first IoT data source, the first set of IoT data including a plurality of IoT data records, including a first IoT data record identifying a first encrypted IP address identifier and a first timestamp data; accessing a first set of eCommerce data from a first eCommerce data source, the first set of eCommerce data including a plurality of eCommerce data records, including a first eCommerce data record identifying a first eCommerce Geolocation identifier; accessing a first set of Financial data from a first Financial data source, the first set of Financial data including a plurality of Financial data records, including a first Financial data record identifying a first Merchant identifier and a first time interval; aggregating the first set of pseudonymized mobile device signal data, the second set of pseudonymized mobile device signal data, the first set of POI data, the first set of Appgraph data, the first set of IoT data, the first set of eCommerce data, and the first set of Financial Transaction data to create a first set of Aggregated pseudonymized data; analyzing the first set of Aggregated pseudonymized data to identify matching commonalities of data values between the first mobile signal data record and a first identified data record selected from a first group of data records comprising: the first POI data record, the first Appgraph data record, the first IoT data record, the first eCommerce data record, and the first Financial Transaction data record; analyzing the first set of Aggregated pseudonymized data to identify matching commonalities of data values between the second mobile signal data record a second identified data record selected from a first group of data records comprising: the first POI data record, the first Appgraph data record, the first IoT data record, the first eCommerce data record, and the first Financial Transaction data record; creating, in response to identifying a matching commonality of data values between the first mobile signal data record and the first identified data record, a first link or association between the first mobile signal data record and the first identified data record; creating, in response to identifying a matching commonality of data values between the second mobile signal data record and the second identified data record, a second link or association between the first mobile signal data record and the second identified data record; causing a first portion of GUI content to be displayed via a first interactive graphical user interface, wherein the first portion of GUI content includes information characterizing the first link or association between the first mobile signal data record and the first identified data record; and causing a second portion of GUI content to be displayed via the first interactive graphical user interface, wherein the second portion of GUI content includes information characterizing the second link or association between the second mobile signal data record and the second identified data record.

Additional method(s), system(s) and/or computer program product(s) may be further operable to cause at least one processor to execute additional instructions for causing the first portion of GUI content and second portion of GUI content to be concurrently displayed via the first interactive graphical user interface.

Additional method(s), system(s) and/or computer program product(s) may be further operable to cause at least one processor to execute additional instructions for: identifying a first intersection of matching data between the first mobile signal data record and the first POI data record; and wherein the first linking or association includes a linking or association between the first encrypted mobile identifier and data associated with the first POI data record.

Additional method(s), system(s) and/or computer program product(s) may be further operable to cause at least one processor to execute additional instructions for: identifying a first intersection of matching data between the first mobile signal data record and the first Appgraph data record; and wherein the first linking or association includes a linking or association between the first encrypted mobile identifier and data associated with the first Appgraph data record.

Additional method(s), system(s) and/or computer program product(s) may be further operable to cause at least one processor to execute additional instructions for: identifying a first intersection of matching data between the first mobile signal data record and the first IoT data record; and wherein the first linking or association includes a linking or association between the first encrypted mobile identifier and data associated with the first IoT data record.

Additional method(s), system(s) and/or computer program product(s) may be further operable to cause at least one processor to execute additional instructions for: identifying a first intersection of matching data between the first mobile signal data record and the first eCommerce data record; and wherein the first linking or association includes a linking or association between the first encrypted mobile identifier and data associated with the first eCommerce data record.

Additional method(s), system(s) and/or computer program product(s) may be further operable to cause at least one processor to execute additional instructions for: identifying a first intersection of matching data between the first mobile signal data record and the first Financial Transaction data record; and wherein the first linking or association includes a linking or association between the first encrypted mobile identifier and data associated with the first Financial Transaction data record.

Additional method(s), system(s) and/or computer program product(s) may be further operable to cause at least one processor to execute additional instructions for: identifying a first intersection of matching data between the first mobile signal data record and the first POI data record; and wherein the first linking or association includes a linking or association between the first encrypted mobile identifier and data associated with the first POI data record.

Additional method(s), system(s) and/or computer program product(s) may be further operable to cause at least one processor to execute additional instructions for: analyzing the first set of Aggregated pseudonymized data to identify matching commonalities of data values between the first mobile signal data record and data associated with the first plurality of POI data records; analyzing the first set of Aggregated pseudonymized data to identify matching commonalities of data values between the first mobile signal data record and data associated with the first plurality of Appgraph data records; analyzing the first set of Aggregated pseudonymized data to identify matching commonalities of data values between the first mobile signal data record and data associated with the first plurality of IoT data records; analyzing the first set of Aggregated pseudonymized data to identify matching commonalities of data values between the first mobile signal data record and data associated with the first plurality of eCommerce data records; and analyzing the first set of Aggregated pseudonymized data to identify matching commonalities of data values between the first mobile signal data record and data associated with the first plurality of Financial Transaction data records; if at least one intersection of matching data is detected between the first mobile signal data record and a first set of POI data records, linking or associating the first encrypted mobile identifier and the first set of identified POI data records; if at least one intersection of matching data is detected between the first mobile signal data record and a first set of Appgraph data records, linking or associating the first encrypted mobile identifier and the first set of identified Appgraph data records; if at least one intersection of matching data is detected between the first mobile signal data record and a first set of IoT data records, linking or associating the first encrypted mobile identifier and the first set of identified IoT data records; if at least one intersection of matching data is detected between the first mobile signal data record and a first set of eCommerce data records, linking or associating the first encrypted mobile identifier and the first set of identified eCommerce data records; and if at least one intersection of matching data is detected between the first mobile signal data record and a first set of Financial Transaction data records, linking or associating the first encrypted mobile identifier and the first set of identified Financial Transaction data records.

Additional method(s), system(s) and/or computer program product(s) may be further operable to cause at least one processor to execute additional instructions for: providing an interactive Custom Audience Creation graphical user interface configured or designed for enabling a user to define a first customized audience of pseudonymized mobile device signal records which match a first set of user-specified selection criteria; providing an interactive Audience Activation graphical user interface configured or designed for enabling the user to initiate a first Audience Activation Request using the first customized audience of pseudonymized mobile device signal records, the interactive Audience Activation graphical user interface further including functionality for enabling the user to specify a first Activation Endpoint destination; analyzing the first customized audience of pseudonymized mobile device signal records to identify a first plurality of contributing signal providers, including a first contributing signal provider and a second contributing signal provider; identifying, from the first customized audience of pseudonymized mobile device signal records, a first set of pseudonymized signal records which are associated with the first contributing signal provider; identifying, from the first customized audience of pseudonymized mobile device signal records, a second set of pseudonymized signal records which are associated with the second contributing signal provider; generating a first decryption request to be delivered to the first contributing signal provider, wherein the first decryption request includes information identifying the first set of pseudonymized signal records, and includes information relating to the first Activation Endpoint destination; generating a second decryption request to be delivered to the second contributing signal provider, wherein the second decryption request includes information identifying the second set of pseudonymized signal records, and includes information relating to the first Activation Endpoint destination; causing the first decryption request to be delivered to the first contributing signal provider to cause the first contributing signal provider to generate a first Decrypted Signal Records data set using the information identifying the first set of pseudonymized signal records, and to cause the first contributing signal provider to deliver the first Decrypted Signal Records data set to the first Activation Endpoint destination; and causing the second decryption request to be delivered to the second contributing signal provider to cause the second contributing signal provider to generate a second Decrypted Signal Records data set using the information identifying the second set of pseudonymized signal records, and to cause the second contributing signal provider to deliver the second Decrypted Signal Records data set to the first Activation Endpoint destination.

It will be appreciated that, via the use of specifically configured computer hardware and software, the problems which are solved and/or overcome by the various Intuizi techniques described herein are necessarily rooted in computer technology in order to overcome problems specifically arising in the realm of computer networks. For example, as described previously, numerous problems and limitations are typically encountered when attempting to use conventional systems to quickly and easily view and explore patterns in large data sets such as, for example, regional or global data sets of PII Anonymized mobile device signals and related activity data. Such problems and limitations specifically arise in the realm of computer networks, and the solutions to these data analytics and GUI presentation problems and limitations (e.g., as described herein) are necessarily rooted in computer technology.

Although several example embodiments of one or more aspects and/or features have been described in detail herein with reference to the accompanying drawings, it is to be understood that aspects and/or features are not limited to these precise embodiments, and that various changes and modifications may be affected therein by one skilled in the art without departing from the scope of spirit of the invention(s) as defined, for example, in the appended claims It is claimed:

1. A computerized system configured for privacy-compliant behavioral analytics within a data network, the data network including a plurality of computerized signal provider systems, the computerized system comprising:

at least one processor;

memory communicatively coupled to the at least one processor;

wherein the at least one processor is configured for executing a plurality of instructions stored in the memory for:

initiating a Signal Encryptor System locally within a first signal provider cloud environment of a first signal provider system of the plurality of computerized signal provider systems;

identifying, by the Signal Encryptor System, personally identifiable information (PII) within a first set of device signal data records;

generating provider-specific encrypted identifiers that are unique to both a specific end-user and the first signal provider system using a hashing algorithm to ensure that a single physical user is represented by non-matching identifiers across different signal provider systems to prevent cross-platform persistent tracking;

accessing a plurality of disparate datasets comprising de-identified mobile signal data, point-of-interest (POI) data, application download data, and Internet of Things (IoT) data;

grooming the plurality of disparate datasets by discarding non-conforming data points, processing records of the disparate datasets via a data classification layer of a distributed processing system, and normalizing high-precision geolocation coordinates into physical address data, wherein normalizing high-precision geolocation coordinates includes executing a conversion of raw latitude and longitude coordinates into physical addresses or geo-spatial polygons to convert raw coordinates into specific business identity points of interest;

performing a stateless real-time recalculation of linkage associations between records of the groomed datasets in response to an ad-hoc query, wherein stateless includes performing the recalculation without storing persistent identity linkages between queries, wherein the recalculation is executed utilizing the distributed processing system, the distributed processing system comprising a cloud of a plurality of GPU-enabled nodes configured to process mass associations across high-volume datasets during a query lifecycle;

verifying the human authenticity of the mobile signal data by correlating real-time hardware-level state data, including at least one of accelerometer readings or battery status, with digital application engagement to identify active mobile devices based on whether the correlated data satisfies one or more authenticity criteria indicative of human-operated device activity;

flagging a mobile signal as a non-human signal by analyzing the hardware-level state data to determine if hardware readings or application engagement indicate abnormal activity patterns that satisfy one or more anomaly criteria indicative of automated or non-human activity;

identifying a household association between a mobile device signal from the mobile signal data and an IoT device signal from the IoT data by detecting overlapping encrypted IP addresses during a specified night-time time interval;

executing a time-series analysis on the linkage associations to automatically detect anomalous activity and relevant statistical changes in retail visitation patterns between two or more different periods of time;

providing an interactive data mapping presentation graphical user interface (GUI) to cause the computerized system to visually display the linkage associations;

providing an interactive audience activation GUI for defining a destination activation endpoint and assigning rule-based economic metadata to a customized audience of de-identified records, the economic metadata defining pricing structures governing an export of data;

generating a decryption request including a subset of the provider-specific encrypted identifiers and instructions for the first signal provider system to transmit decrypted data records directly to the destination activation endpoint;

maintaining the at least one processor in a state blind to the PII and decryption keys throughout a transmission lifecycle; and dynamically creating the linkage associations via a deterministic matching system to avoid persistent storage of identity linkages within the memory.

2. The computerized system of claim 1, wherein the Signal Encryptor System is deployed local to each of the plurality of signal provider systems such that raw PII data never leaves an originating cloud environment of a respective signal provider.

3. The computerized system of claim 1, wherein the system is configured to generate unified behavioral insights by interrogating the datasets via user-specified filter criteria selected through an interactive graphical user interface.

4. The computerized system of claim 1, wherein the specific business identity points of interest are derived from external databases comprising publicly known or licensed information integrated with the distributed processing system.

5. The computerized system of claim 1, wherein the rule-based economic metadata defines a pricing model based on a count of decrypted identifiers delivered to the destination activation endpoint.

6. The computerized system of claim 1, wherein the interactive audience activation GUI is further configured for selecting a delivery format for the customized audience of de-identified records.

7. The computerized system of claim 1, wherein the household association is verified by determining a deterministic match between a mobile device and an IoT device based on a shared physical address and IP address history.

8. The computerized system of claim 1, wherein the distributed processing system is configured to handle multiple concurrent query threads, each performing independent stateless recalculations without storing persistent identity linkages between queries.

9. The computerized system of claim 1, wherein the Signal Encryptor System maintains encryption keys exclusively at the signal provider systems to ensure continued isolation of PII data.

10. The computerized system of claim 1, wherein the interactive data mapping presentation GUI includes a visualization of geographic heat maps colorized based on a density of identified linkage associations.

11. A computer-implemented method for privacy-compliant behavioral analytics within a data network including a plurality of computerized signal provider systems, the method comprising causing at least one processor to execute a plurality of instructions stored in a non-transient memory for:

initiating a Signal Encryptor System locally within a first signal provider cloud environment of a first signal provider system of the plurality of computerized signal provider systems;

identifying, by the Signal Encryptor System, personally identifiable information (PII) within a first set of device signal data records;

generating provider-specific encrypted identifiers that are unique to both a specific end-user and the first signal provider system using a hashing algorithm to ensure that a single physical user is represented by non-matching identifiers across different signal provider systems to prevent cross-platform persistent tracking;

accessing a plurality of disparate datasets comprising de-identified mobile signal data, point-of-interest (POI) data, application download data, and Internet of Things (IoT) data;

grooming the plurality of disparate datasets by discarding non-conforming data points, processing records of the disparate datasets via a data classification layer of a distributed processing system, and normalizing high-precision geolocation coordinates into physical address data, wherein normalizing high-precision geolocation coordinates includes executing a conversion of raw latitude and longitude coordinates into physical addresses or geo-spatial polygons to convert raw coordinates into specific business identity points of interest;

performing a stateless real-time recalculation of linkage associations between records of the groomed datasets in response to an ad-hoc query, wherein stateless includes performing the recalculation without storing persistent identity linkages between queries, wherein the recalculation is executed utilizing the distributed processing system, the distributed processing system comprising a cloud of a plurality of GPU-enabled nodes configured to process mass associations across high-volume datasets during a query lifecycle;

verifying the human authenticity of the mobile signal data by correlating real-time hardware-level state data, including at least one of accelerometer readings or battery status, with digital application engagement to identify active mobile devices based on whether the correlated data satisfies one or more authenticity criteria indicative of human-operated device activity;

flagging a mobile signal as a non-human signal by analyzing the hardware-level state data to determine if hardware readings or application engagement indicate abnormal activity patterns that satisfy one or more anomaly criteria indicative of automated or non-human activity;

identifying a household association between a mobile device signal from the mobile signal data and an IoT device signal from the IoT data by detecting overlapping encrypted IP addresses during a specified nighttime time interval;

executing a time-series analysis on the linkage associations to automatically detect anomalous activity and relevant statistical changes in retail visitation patterns between two or more different periods of time;

providing an interactive data mapping presentation graphical user interface (GUI) to cause a computerized system to visually display the linkage associations;

providing an interactive audience activation GUI for defining a destination activation endpoint and assigning rule-based economic metadata to a customized audience of de-identified records, the economic metadata defining pricing structures governing an export of data;

generating a decryption request including a subset of the provider-specific encrypted identifiers and instructions for the first signal provider system to transmit decrypted data records directly to the destination activation endpoint;

maintaining the at least one processor in a state blind to the PII and decryption keys throughout a transmission lifecycle; and dynamically creating the linkage associations via a deterministic matching system to avoid persistent storage of identity linkages within the non-transient memory.

12. The method of claim 11, further comprising deploying the Signal Encryptor System local to each of the plurality of signal provider systems such that raw PII data never leaves an originating cloud environment.

13. The method of claim 11, further comprising generating unified behavioral insights by interrogating the datasets via user-specified filter criteria selected through an interactive graphical user interface.

14. The method of claim 11, further comprising integrating external databases comprising publicly known or licensed information with the distributed processing system to convert geolocation coordinates into specific business identity points of interest.

15. The method of claim 11, further comprising defining a pricing model for the first signal provider system based on a count of decrypted identifiers delivered to the destination activation endpoint.

16. The method of claim 11, further comprising receiving user input via the interactive audience activation GUI to select a delivery format for the customized audience records.

17. The method of claim 11, further comprising verifying the household association by determining a deterministic match between a mobile device and an Internet of Things (IoT) device based on a shared address and IP history.

18. The method of claim 11, further comprising processing multiple concurrent query threads in the distributed processing system, wherein each thread performs an independent stateless recalculation without storing persistent identity linkages between queries.

19. The method of claim 11, further comprising maintaining encryption keys exclusively at the signal provider systems within the Signal Encryptor System.

20. The method of claim 11, further comprising generating a visualization of geographic heat maps colorized by a density of linkage associations via the interactive data mapping presentation GUI.

21. A non-transitory computer-readable medium having computer-readable code embodied therein for use in behavioral analytics within a data network including a plurality of computerized signal provider systems, the computer-readable code being executable by at least one processor of a computerized system to perform a method comprising:

initiating a Signal Encryptor System locally within a first signal provider cloud environment of a first signal provider system of the plurality of computerized signal provider systems;

identifying, by the Signal Encryptor System, personally identifiable information (PII) within a first set of device signal data records;

generating provider-specific encrypted identifiers that are unique to both a specific end-user and the first signal provider system using a hashing algorithm to ensure that a single physical user is represented by non-matching identifiers across different signal provider systems to prevent cross-platform persistent tracking;

accessing a plurality of disparate datasets comprising de-identified mobile signal data, point-of-interest (POI) data, application download data, and Internet of Things (IoT) data;

grooming the plurality of disparate datasets by discarding non-conforming data points, processing records of the disparate datasets via a data classification layer of a distributed processing system, and normalizing high-precision geolocation coordinates into physical address data, wherein normalizing high-precision geolocation coordinates includes executing a conversion of raw latitude and longitude coordinates into physical addresses or geo-spatial polygons to convert raw coordinates into specific business identity points of interest;

performing a stateless real-time recalculation of linkage associations between records of the groomed datasets in response to an ad-hoc query, wherein stateless includes performing the recalculation without storing persistent identity linkages between queries, wherein the recalculation is executed utilizing the distributed processing system, the distributed processing system comprising a cloud of a plurality of GPU-enabled nodes configured to process mass associations across high-volume datasets during a query lifecycle;

verifying the human authenticity of the mobile signal data by correlating real-time hardware-level state data, including at least one of accelerometer readings or battery status, with digital application engagement to identify active mobile devices based on whether the correlated data satisfies one or more authenticity criteria indicative of human-operated device activity;

flagging a mobile signal as a non-human signal by analyzing the hardware-level state data to determine if hardware readings or application engagement indicate abnormal activity patterns that satisfy one or more anomaly criteria indicative of automated or non-human activity;

identifying a household association between a mobile device signal and an Internet of Things (IoT) device signal by detecting overlapping encrypted IP addresses during a specified nighttime time interval;

executing a time-series analysis on the linkage associations to automatically detect anomalous activity and relevant statistical changes in retail visitation patterns between two or more different periods of time;

providing an interactive data mapping presentation graphical user interface (GUI) to cause the computerized system to visually display the linkage associations;

providing an interactive audience activation GUI for defining a destination activation endpoint and assigning rule-based economic metadata to a customized audience of de-identified records, the economic metadata defining pricing structures governing an export of data;

generating a decryption request including a subset of the provider-specific encrypted identifiers and instructions for the first signal provider system to transmit decrypted data records directly to the destination activation endpoint;

maintaining the at least one processor in a state blind to the PII and decryption keys throughout a transmission lifecycle; and dynamically creating the linkage associations via a deterministic matching system to avoid persistent storage of identity linkages within the non-transitory computer-readable medium.

* * * * *